(12) United States Patent
Morita et al.

(10) Patent No.: US 6,830,379 B2
(45) Date of Patent: Dec. 14, 2004

(54) ROTATION-SPEED SENSOR DEVICE

(75) Inventors: Kouichi Morita, Fujisawa (JP); Ikunori Sakatani, Kanagawa-ken (JP); Shigeru Endo, Fujisawa (JP); Hiroya Miyazaki, Fujisawa (JP); Junshi Sakamoto, Fujisawa (JP); Yuji Nakamura, Fujisawa (JP)

(73) Assignee: NSK Ltd., Tokyo (JP)

( * ) Notice: Subject to any disclaimer, the term of this patent is extended or adjusted under 35 U.S.C. 154(b) by 130 days.

(21) Appl. No.: 10/274,413

(22) Filed: Oct. 18, 2002

(65) Prior Publication Data
US 2003/0093188 A1 May 15, 2003

(30) Foreign Application Priority Data

| Oct. 18, 2001 | (JP) | ................................. | 2001-320629 |
| Nov. 12, 2001 | (JP) | ................................. | 2001-346521 |
| Nov. 21, 2001 | (JP) | ................................. | 2001-356076 |
| Nov. 21, 2001 | (JP) | ................................. | 2001-356399 |
| Jul. 8, 2002 | (JP) | ................................. | 2002-198703 |

(51) Int. Cl.[7] ............................................. F16C 19/08
(52) U.S. Cl. ..................................................... 384/448
(58) Field of Search ................................. 384/448, 446, 384/544; 324/174, 173

(56) References Cited

U.S. PATENT DOCUMENTS

| 4,069,435 A | 1/1978 | Wannerskog et al. |
| 4,865,468 A | 9/1989 | Kato et al. |
| 4,960,333 A | 10/1990 | Faye et al. |
| 4,984,455 A | 1/1991 | Koyama et al. |
| 5,119,300 A | 6/1992 | Bartke et al. |
| 5,440,184 A | 8/1995 | Samy et al. |
| 5,749,060 A | 5/1998 | Graf et al. |
| 5,898,388 A | 4/1999 | Hofmann et al. |
| 6,049,269 A | 4/2000 | Byrd et al. |
| 6,122,577 A | 9/2000 | Mergenthaler et al. |
| 6,161,962 A | 12/2000 | French et al. |

FOREIGN PATENT DOCUMENTS

| EP | 0 167 744 | 1/1986 |
| EP | 0 594 550 A1 | 10/1992 |
| JP | 5-12744 | 2/1993 |
| JP | 6-64508 | 3/1994 |
| JP | 2543369 | 4/1997 |
| JP | 10-068739 | 3/1998 |
| JP | 11-023596 | 1/1999 |
| JP | 2000-346673 | 12/2000 |
| JP | 2001-151090 | 6/2001 |
| WO | 99/52722 | 10/1999 |

OTHER PUBLICATIONS

U.S. patent application Ser. No. 09/985,921, Takizawa et al., filed Nov. 16, 2001.

Primary Examiner—Lenard A. Footland
(74) Attorney, Agent, or Firm—Katten Muchin Zavis Rosenman

(57) ABSTRACT

A rotation-speed sensor device is provided to comprise an encoder supported by a rotating race of a rolling bearing unit for vehicle wheel support to be concentric with the rotating race and having a detected portion the characteristics of which are alternately changed in a circumferential direction, a rotation detection sensor supported by a non-rotating member on the vehicle chassis side and having a detecting portion facing the detected portion to produce a detection signal, a wireless transmission device for sending the detection signal from the rotation detection sensor to a controller provided on the vehicle chassis side, and a self-diagnosis circuit to judge whether there is an error or not in the rotation detection sensor.

5 Claims, 37 Drawing Sheets

ROTATION-SPEED SENSOR DEVICE

BACKGROUND OF THE INVENTION

1. Field of the Invention

This invention relates to a rotation-speed sensor device and more particularly to a rotation-speed sensor device used for detecting the rpm of the wheels of an automobile.

The present invention relates to a double row rolling bearing with a sensor unit for rotatively supporting a wheel of a rolling stock or an automobile or a rotation shaft of a mill for metal working to a housing or a suspension system which does not rotate even at the time of use, and detecting a state of the double row rolling bearing portion. The double row rolling bearing with a sensor unit is effective for detecting a rotating speed of a wheel, a rotating shaft or the like, and a state of the double row rolling bearing (temperature, oscillation or the like) so as to judge existence/inexistence of error or abnormality of the double row rolling bearing portion.

2. Description of the Related Art

In order to control an anti-lock brake system (ABS) or traction control system (TCS) in order to maintain the stability and steadiness of an automobile when braking or accelerating, it is necessary to detect the rpm of the wheels. Recently, a rotation-speed sensor device is built into a rolling-bearing unit for supporting the wheels to rotate freely with respect to the suspension, and such a rolling bearing unit with rotation-speed sensor device is widely used for supporting the wheels such that they rotate freely with respect to the suspension and for detecting the rpm of the wheels.

A rolling-bearing unit with rotation-speed sensor device that is used for this purpose and having a structure as shown in FIG. 18 and FIG. 19 is disclosed in Japanese Patent Publication No. Tokukai Hei 11-23596.

The first example of prior construction of a rolling bearing unit 1 with rotation-speed sensor device shown in FIG. 18 comprises a rotation-speed sensor device 3 built into the rolling-bearing unit 2. In the rolling-bearing unit 2, a hub 5 and inner race 6, which form a rotating race, are supported such that they rotate freely on the inner-diameter side of an outer race 4, which is the stationary race. A first flange 7 for attaching to the wheel is formed around the outer peripheral surface on the outside end of this hub 5 (which is the end on the outside in the width direction when installed in the vehicle, and is the left end in all of the drawings of the rolling-bearing unit. This is the same throughout the explanation of this invention), and a first inner-ring raceway 8 is formed around the outer peripheral surface in the middle of the hub 5.

Moreover, the inner race 6 has a second inner-ring raceway 9 formed around its outer peripheral surface and located at a portion closer to the inside end of the hub 5 (which is the end on the inside in the width direction when installed in the vehicle, and is the right end in all of the drawings of the rolling-bearing unit. This is the same throughout the explanation of this invention) and it fits around a stepped section 10 that has a diameter a little less than that of the section where the first inner-ring raceway 8 is formed. Also, a first outer-ring raceway 11 that faces the first inner-ring raceway 8, and a second outer-ring raceway 12 that faces the second inner-ring raceway 9 are formed around the inner peripheral surface of the outer race 4, and a second flange 13 for supporting the outer race 4 on the suspension is formed around the outer peripheral surface of the outer race 4.

Moreover, a plurality of rolling elements 14 are located between the first and second inner-ring raceways 8, 9 and the first and second outer-ring raceways 11, 12, and they support the hub 5 and inner race 6 such that they rotate freely on the inner-diameter side of the outer race 4. With the inner race 6 fitted around the stepped section 10, a nut 15 screws onto a male screw section that is formed on the inside end of the hub 5 and retains the inner race 6 in order to prevent the inner race 6 and hub 5 from coming apart.

Furthermore, a cover 16 covers the opening on the inside end (right end in FIG. 18) of the outer race 4. This cover 16 comprises a main piece 17 that is cylindrical shaped with a bottom and that is formed by injection molding of synthetic resin or plastic, and a metal cylindrical fitting section 18 that is connected to the opening section of the main piece 17. This cylindrical fitting section 18 is connected to the opening section of the main piece 17 by molding its base end at the time when the main piece 17 is being formed by injection molding. This cover 16, formed in this way, covers the opening on the inside end of the outer race 4 by securely interference-fitting the tip end half (left half in FIG. 18) of the cylindrical fitting section 18 around the inside end of the outer race 4.

On the other hand, the encoder 19 of the rotation-speed sensor device fits around the outer peripheral surface of the inside end of the inner race 6, which fits around the inside end of the hub 5, in the section that is separated from the second inner-ring raceway 9. This encoder 19 comprises a support ring 20 and permanent magnet 21. Of these, the support ring 20 is formed into a circular ring shape having an L-shaped cross section by bending a magnetic metal sheet such as SPCC, and it interference-fits tightly around the inside end of the inner race 6.

Also, the permanent magnet 21 is made by attaching rubber, which has been mixed with ferrite powder or the like, to the inside surface of the circular ring portion of the support ring 20 by burn-in etc. This permanent magnet 21 is magnetically oriented in the axial direction (left and right in FIG. 18), and the direction of magnetic poles alternates at equal intervals around in the circumferential direction. Therefore, the S pole and N pole are arranged such that they alternate at equal intervals around the circumference of the inside surface of the encoder 19, which is the detected section.

Moreover, an insertion hole 22 is formed in the main piece 17 of the cover 16 in the part that faces the inside surface of the permanent magnet 21 of the encoder 19 such that it penetrates the main piece 17 in the axial direction of the cover 16. A sensor 23 is inserted inside this insertion hole 22. This sensor 23 comprises: an IC, having a magnet-detection element such as a hall element or magnetic-resistance element (MR element), whose characteristics change according to the direction of flow of magnetic flux, and a wave-shaping circuit for adjusting the waveform output from this magnet detection element; and a pole-piece made of magnetic material for guiding the magnetic flux output from the permanent magnet 21 (or flowing to the permanent magnet 21) to the magnet detection element, which are embedded in synthetic resin or plastic.

This kind of sensor 23 is formed at a portion closer to the tip end (left end in FIG. 18), and it comprises: a column-shaped insert section 24 that can be snugly inserted inside the insertion hole 22, and an outward facing flange-shaped edge section 25 that is formed around the base end (right end in FIG. 18) of the insert section 24. There is a fitting groove formed around the outer peripheral surface in the middle of the insert section 24 and an O-ring 26 fits in this fitting groove.

On the other hand, a fitting cylinder 28 is formed through part of the outside surface of the cover 16 (the surface that is on opposite side from the space 27 where the rolling elements 14 are located, or the right side surface in FIG. 18) in the section around the opening of the insertion hole 22. When the insert section 24 is inserted inside the fitting cylinder 28 and the flange-shaped edge section 25 comes in contact with the tip end surface of the fitting cylinder 28, the sensor 23 is connected to and supported by this fitting cylinder 28 by a fitting spring 29. A connection and support structure using this kind of fitting spring 29 is disclosed in detail in Japanese Patent Publication No. Tokukai Hei 11-23596, and since it is not related to this invention, a detailed drawing and explanation have been omitted.

When using the rolling bearing unit 1 with rotation-speed sensor device described above, the second flange 13 that is formed around the outer peripheral surface of the outer race 4 is connected to and supported by the suspension by bolts (not shown in the figure), and the wheel is fastened by studs 30 to the first flange 7 that is formed around the outer peripheral surface of the hub 5, the studs 30 being provided in the first flange 7, and the wheel is supported so as to rotate freely with respect to the suspension. In this state, as the wheel rotates, the N pole and S pole that are located on the inside surface of the permanent magnet 21 alternately pass by the area near the end surface of the detection section of the sensor 23. As a result, the direction of the magnetic flux flowing inside the sensor 23 changes, and the output of the sensor 23 changes. The frequency at which the output of the sensor 23 changes in this way is proportional to the rpm of the wheel. Therefore, by sending the output from the sensor 23 to a controller (not shown in the figures), it is possible properly control the ABS or TCS.

Moreover, in the case of a second example of prior art construction that is disclosed in Japanese Patent Publication No. Tokukai Hei 11-23596, a cylindrical section 31 is formed on the inside end of the hub 5, and a crimped section 34 is formed on the tip end of this cylindrical section 31 by crimping a portion of the tip end that protrudes from the inside surface of the inner race 6 outward in the radial direction, and the inner race 6 is fastened to the hub 5 by this crimped section 34. By using this kind of construction, in comparison with the construction of fastening the inner race 6 to the hub 5 with a nut 15 as in the case of the first example of prior art construction shown in FIG. 18, it is possible to reduce the cost by reducing the number of parts and the amount of work necessary for assembly. In the case of the second example of prior art construction shown in FIG. 19, the construction of the part that connects and supports the sensor 23 in the fitting cylinder 28, which is formed in the main piece 17 of the cover 16, by the fitting spring 29, is different than in the case of the first example described above. The construction of connecting and supporting using a fitting spring 29 is also described in detail in Japanese Patent Publication No. Tokukai Hei 11-23596, and since it is also not related to this invention, detailed drawings and explanation are omitted.

Moreover, in the case of the second example of prior art construction, the encoder 19 is also different than that of the first example. That is, the encoder 19 is formed generally into an annular shape by bending magnetic metal sheet such as carbon steel plate in an L-shaped cross section such that a circular-ring section 32 is formed. A plurality of penetrating holes 33 is formed in this circular-ring section 32 in order that the magnetic characteristics of this circular-ring section 32 change alternately at equal intervals around the circumferential direction. To correspond with this, the internal construction of the sensor 23 is also different than that the first example.

The prior art construction shown in FIG. 18 and FIG. 19 is such that the detection signal from either of the sensors 23 is sent to a controller located on the automobile chassis side via a harness 35. On the other hand, construction of sending the detection signal from the rotation-speed detection sensor to a controller on the automobile chassis side via wireless transmission is disclosed in Japanese Patent Publication No. Tokukai 2001-151090. In other words, with a transmitter unit for wireless transmission of the detection signal located around the outer peripheral surface of the stationary or outer race next to the rotation-speed detection sensor, there is no need for a harness for transmitting this detection signal. In addition, with this kind of construction, together with preventing trouble due to harness wires that are cut by flying rocks or the like, it is possible to do away with the need for the harness and the work of wiring the harness, thus making it possible to reduce the weight and cost of the apparatus.

In the case of the prior art construction disclosed in Japanese Patent Publication No. Tokukai 2001-151090, no special consideration has been taken for detecting whether or not there is an error in the rotation-speed detection sensor or the transmitter unit located in the rolling-bearing unit for supporting the wheel to prevent faulty operation of the ABS or TCS. On the other hand, by using construction in which the detection signal is sent wirelessly, there are more causes for erroneous detection signal than with construction using a harness, such as maintaining power for transmission. Also, in the case of new construction for performing wireless transmission, it is not possible to use the prior art construction of using a harness for signal and power transmission as is.

The double row rolling bearing with a sensor unit is effective for detecting a rotating speed of a wheel, a rotating shaft or the like, and a state of the double row rolling bearing (temperature, oscillation or the like) so as to judge existence/inexistence of error or abnormality in the double row rolling bearing portion.

On the other hand, with the double row rolling bearing widely used in order to rotatively support a rotating member such as a wheel to a fixed member such as a suspension system, there has been suggested that rotating speed or vibration of the rotating member such as a wheel is detected by providing a rotating speed sensor or an acceleration sensor to the double row rolling bearing, part of which has been carried out in practice. For example, as shown in FIGS. 38 and 39, Japanese Utility Model Publication No. Jitsukai Hei 5-12744 (Utility Model Registration No. 2543369) describes a structure in which an acceleration sensor 2 and a rotation detection sensor 3 are installed into a double row rolling bearing 1. Moreover, Japanese Patent Publication No. Tokuhyo 2001-500597 (Specification of U.S. Pat. No. 6,161,962) also describes a similar structure.

In the case of the conventional structure described in Japanese Utility Model Publication No. Jitsukai Hei 5-12744, an inner race 7 is rotatively supported to an inner diameter side of an outer race 5 via a plurality of rolling elements 8 between them. Double row inner-ring raceways 6 are provided on an outer peripheral surface of the inner race 7. Double row outer-ring raceways 4 are provided on an inner peripheral surface of the outer race 5. A circular ring 10 to be detected is externally fitted to an end portion of the inner race 7. The acceleration sensor 2 and the rotation detecting sensor 3 are held in a cover 9 mounted to an opening at the end portion of the outer race 5, and the rotation detecting sensor 3 has a detecting section which is opposed to the ring 10 to be detected.

With respect to the acceleration sensor 2 and the rotation detecting sensor 3, a detecting signal of the acceleration sensor 2 is utilized for obtaining vibration generated on the double row rolling bearing 1 so as to know the end of the lifetime of the double row rolling bearing 1. Moreover, a detecting signal of the rotation detecting sensor 3 is utilized for obtaining rotating speed of the wheel supported by the double row rolling bearing 1 so as to control an antilock brake system (ABS) and a traction control system (TCS).

The structures shown in FIGS. 38 and 39 relate to a double row rolling bearing for an automobile, but in the case of a double row rolling bearing for a rolling stock, a running speed is obtained and another state values such as temperature can be detected. The running speed is necessary for making skidding control for preventing a wheel from being worn unevenly, and the temperature is necessary for preventing the double row rolling bearing from being seized. For this reason, a rotating and supporting system with a sensor for a rolling stock shown in FIGS. 40 and 41 has been conventionally known.

In a state that a wheel, not shown, is supported to be fixed, an axle 11 which rotates at the time of use is rotatively supported to an inner diameter side of a bearing housing 12 which does not rotate at the time of use by a double row rolling bearing 1. The double row rolling bearing 1 is a double row tapered roller bearing and it has an outer race 5 and an inner ring 7 which are arranged coaxially, and a plurality of rolling elements 8 which are tapered rollers. The rolling elements 8 are provided between a double row outer-ring raceway 4 formed on an inner peripheral surface of the outer race 5 and a double row inner ring raceway 6 formed on an outer peripheral surface of the inner ring 7 so as to be freely rolling in a state that they are retained by a retainer 13.

The outer race 5 in the double row rolling bearing 1 is internally retained to the bearing housing 12. Meanwhile, the inner race 7 comprises a pair of inner ring elements 14 and a spacer such that the spacer 15 is axially sandwiched between the pair of inner ring elements 14a, 14b, and the inner ring 7 is externally fitted to a portion closer to one end (left end in FIG. 40) of the axle 11. Moreover, an annular member 16 which is called as an oil thrower is externally fitted to a portion of the end of the axle 11 which is protruded further than the inner ring element 14a on an axially outer side. Moreover, an inner end surface of the inner ring element 14b on the axially inner side abuts against a stepped surface (not shown) formed in a middle portion of the axle 11 via another annular member (not shown). Therefore, the paired inner ring elements 14a, 14b do not shift to a position which is closer to the center of the axle 11 (right side in FIG. 40) from the state in FIG. 40. A nut 17 which is screwed into an outer end portion of the axle 11 suppresses the annular member 16 towards the outer end surface of the inner ring element 14a on the axially outer side.

In addition, a detected ring or encoder ring 10 is made by a magnetic metal material such as a steel material and entirely formed into a circular shape in a L-shaped section, and fixed to one end surface of the axle 11. Recess sections and land sections are formed on an outer peripheral surface (outer peripheral edge) of the detected ring or encoder ring 10 alternatively with equal intervals in a circumferential direction, such that this outer peripheral surface has a gearing shape. Magnetic characteristics of the outer peripheral surface of the detected ring or encoder ring 10 are changed alternatively with equal intervals in the circumferential direction.

In addition, an opening at one end of the bearing housing 12 is covered by a cover 9 which is formed into a bottomed cylindrical shape by a synthetic resin or a metal material. Moreover, the rotation detecting sensor 3 is inserted into a sensor mounting hole 46 which is formed on a portion of a cylindrical portion 19 of the cover 9 opposed to the outer peripheral edge of the detected ring or encoder ring 10 in a diametrical direction. A detecting section provided on an end surface (lower end surface in FIG. 40) of the rotation detecting sensor 3 is opposed to the outer peripheral edge of the detected ring or encoder ring 10 via a gap.

Meanwhile, a sensor mounting concave hole 20 is formed on a middle portion of the bearing housing 12 and around the outer race 5. A temperature sensor 21 is installed into the sensor mounting concave hole 20.

In the case of the rotating and supporting apparatus with sensor having the above structure, when the detected ring or encoder ring 10 rotates at the time of driving together with the axle 11 to which the wheel is supported and fixed, the portion to be detected, specifically recess sections and land sections of the detected ring or encoder ring 10 pass alternatively through a vicinity of the detecting section provided on the end surface of the rotation detecting sensor 3. As a result, the density of a magnetic flux flowing in the rotation detecting sensor 3 changes, so that an output of the rotation detecting sensor 3 changes. A frequency with which the output of the rotation detecting sensor 3 changes in such a manner is proportional to the rotating speed of the wheel. Therefore, when the output of the rotation detecting sensor 3 is transmitted to a controller, not shown, the rotating speed of the wheel can be detected, and skidding of a rolling stock can be controlled suitably.

In addition, when rotational resistance of the double row rolling bearing 1 abnormally rises due to some reason such as skew of the rolling elements 8 and the temperature of the double row rolling bearing 1 rises, the temperature sensor 21 detects the temperature. A temperature signal detected by the temperature sensor 21 in such a manner is transmitted to a controller, not shown, and this controller gives a warning such that a warning lamp provided on a driver's seat is lightened. When such a warning is given, a driver takes a measure such as emergency stop.

In the case of the example of the conventional structure shown in FIGS. 38 and 39, since the acceleration sensor 2 and the rotation detecting sensor 3 are supported to the outer race 5 by way of the cover 9, and the circular detected ring or encoder ring 10 is used, there is a possibility that state values of vibration, rotating speed and the like cannot be always measured accurately.

In addition in the case of the example of the conventional structure shown in FIGS. 40 and 41, since the rotation detecting sensor 3 and the temperature sensor 21 are independent, the mounting work of the sensors 3 and 21 and wiring work of a harness for taking out detecting signals of the sensors 3 and 21 become troublesome.

It can be considered that the structure of the example of FIGS. 38 and 39 is combined with the structure of the second example, namely, the rotation detecting sensor 3 and the temperature sensor 21 are combined so as to form a sensor unit, and the sensor unit is installed to the cover 9. However, in this case, consideration is required in order to effectively detect a temperature by mean of the temperature sensor 21.

The publication of Japanese Patent No. 2838701 describes a structure as shown in FIG. 42, in which a rotation detecting sensor 3 is fixed directly to an outer race 5, and the rotation detecting sensor 3 has a detecting surface (tip end surface) which is directly opposed to a section to be detected (outer peripheral edge) of a detected ring or encoder ring 10 externally fixed to a middle portion of an inner ring 7. However, in the example of the conventional structure described in the publication of Japanese Patent No. 2838701, only detection of a rotating speed of the inner ring 7 is taken into consideration, but vibration which is generated in the portion of double row rolling bearing 1 and measurement of the temperature of the portion of double row rolling bearing 1 are not taken into consideration.

SUMMARY OF THE INVENTION

In consideration of the problems described above, an object of this invention is to provide a rotation-speed sensor device that has construction for performing wireless transmission and that is capable of preventing faulty operation of the ABS or TCS.

The present invention is devised in order to solve the above problems and it is an object of the present invention to provide a double row rolling bearing with a sensor unit which is capable of accurately measuring two or more different kinds of state values such as rotating speed, vibration and temperature.

DESCRIPTION OF THE PREFERRED EMBODIMENTS

The rotation-speed sensor device of the present invention comprises, like the conventional rotation-speed sensor device as explained above, an encoder which is supported by a rotating race of the rolling bearing unit for supporting the wheel, concentric with the rotating race, such that the characteristics of the detected section or encoder alternatively changed in the circumferential direction, and a rotation detection sensor supported by a not-rotating section such that its detection section faces the detected section or encoder. The detection signal of the rotation detection sensor is sent by way of wireless-transmission to a controller provided on the chassis side.

Particularly, the rotation-speed sensor device according to the present invention is provided with a self-diagnosis circuit to determine whether there is any problem or abnormality in detecting the rotation-speed.

Figure 18:
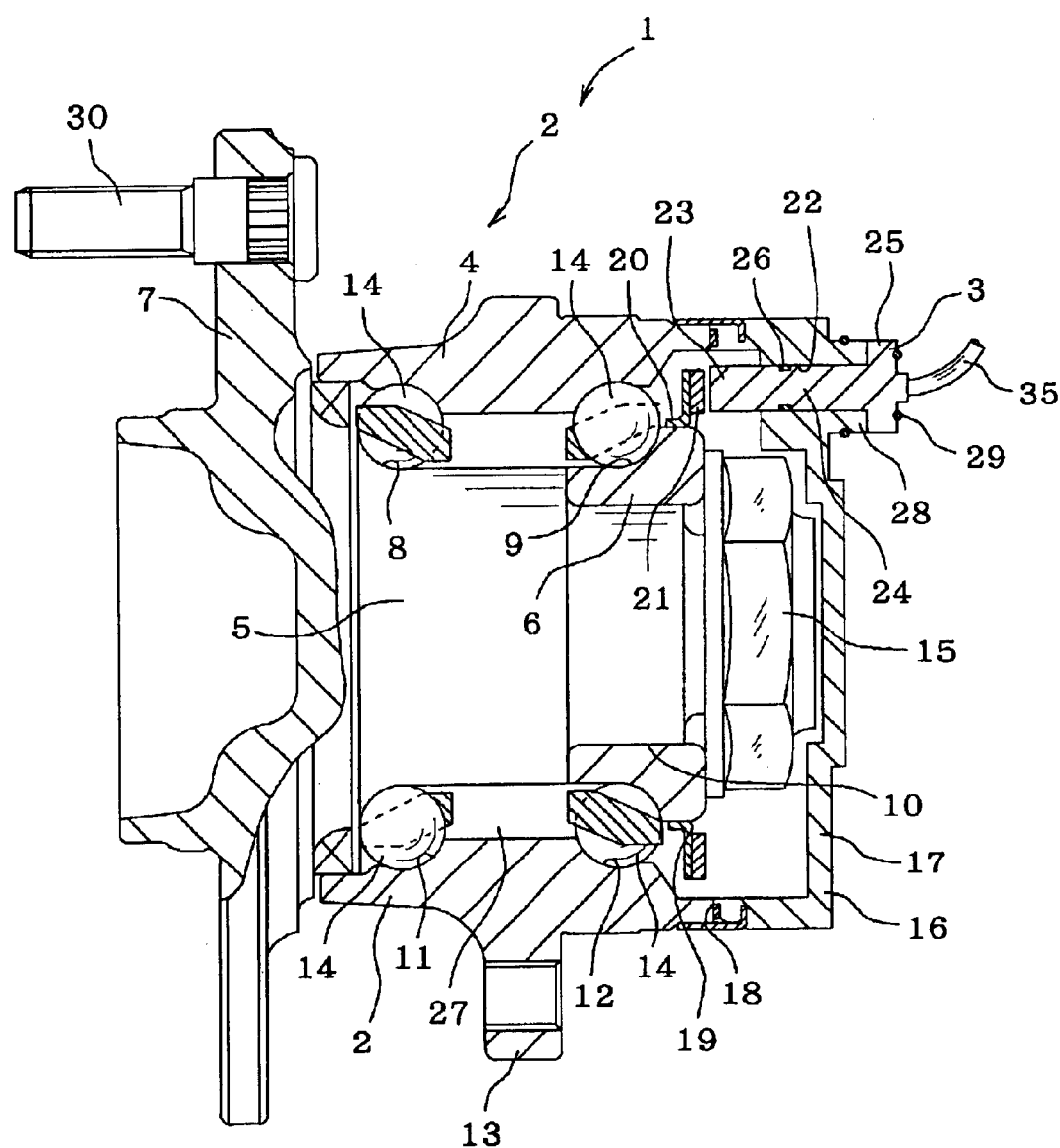
FIG. 18 is a cross sectional view of an example of the conventional rolling bearing unit.
Figure 19:
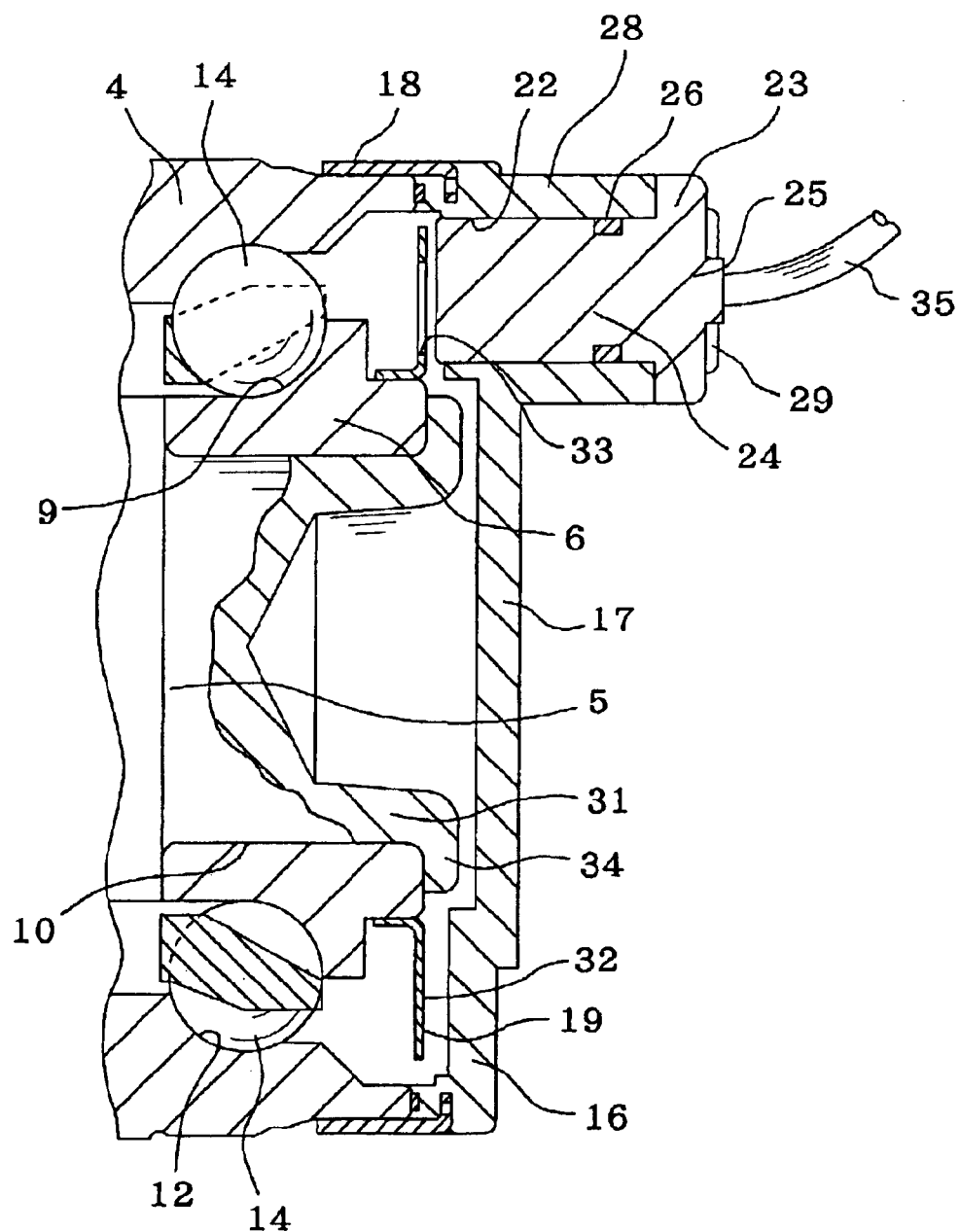
FIG. 19 is a cross sectional view of an example of the conventional rolling bearing unit.

With the rotation-speed sensor device of this invention, the function of detecting the rpm of a wheel supported by the suspension is substantially the same as in the case of the prior art construction shown in FIG. 18 or FIG. 19.

Also, the wireless transmission for detected signals prevents trouble due to harness wires being cut by flying rocks or the like, doing away with the harness itself and the work of wiring it, and reducing the weight and cost of the apparatus as in the case of the prior art construction described in Japanese Patent Publication No. Tokukai 2001-151090.

In the case of the rotation-speed sensor device of this invention, with the self-diagnosis circuit for determining whether or not there is an error or abnormality in detecting the rotation-speed, so it is possible to prevent faulty operation of the ABS or TCS, making it possible for safer operation of the automobile.

Now, the present invention is detailed referring to the attached drawings.

Figure 1:
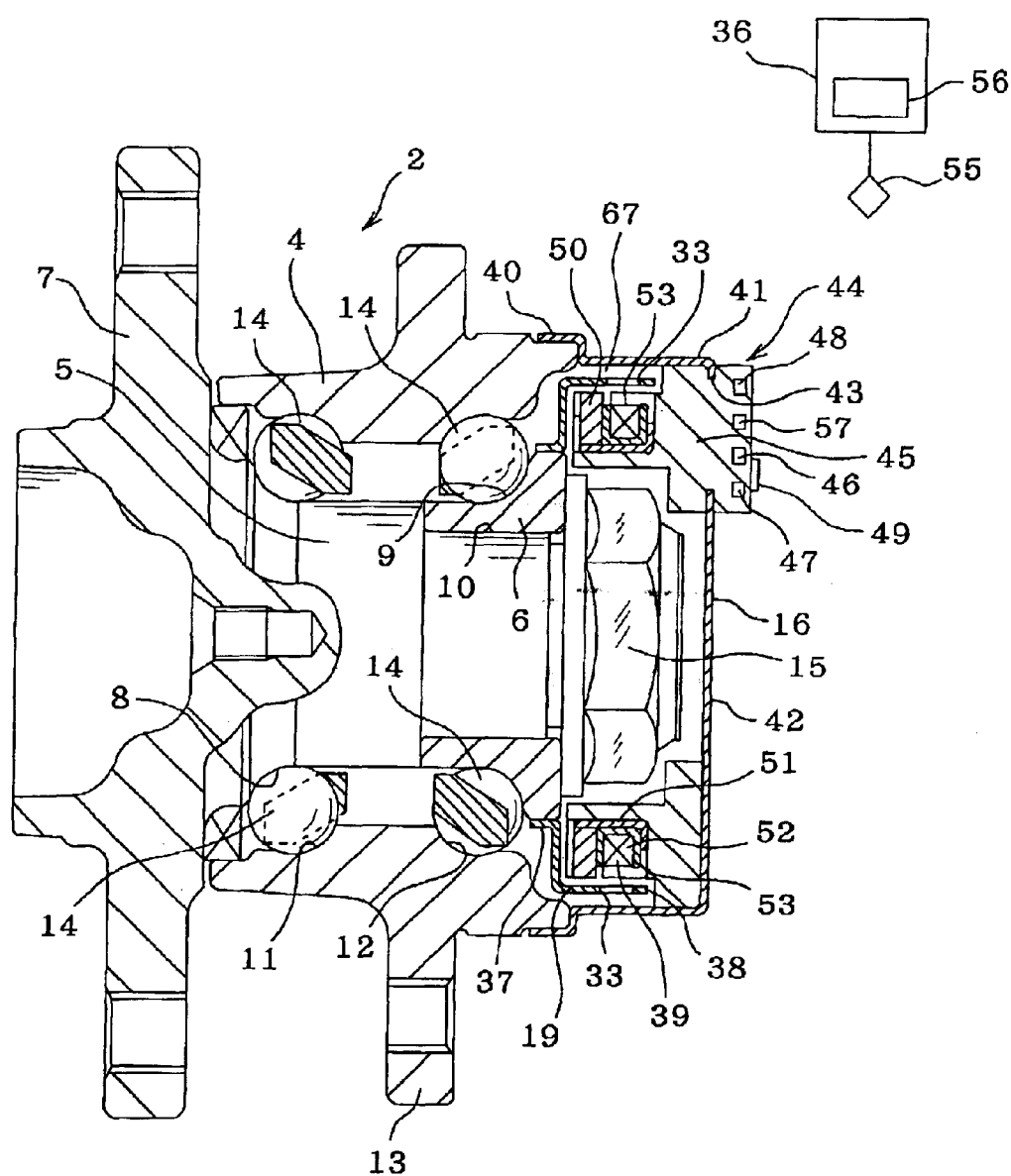
FIG. 1 is a cross sectional view of a rolling bearing unit incorporating a rotation-speed sensor device of a first example of the embodiment according to the present invention
Figure 2:
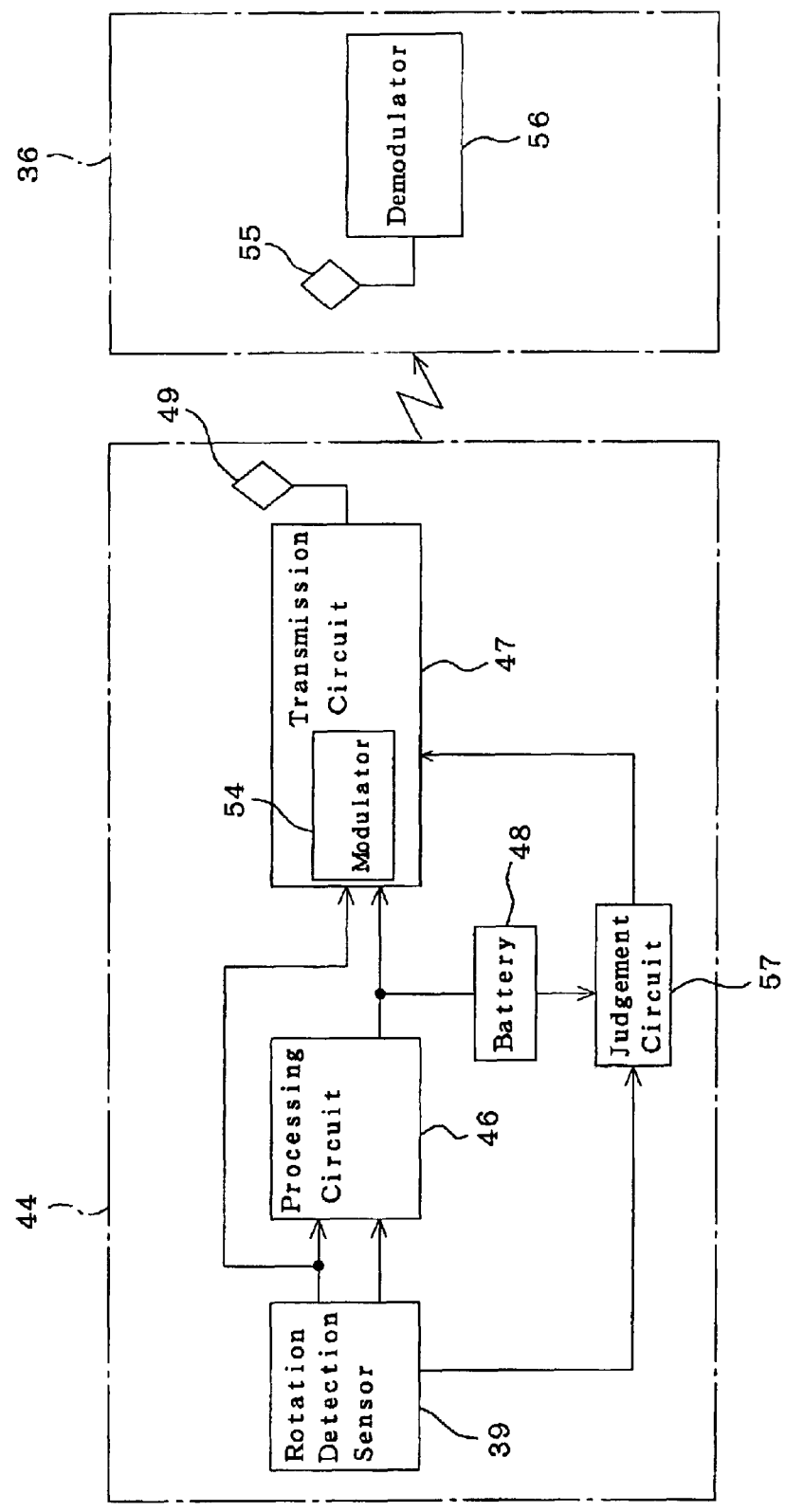
FIG. 2 is a block diagram to show a signal transmission arrangement of the first embodiment in the present invention.
Figure 3:
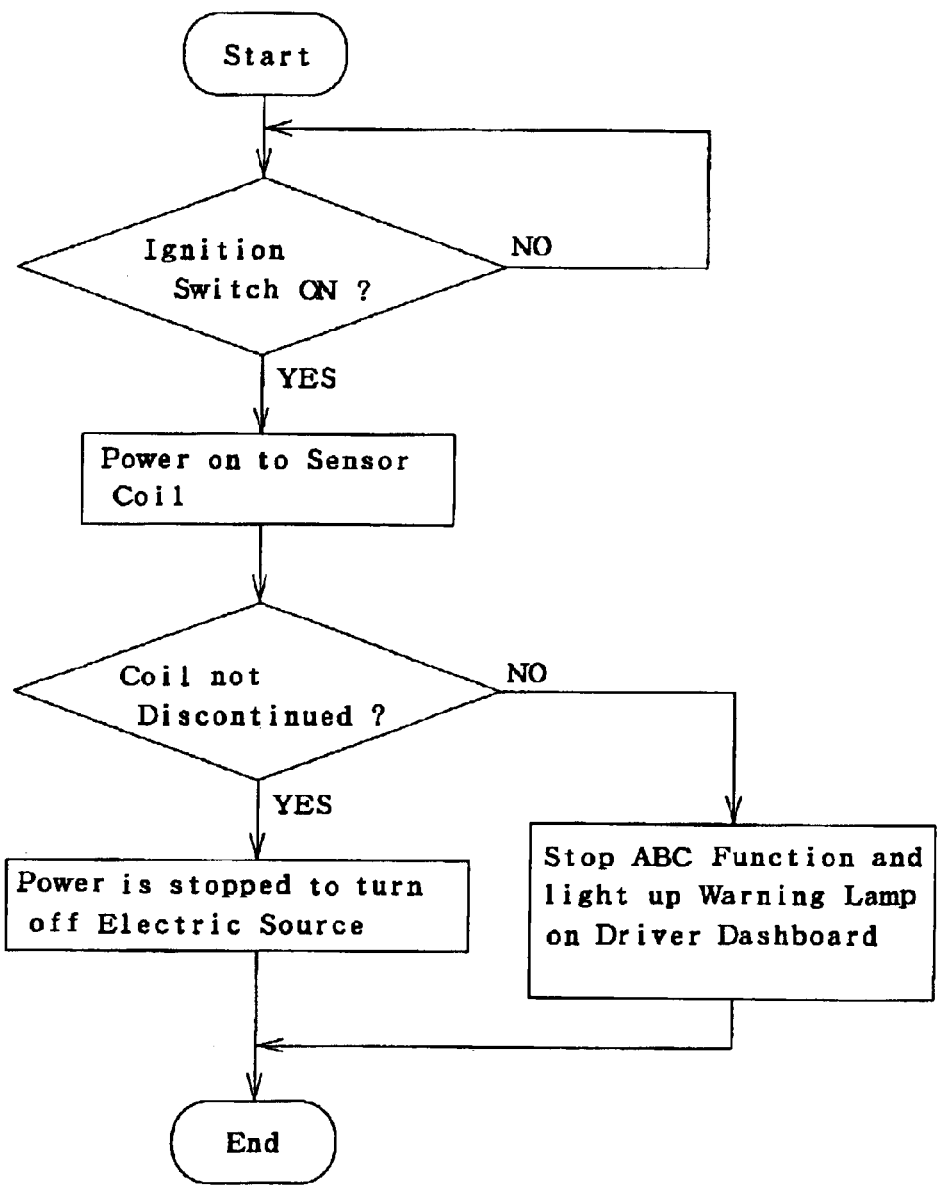
FIG. 3 is a flow chart to show a sequence to judge errors according to the present invention.

FIGS. 1 to 3 show a first example of the embodiment of the invention. This invention is characterized by detecting the rpm of the hub 5 and inner race 6, which form the rotating race, then wirelessly transmitting a signal that represents that detected value, to a controller 36 that is located on the automobile chassis side, and finally determining whether or not there is any problem in detecting the rotation-speed. The construction and function of the rolling-bearing unit 2 for supporting the wheel with respect to the suspension is substantially the same as the conventionally known construction including the prior art construction shown in FIG. 18, so an explanation of it will be omitted or simplified here. The following explanation will center on the parts that are features of this invention.

The inner race 6 fits around a stepped section 10 that is formed around the inside end of the hub 5 and is held in place against the hub 5 by a nut 15, to form the rotating race together with the hub 5, and an encoder 19 is fastened around the inside end of the inner race 6. In this case, this encoder 19 is formed into a circular-ring shape having a crank-shaped cross section by bending magnetic metal sheet, and it comprises a cylindrical section 37 on the inner-diameter side, and a cylindrical section 38 on the outer-diameter side, which are concentric with each other. Also, of these, a plurality of slit-shaped penetrating holes 33 that are long in the axial direction are formed in the radially outer cylindrical section 38 such that they are located at equal intervals around in the circumferential direction. Accordingly, the magnetic characteristics of the inner peripheral surface of the outer cylindrical section 38, which is the detected surface of the encoder 19, alternately changes at equal intervals around in the circumferential direction.

In this example, the encoder 19 can be any encoder whose magnetic characteristics alternately change at equal intervals around in the circumferential direction, for example a cylindrical permanent magnet arranged such that the S pole and N pole alternate at equal intervals around the inner peripheral surface, or an encoder made of magnetic metal formed such that the inner peripheral surface is provided with a gear-like land and recess shape. In this case, the construction of the rotation detection sensor 39 (described later) must be changed to correspond to the different encoder shape. In other words, when using an encoder having a permanent magnet, there is no need to install a permanent magnet in the rotation-speed detection sensor 39, however, when using an encoder 19 made from magnetic material, it is necessary to install a permanent magnet on the sensor side to be the generating source of the magnetic flux.

On the other hand, a cover 16 is made by plastically deforming magnetic material such as steel plate into a cylindrical shape with a bottom, and the opening end of the cover 16 fits over and covers the opening on the inside end of the stationary outer race 4. In other words, this cover 16 comprises a cylindrical section 41 that is formed with a large-diameter section 40 on the opening end, and a bottom section 42 that covers the opening on the inside end of the cylindrical section 41. In addition, a sensor unit 44 is held in the through hole 43 that is formed in part of the bottom section 42 such that there is no space between it and the cover 16.

This sensor unit 44 comprises a rotation detection circuit 39, processing circuit 46, transmission circuit 47, battery 48, judgment circuit 57 that are embedded and held inside a holder 45 made of synthetic resin or plastic, and a transmission antenna 49 on the inside end surface thereof. Of these, the processing circuit 46 is a rectifier-smoothing circuit for processing part of the detection signal from the rotation detection sensor 39 to obtain a DC current. In other words, the processing circuit 46 rectifies part of the sinusoidal output signal (AC signal) from the rotation detection sensor 39 as the encoder 19 rotates, to obtain DC current for operating the transmission circuit 47 and for recharging the battery 48. This is further detailed hereinafter.

In the case of this invention, communication between the sensor unit 44 and the controller located on the automobile chassis side is assumed to be performed wirelessly. Also, in this example, self-diagnosis is performed in the sensor unit 44 to determine whether the operation of the sensor unit 44 is appropriate. Of these, power for the wireless communication is from the rotation detection sensor 39 and power for self-diagnosis is from the battery 48, however, the power source for the transmission circuit 47 is a DC power source. Moreover, in order that the battery life is not all used up between periodic inspections, a rechargeable battery such as a nickel-hydride battery or nickel-cadmium battery is used as the battery 48.

On the other hand, in this example, a passive-type sensor that generates power as the encoder 19 rotates is used as the rotation detection sensor 39. In other words, the rotation detection sensor 39 that is assembled in the construction of this embodiment comprises a ring-shaped permanent magnet 50 that is magnetized in the radial direction, a yoke 51 made by forming magnetic metal sheet such as carbon steel plate into a circular shape having J-shaped cross section, and a coil 52 that is located in the portion that is surrounded by the yoke 51 and permanent magnet 50. The radially inner periphery of the yoke 51 faces and comes in contact with or comes close to the inner peripheral surface of the permanent magnet 50, and the radially outer periphery of the yoke 51 faces and comes close to the inner peripheral surface of the radially outer cylindrical section 38 of the encoder 19.

Also, a plurality of penetrating holes 33 are formed around the radially outer cylindrical section 38, and the same number of notches 53 are formed in the part near the radially outer periphery of the yoke 51 such that they are spaced in the circumferential direction with uniform pitch. Accordingly, the radially outer periphery of the yoke 51 is formed into a tooth shape. With this kind of construction, the time when a large magnetic flux flows in the yoke 51 as the encoder 19 rotates, and the time when only a small magnetic flux flows alternate, and alternating current is generated in the coil 52.

In this example, part of the alternating current or output signal of the rotation detection sensor 39 that is generated in the coil 52 in this way is processed by the processing circuit 46 to obtain direct current. The direct current that is obtained in this way operates the transmission circuit 47 and recharges the battery 48. When necessary, a required amount of DC power from the battery 48 can be sent to the transmission circuit 47 and used for operating the transmission circuit 47. In other words, in addition to functioning as a sensor for obtaining a signal for detecting the rpm of the wheel, the rotation detection sensor 39 also functions as a generator for supplying power for operating the transmission circuit 47 and the judgment circuit 57 to be described later.

Moreover, the remaining portion of the output signal from the rotation detection sensor 39 does not pass through the processing circuit 46 but is sent directly to the transmission circuit 47. Also, this transmission circuit 47 uses the output signal from the rotation detection sensor 39 to modify the carrier wave with a modulator 54, to obtain a modulated wave that can be sent wirelessly. The transmission antenna 49 sends the modulated wave to the receiving antenna 55 leading to the controller 36 located on the automobile chassis side. The signal received by the receiving antenna 55 is demodulated by a demodulator 56 that is located in the controller 36 and restored to a signal expressing the rpm, and then used for ABS or TCS control. The transmission antenna 49 is held and supported by the inside end surface of the synthetic resin or plastic holder 45 that is exposed to the outside from the cover 16. Therefore, the electric waves that are sent from the antenna 49 are not obstructed (shielded) by the cover 16, which is made of steel sheet such as SPCC that shields electric waves. Also, the antenna 49 and cover 16 are insulated from each other. As a result, transmission from this antenna 49 to the receiving antenna 55 can be performed efficiently.

Furthermore, the judgment circuit 57 performs a function diagnosis of the rotation detection sensor 39 based on the DC power that is supplied from the battery 48 to determine whether or not the coil 52 or the wire between the coil 52 and the antenna 49 is broken. In other words, as shown in FIG. 3, when the ignition switch is turned ON to start the automobile, the judgment circuit 57 starts when the judgment-start-instruction signal sent from the antenna 55 on the side of controller 36 is sent to the antenna 49 on the side of sensor unit 44. The judgment circuit 57 diagnoses the function of the rotation detection sensor 39 by sending a current to the coil 52 and monitoring the conduction state. Also the judgment circuit 57 sends a signal expressing the diagnosis results to the antenna 55 on the side of controller 36 from the antenna 49 on the side of sensor unit. Then, based on the diagnosis results, the controller 36 determines whether or not the signal sent from the rotation detection sensor 39 after the start of the automobile is used for ABS or TCS control.

In this case, when it is determined that the coil 52 and the wire between the coil 52 and the antenna 49 are not broken and that the normal signal was sent from the sensor unit 44, the controller 36 stops sending a current (turns the power OFF) to the sensor unit 44 from the battery 48. In this case, ABS or TCS control can be performed normally. On the other hand, when it is determined that the coil 52 or the wire is broken and that the normal signal was not sent from the rotation detection sensor 39, the controller 36 stops the ABS or TCS function and sends an alarm to the driver, such as lighting a warning lamp on the drivers control panel, indicating the need for repairs to the driver. In this case as well, after stopping the ABS or TCS function and sending an alarm, the controller 36 stops the flow of current to the rotation detection sensor from the battery 48 to prevent drainage of the battery 48. When the controller 36 does not receive a signal from the judgment circuit 57, it determines there is a problem, e.g. in the wireless transmission system, so the controller 36 stops ABS or TCS control and sends an alarm as in the case of the trouble in detecting the rotation-speed.

In either case, the intensity of the magnetic field (strength of the transmitted electric waves) from the antenna 49 is kept to below 35 $\mu$V/m at a distance 3 m from the antenna 49. The reason for this is to prevent interference in a limited frequency range. In other words, even when using weak electric waves that are not regulated by laws governing the use of electric waves, the frequency range that can be used is limited by cost and efficiency.

Also, in addition to using a limited frequency range to prevent interference between the four rotation-speed sensor devices that are installed in the four wheels of the automobile, it is necessary to prevent interference between rotation-speed sensor devices that are installed in other automobiles that could be nearby. Preventing interference between the four rotation-speed sensor devices that are installed in one automobile can be accomplished by changing the frequencies of the carrier waves for the four rotation-speed sensor devices, however, preventing interference with other automobiles cannot be accomplished by changing the frequencies because it is not possible to know what frequencies a nearby automobile might be using. Therefore, it is necessary to shorten the transmission distance of the electric waves that are sent from the antenna 49 so that the electric waves transmitted from the antenna 49 do not reach a receiving antenna 55 of a nearby automobile. Taking this into consideration, in this embodiment, the intensity of the magnetic field is kept below 35 $\mu$V/m at a distance 3 m from the antenna 49, making it possible to prevent interference nearby automobiles.

Also, the processing circuit 46, transmission circuit 47 and judgment circuit 57 are integrated onto an IC (IC package, or IC bare chip) and each IC chip (or all of the circuits 46, 47 and 57 together) is embedded and into the holder 45 during injection molding of the holder 45. The rotation detection circuit 39, processing circuit 46, transmission circuit 47, judgment circuit 57, battery 48 and antenna 49 are electrically connected together before injection molding of the holder 45. Therefore, components 46, 47, 57, 48 of the sensor unit 44 covered and sealed by the synthetic resin or plastic of the holder 45, making them completely watertight. Moreover, the tip end half of the sensor unit 44 (left half in FIG. 1) and the encoder 19 are arranged inside the sealed space 67 shielded from the outside by the cover 16. Therefore, it is possible to effectively prevent magnetic foreign matter from adhering to the encoder 19 and causing trouble such as a decrease in accuracy of rpm detection.

On the other hand, the base end of the sensor unit 44 (right end in FIG. 1) is located on the outside of the sealed space 67 with respect to the bottom plate of the cover 16. Also, the processing circuit 46, transmission circuit 47, judgment circuit 57 and battery 48 are embedded and held inside the base of the sensor unit 44. Therefore, a rise in temperature of the processing circuit 46, transmission circuit 47, judgment circuit 57 and battery 48 is limited, and it becomes easy to secure the durability of the processing circuit 46, transmission circuit 47, judgment circuit 57 and battery 48 that are electrical parts whose thermal resistance is difficult to maintain.

Figure 9:
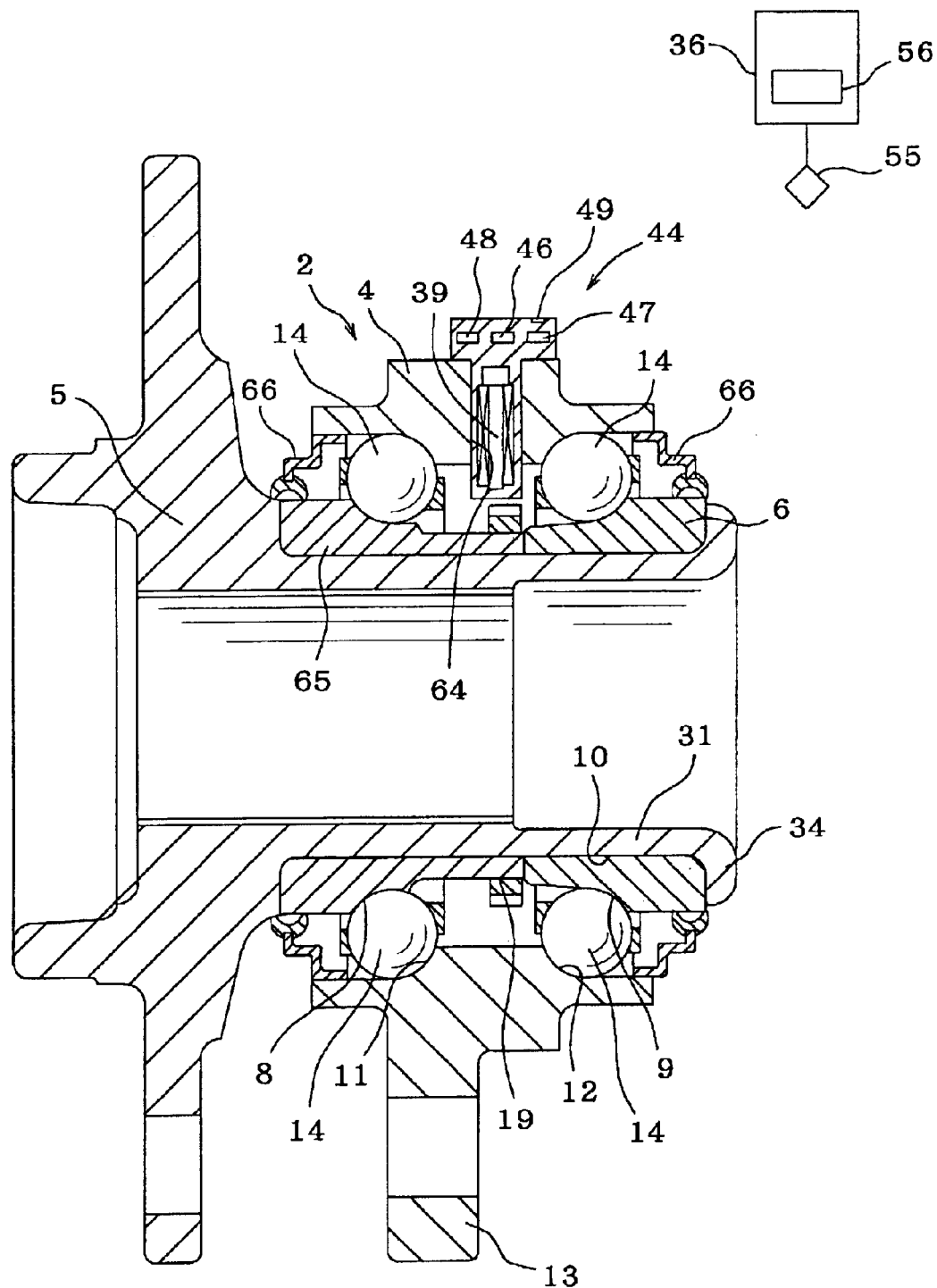
FIG. 9 is a cross sectional view of a rolling bearing unit incorporating a rotation-speed sensor device of a fourth example of the embodiment according to the present invention.

Particularly, in the construction where the sensor unit 44 is installed in the inside end of the rolling-bearing unit 2 as in this embodiment, the location of the sensor unit 44 is further separated from the heat producing components (disk rotor or brake drum) of the braking apparatus (not shown in the figure), which are located on the outside in the radial direction of the rolling-bearing unit 2, than in the construction where the sensor unit is installed in the center in the axial direction of the rolling-bearing unit as shown in the fourth embodiment in FIG. 9. Therefore, it is possible to keep the operating temperature of the sensor unit 44 low, and it becomes easy to secure the durability of the electrical components assembled in the sensor unit 44.

Also, in the case of this example, the processing circuit 46, transmission circuit 47, judgment circuit 57 and battery 48 are located on the inside end of the sensor unit 44 on the inside surface in the axial direction of the bottom plate 42 out of the cover 16. Therefore, the cover in which the prior art passive-type rotation detection sensor was mounted can be used as this cover 16 without making changes, and it is possible to install the sensor unit 44 having the construction of this example as is in this cover.

In this example, a passive-type sensor is used as the rotation detection sensor 39, and a power-generation function has been given to this rotation detection sensor 39. On the other hand, it is possible to install an active-type rotation detection sensor in addition to this passive-type sensor, and install this active-type rotation detection sensor within the sensor unit and use only the power-generation function of this passive-type sensor. In other words, the active-type sensor performs rotation detection, and the passive-type sensor is used as a generator for obtaining power for operating the active-type sensor, transmission circuit 47 and judgment circuit 57. In this case, even when the rpm of the wheel and the amount of power generated by the passive-type sensor decrease, it is possible to transmit a signal indicating the rpm detected by the active-type sensor, so as to detect rpm even for lower rpm. When the power generated by the passive-type sensor decreases, the transmission circuit 47 is driven by power supplied from the battery 48. In this case, the judgment circuit 57 determines whether the operation of the active-type sensor is proper.

With the rolling-bearing unit with rotation speed sensor device of this example constructed as described above, transmitting the detection signal wirelessly makes it possible to omit the harness 35 used in the prior art construction shown in FIGS. 18 and 19. Therefore, it is possible to prevent the harness wires from breaking due to flying rocks or the like, and to do away with the harness itself and the work to wire it, and thus it is possible to reduce the weight and cost of the bearing unit.

Particularly, in the case of the rolling-bearing unit with rotation speed sensor device of this example, there is a judgment circuit 57, which is a self-diagnosis circuit for determining whether or not there is an error in detecting the rotation-speed, so it is possible to prevent faulty operation of the ABS or TCS, and thus operate the automobile more safely.

Furthermore, in the case of the rolling-bearing unit with rotation speed sensor device of this embodiment, the rotation detection sensor 39, the transmission circuit 47 for wireless transmission of the detection signal detected by the rotation detection sensor 39, the processing circuit 46 for obtaining direct current for operating the transmission circuit 47 and for recharging the battery 48, and the judgment circuit 57 and battery 48 of the self-diagnosis circuit are held in a single holder 45 to make up the sensor unit 44, so in addition to simplifying management of parts and assembly work, it is easy to reduce the number of installation brackets, and to reduce the cost and weight of the sensor unit 44. In other words, each of the components 47, 46, 57, 48 are embedded and held in a single holder 45 to form the sensor unit 44 which is handled as a single component. Installation of the components 47, 46, 57, 48 is completed by just mounting this sensor unit 44 on the bottom plate 42 of the cover 16. Therefore, as described above, it is possible to reduce the cost and weight of the bearing unit.

In the example described above, the case of wireless radio transmission of the signal from the sensor unit to the controller side was explained, however, wireless optic transmission (including infrared rays, and laser beams) or ultrasonic transmission can also be used. In this example, a battery 48 is installed in order to perform self-diagnosis for improving safety before the automobile starts to move (while stopped). In other words, the sensor unit 44 does not generate power while the automobile is stopped, so a battery 48 is necessary for performing self-diagnosis when stopped.

Figure 4:
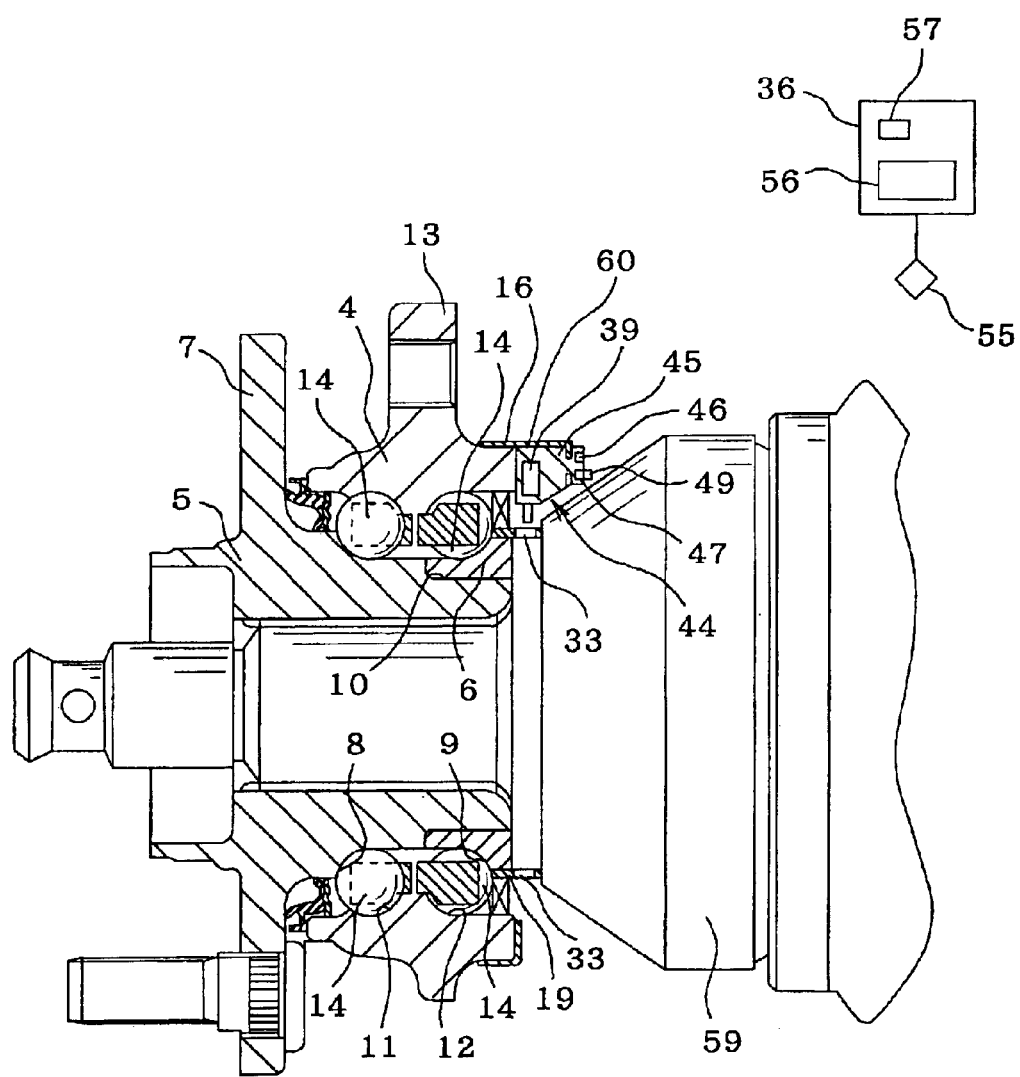
FIG. 4 is a cross sectional view of a rolling bearing unit incorporating a rotation-speed sensor device of a second example of the embodiment according to the present invention.
Figure 5:
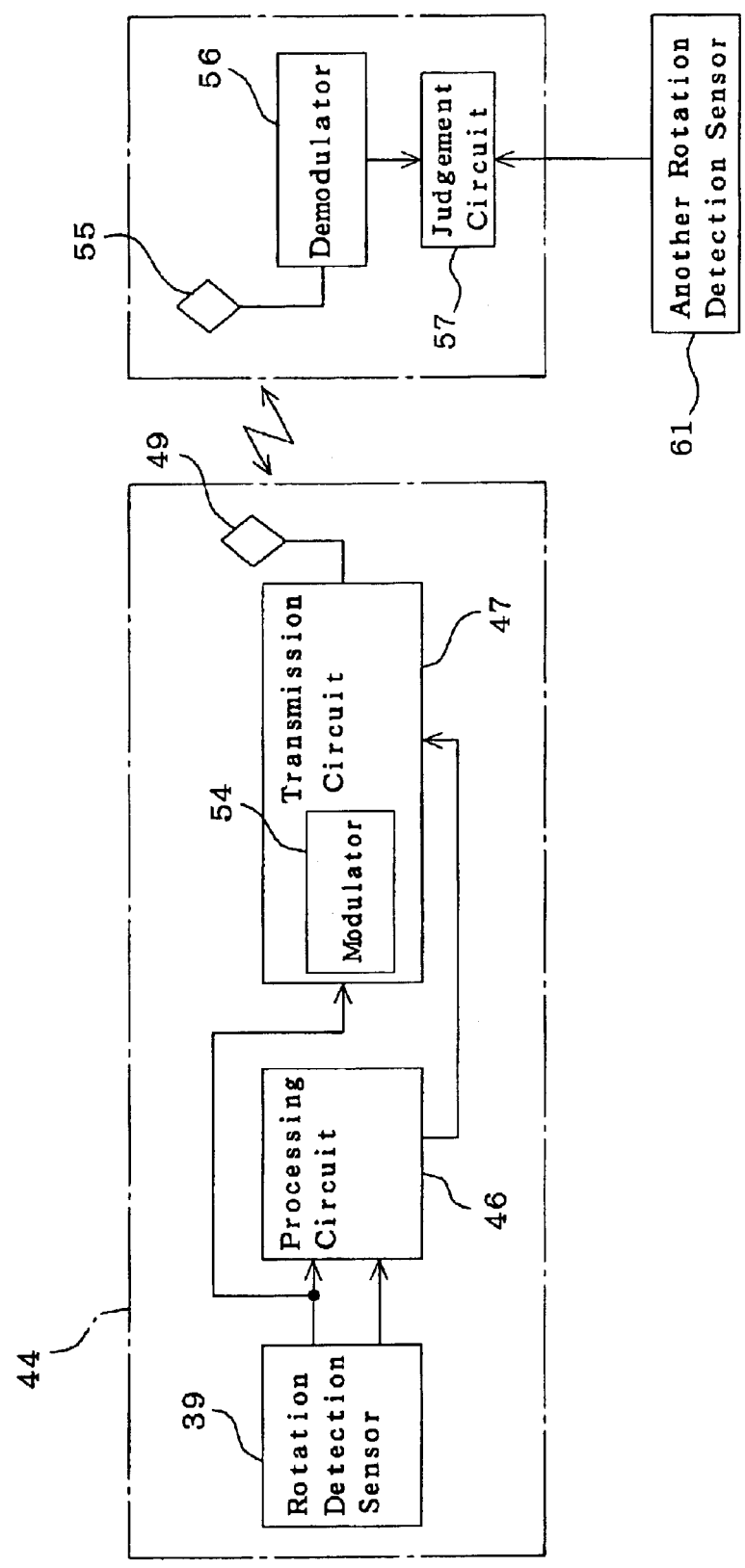
FIG. 5 is a block diagram to show a sequence to judge errors according to the present invention.
Figure 6:
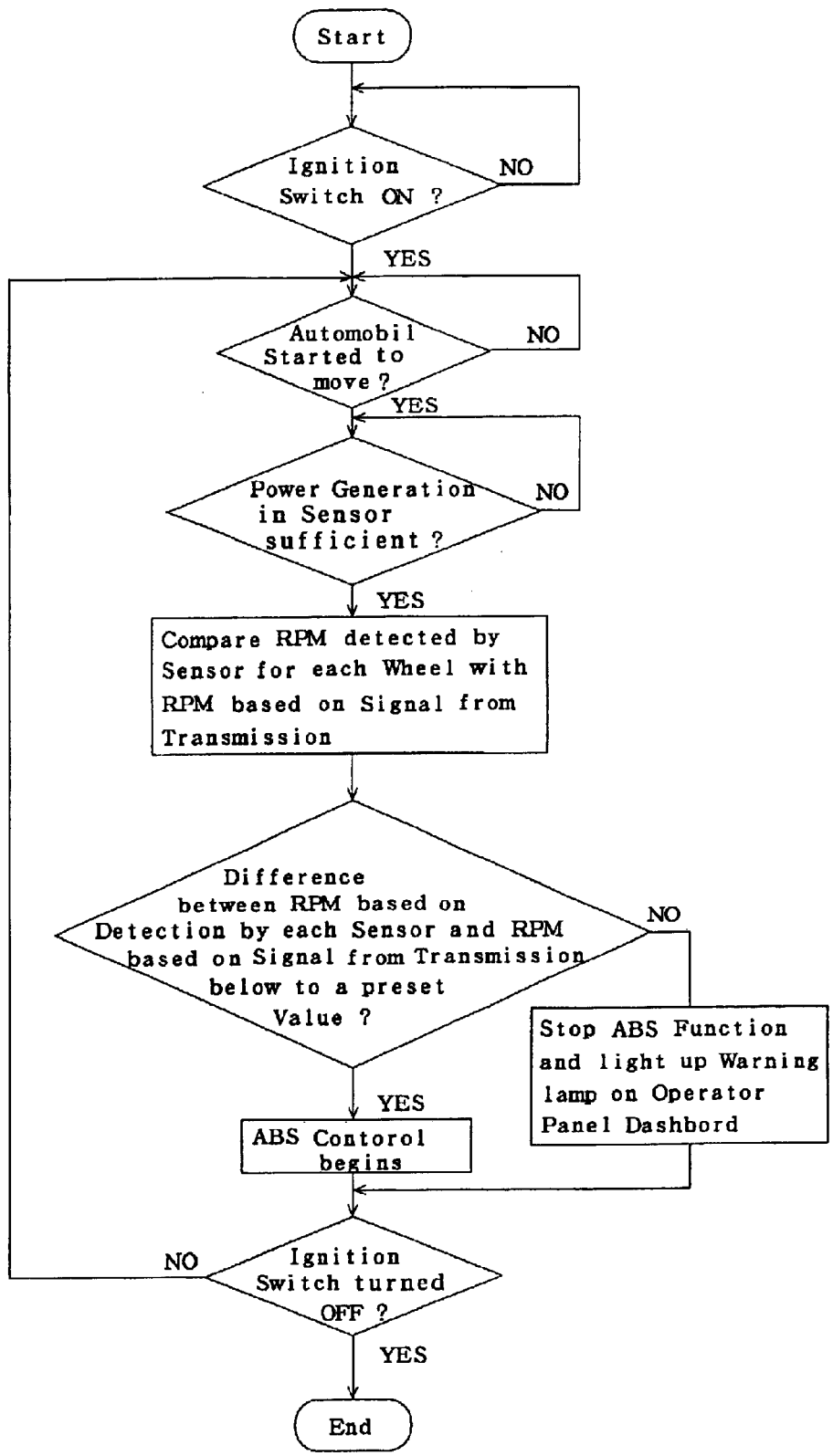
FIG. 6 is a flow chart to show a sequence to judge errors according to the present invention.

Next, FIGS. 4 to 6 show a second example of the embodiment of the invention. In this example, the invention is applied to a rolling-bearing unit for supporting drive wheels. The encoder 19 is formed into a cylindrical shape from magnetic metal sheet such as carbon steel sheet, and the outside end of the encoder 19 is tightly interference-fitted around the inside end of the inner race 6 that fits around the inside end of the hub 5. This hub 5 is rotated and driven by a constant-velocity joint 59. A plurality of slit-shaped penetrating holes 33 are formed on the inside half of this encoder 19 in the section that protrudes from the inner race 6, such that they are evenly spaced around in the circumferential direction, and that the magnetic characteristics around the outer peripheral surface on the inside half of the encoder 19 alternately change at equal intervals around in the circumferential direction.

On the other hand, a cover 16 is formed in a circular ring shape by bending metal sheet, and tightly interference-fitted around the inside end of the outer race 4. A support section 60 is formed in the cover 16 by making an inward bulge in the axial direction in the metal sheet. A sensor unit 44 is held and fastened around part of the circumference of the cover 16 by the support section 60. This sensor unit 44 comprises a rotation detection sensor 39, a processing circuit 46 and a transmission circuit 47 that are embedded in a synthetic or plastic holder 45, and an antenna 49 that is fastened to the inside end surface of the holder 45. Of these, the rotation detection sensor 39 is a passive-type sensor comprising a stator made of magnetic material, a permanent magnet and a coil, so it generates alternate current in the coil as the encoder 19 rotates. This example differs from the first example in that the battery 48 and judgment circuit 57 do not exist in the sensor unit 44. Instead, in this example, there is a judgment circuit 57 located on the side of controller 36. In addition to the signal sent from the rotation detection sensor 39 indicating the rpm of the wheel, a signal is sent and input to the judgement circuit 57 from another rotation detection sensor 61 that is located in the transmission, and the judgment circuit 57 compares the signals from both sensors 39, 61. In this example, as shown in FIG. 6, this judgment circuit 57 determines whether or not there is a problem in detecting the rotation-speed after the automobile starts to move.

In other words, the judgment circuit 57 compares the signal sent from the rotation detection sensor 39 and the signal sent from the other rotation detection sensor 61 after the ignition switch is turned ON and the automobile moves when the output of the rotation detection sensor 39 becomes sufficiently large (for example, when the speed is over 3 km/h) as the speed of the automobile increases. These signals that are transmitted from both sensors 39, 61 both express the speed of the automobile (rpm of the drive wheels). After converting these signals from both sensors 39, 61 to a state in which it is possible to compare them (for example, value expressing the speed of the automobile), the judgment circuit 57 compares them to determine which is larger or smaller. In the case that the difference between these signals from both sensors 39, 61 exceed a pre-specified value (for example, with one of the signals as a reference, the difference between both signals is 20%), the judgment circuit 57 determines there is a problem in detecting the rotation-speed. When the judgment circuit 57 determines that there is a problem, it stops the ABS or TCS function and sends an alarm such as lighting up a warning lamp on the operator's control panel to notify the operator to make repairs. On the other hand, when the judgment circuit 57 determines there is no problem, the ABS or TCS functions as normal. The other construction and functions are substantially the same as those of the first example. This example is of a system that performs self-diagnosis after the automobiles starts moving, so it is possible to use power generated by the sensor unit 44. Therefore, it is not necessary to install a battery in the sensor unit 44, and the cost of the system can be reduced by that amount.

Figure 7:
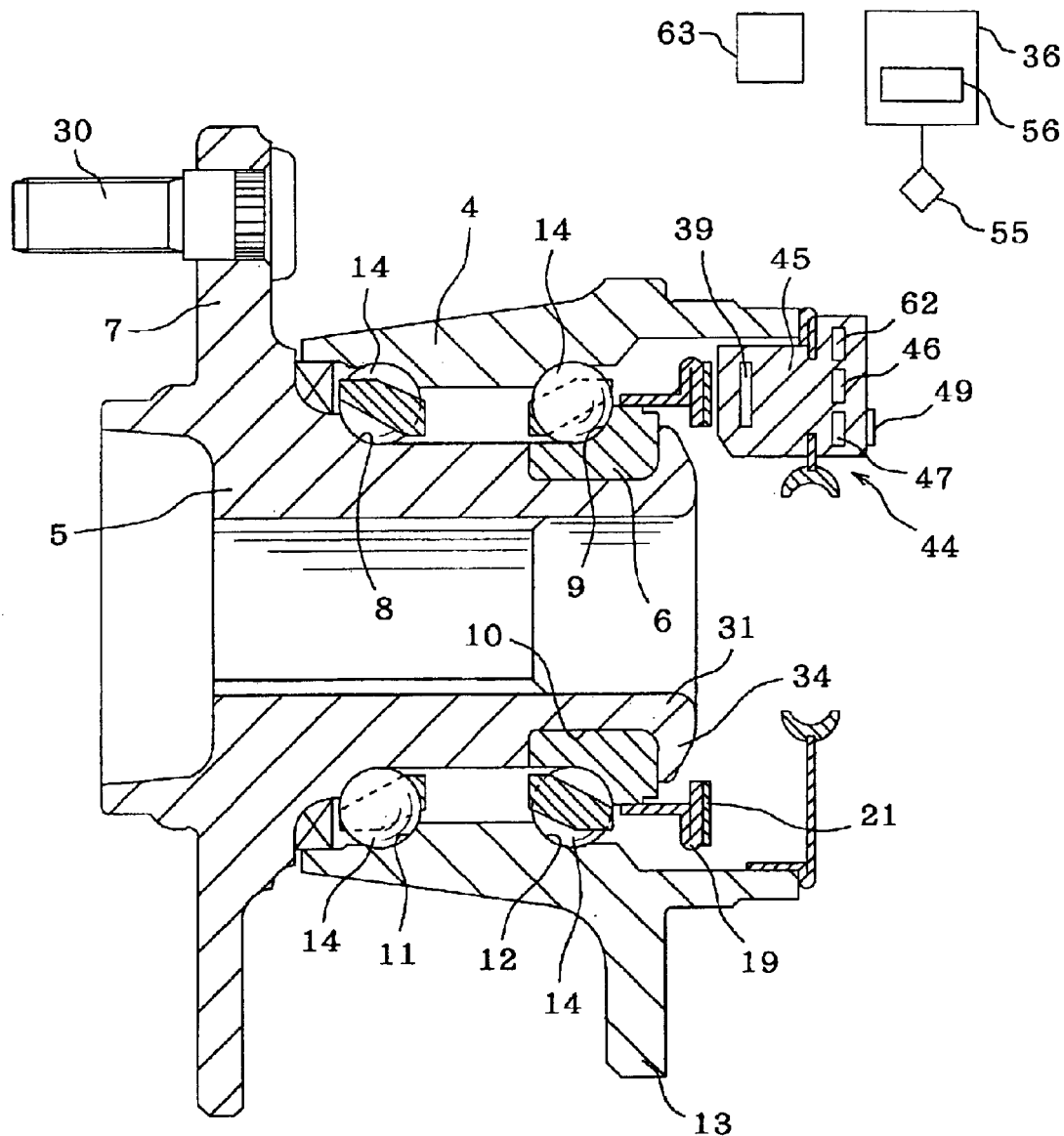
FIG. 7 is a cross sectional view of a rolling bearing unit incorporating a rotation-speed sensor device of a third example of the embodiment according to the present invention.
Figure 8:
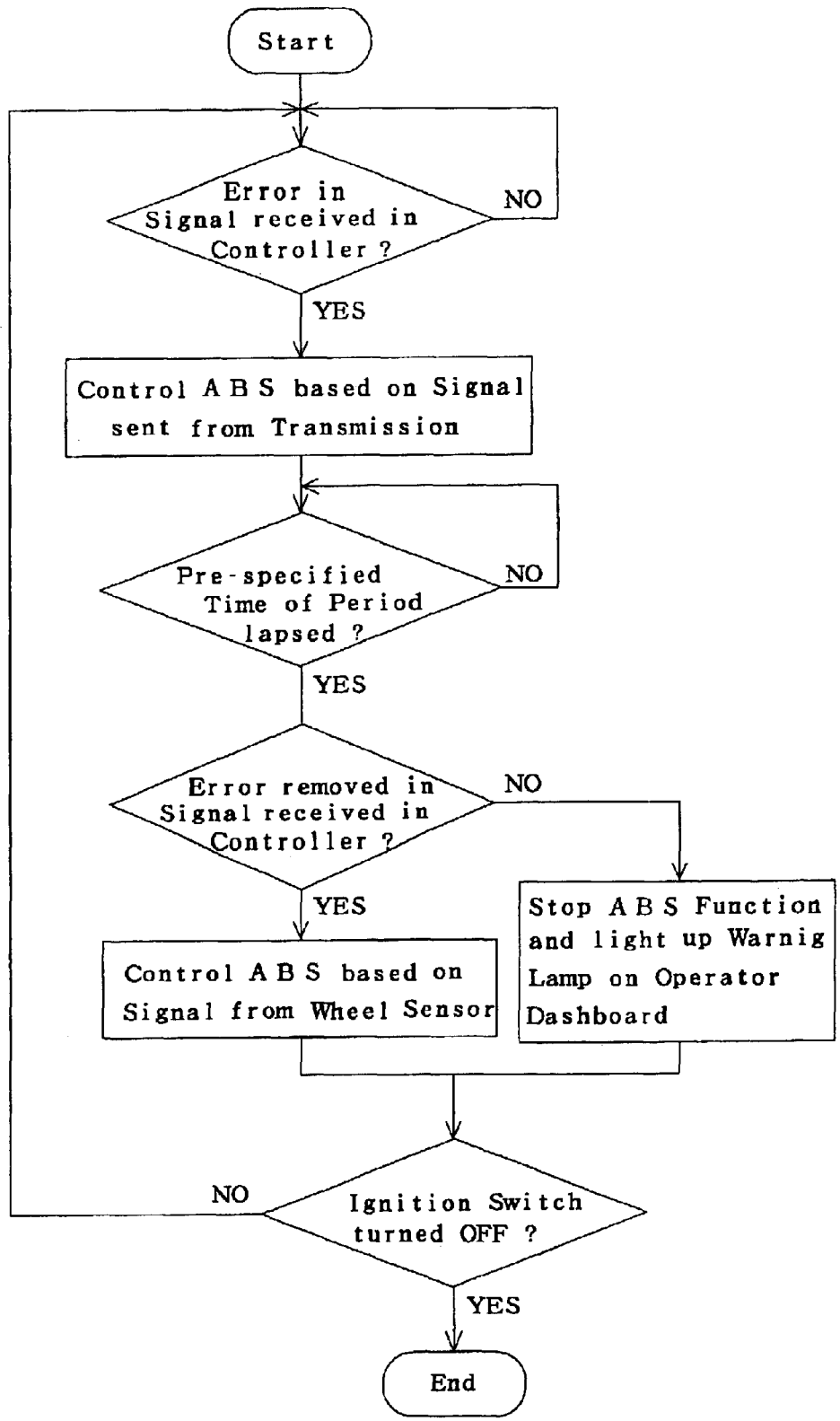
FIG. 8 is a flow chart to show a sequence to judge errors according to the present invention.

Next, FIG. 7 and FIG. 8 show a third example of the embodiment of the invention. In this example, similar to the first example of prior art construction shown in FIG. 18, a permanent magnet 21 is installed in the encoder 19. Also, in this example, an active-type sensor is used as the rotation detection sensor 39 and together with the encoder 19 form the rotation-speed sensor device. This active-type rotation detection sensor 39 comprises a magnetic detection element such as a hole element or magnetic resistance element whose characteristics change in correspondence to changes (direction or amount) in magnetic flux, and a waveform processing-circuit that processes the waveform output from the magnetic detection element (converts a sinusoidal wave to a square wave) that are integrated onto an IC chip. Therefore, the signal output from the rotation detection sensor 39 becomes a square wave whose frequency changes proportionally to the rpm of the rotating race.

This kind of active-type rotation detection sensor 39 is capable of obtaining stable output regardless of the rpm of the rotating race (the output does not decrease as the rpm decreases as in the case of a passive-type sensor), so it is possible to improve the reliability of the rotation sensor device at low speeds. However, this active-type rotation detection sensor 39 does not generate electric power by itself, and so power for obtaining the detection signal is necessary, and thus it is necessary to supply power from outside the sensor. In this invention, it is presumed that there is no harness between the sensor unit 44, including the rotation detection circuit 39, and the controller 36 located on the automobile chassis side, so electric power must also be supplied wirelessly.

In the case of this example, in addition to the processing circuit 46 and transmission circuit 47, there is a power-receiving unit 62 located at the base of the holder 45 of the sensor unit 44, and there is a power-transmission unit 63 on the automobile chassis side. This power-transmission unit 63 transmits the power necessary to operate the rotation detection sensor 39 and the transmission circuit 47 to the power-receiving unit 62 wirelessly such as by an electromagnetic coupling, wireless light (including infrared beam, laser beam), electric waves, ultrasonic waves, etc. This power transmitted from the power-transmission unit 63 to the power-receiving unit 62 is based on the wirelessly supplied power, so that it is not possible to operate the rotation detection sensor 39 and transmission circuit 47 as is. Therefore, the processing circuit 46 converts the power into direct current (through rectification) that is suitable for operating the rotation detection sensor 39 and transmission circuit 47, and send that power to the rotation detection sensor 39 and transmission circuit 47.

Furthermore, in the case of this example, the controller 36 functions as shown in FIG. 8, such that when it is determined whether or not there is a problem in detecting the rotation-speed, it determines whether or not to let the ABS or TCS function. In other words, when it is determined that there is e.g. an error in the signal sent from the rotation detection sensor 39, the controller 36 performs ABS or TCS control based on the signal sent from the another rotation-speed detection sensor 61 (see FIG. 5) that is located in the transmission section. In this case, ABS control is also limited to the drive wheel. Also, the same control state occurs for both the left and right drive wheels and control is not performed independently for the left and right. The signal that is sent from the rotation detection sensor 39 is not used for this control. Moreover, in the case that the error in the signal sent from the rotation detection sensor 39 is removed within a pre-specified time (for example, 10 seconds), ABS or TCS control is performed again based on the signal from the rotation detection sensor 39. On the other hand, in the event that the problem is not removed just at the instant the specified time elapses, the controller has a function for stopping the ABS or TCS function and sending a warning to the operator to make repairs.

In this example, determining whether or not there is a problem in detecting the rotation-speed is performed as in the first or second examples. In the case of this example, when an obstructed electric signal is input for just a short period of time, as in the case of when someone passes in front of an automatic door, detection of problems in detecting the rotation-speed can be performed with function of the ABS or TCS maintained. As can be clearly seen from the explanation above, it is preferred that the construction of this example be combined with the control explained for the first or second example.

Next, FIG. 9 shows a fourth example of the invention. In this example, an inner race 65 is provided to fit around the outer peripheral surface of the radially middle section of the hub 5 and to form the rotating race together with the inner race 6, and an installation hole 64 is formed in the section between the first and second outer-ring raceways 11, 12 in the middle in the axial direction of the stationary outer race 4 such that it penetrates through the outer race 4 in the radial direction. A passive-type stick-shaped sensor unit 44, similar to that used in the second example shown in FIG. 4, is inserted from the outside inward in the radial direction into the installation hole 64. On the other hand, an encoder 19 tightly fits using an interference-fit or adhesive around the section further inward than the first inner-ring raceway 8 on the inside end of the inner race 65. This encoder 19 is formed from a magnetic material into a circular ring shape, and the outer peripheral surface is formed into a gear-like land and recess shape such that the magnetic characteristics around this outer peripheral surface alternately changes at equal intervals around in the circumferential direction. Also, in the case of this example, the first inner-ring raceway 8 is formed around the outer peripheral surface of the inner race 65 that fits around the middle section of the hub 5.

In this example, the antenna 49 for transmitting the signal indicating the rpm is located further on the outside in the radial direction than the outer peripheral surface of the outer race 4, or in other words, it is located on the outside of the enveloping curve of the rolling-bearing unit 2 formed by a metal member that shields electric waves, so that transmission from the antenna 49 to the receiving antenna 55 located on the automobile chassis side can be performed well. Also, in the case of this example, the rotation detection sensor 39 and the encoder 19 are located in a sealed space that is shielded from the outside by sealing rings 66 that are mounted on both ends in the axial direction of the outer race 4, so that it is possible to prevent foreign matter such as magnetic powder that is thrown up from the road surface from adhering to the rotation detection unit comprising the rotation detection sensor 39 and encoder 19, and thus it is possible to maintain reliability of the rotation detection for a long period of time. The other construction and functions are substantially the same as those of the first example shown in FIGS. 1 to 3 and the second example shown in FIGS. 4 to 6, so any redundant explanation is omitted.

Figure 10:
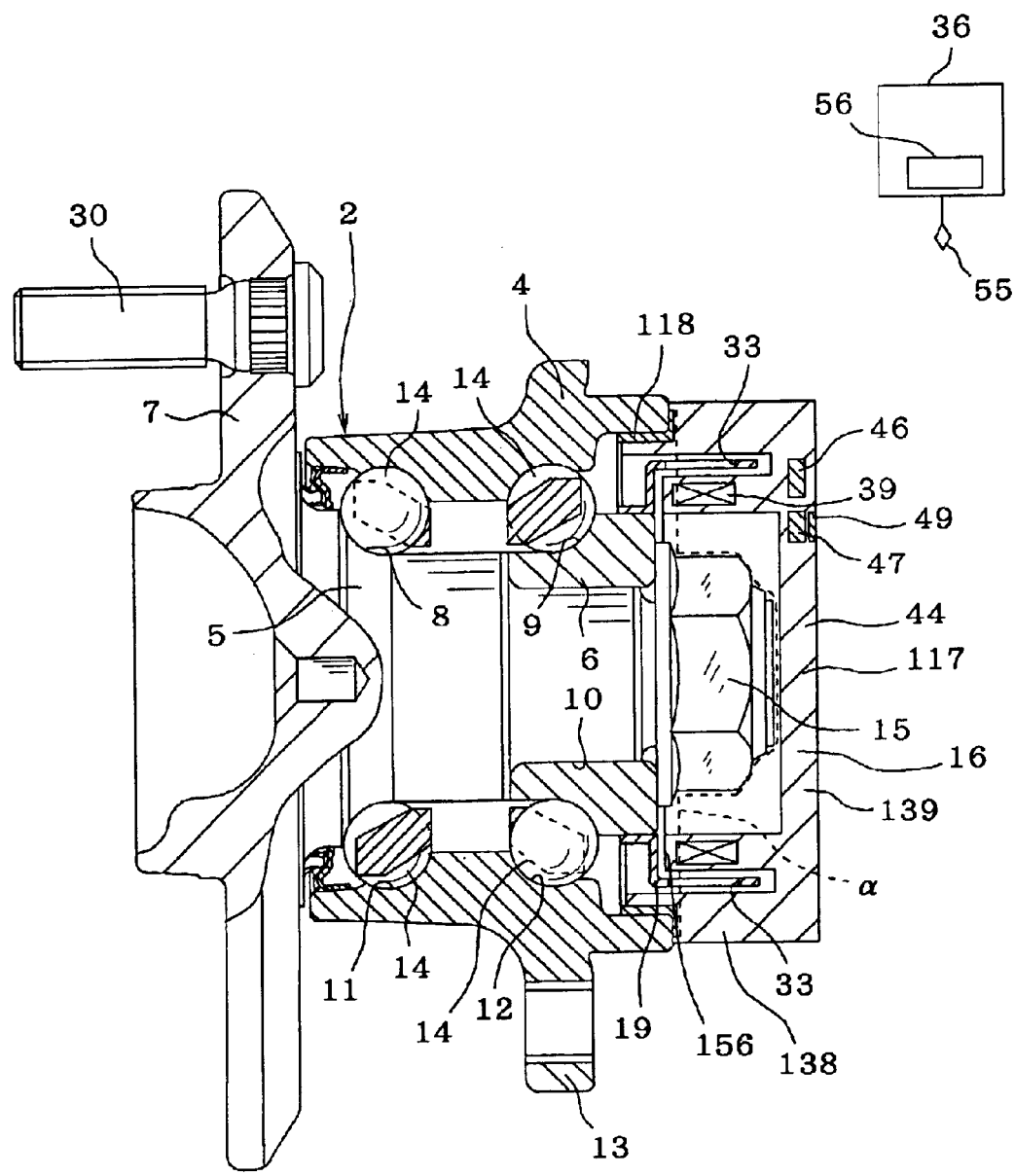
FIG. 10 is a cross sectional view of a rolling bearing unit incorporating a rotation-speed sensor device of a fifth example of the embodiment according to the present invention.

Next, FIG. 10 shows a fifth example of the embodiment of the invention. In this example, a molded cover comprising a synthetic resin or plastic cylindrical main section 117 having a bottom and a fitting cylinder 118 made of metal plate formed around the opening section of the main section 117 is used as the cover 16 for covering the opening on the inside end of the stationary outer race 4. Particularly, in this example, a ring-shaped passive-type rotation detection sensor 39, processing circuit 46 and transmission circuit 47 are embedded inside the main section 117 that functions as a holder, and the antenna 49 is fastened to the axially inside surface of the bottom plate section 139 of the main section 117 (out of the sealed space that is covered by the cover 16). In order to install the rotation detection sensor 39, a radially inner cylindrical section 156 is formed on the axially outside surface of the bottom plate section 139, and the rotation detection sensor 39 is embedded within this radially inner cylindrical section 156. Therefore, in the case of this example, the part that includes the cover 16 becomes the sensor unit 44. In other words, this sensor unit 44 is constructed such that it includes the cover 16.

On the other hand, the inner race 6 forms the rotating race together with the hub 5, and the encoder 19 is fitted onto the inside end of the inner race 6, and the inner half in the axial direction of the encoder 19 is the detected section, and is placed between the inner peripheral surface of the cylindrical section 138 of the main section 117 and the outer peripheral surface of the inner cylindrical section 156. The encoder 19 is made of a magnetic metal plate such as steel plate, and formed generally into a substantially cylindrical shape with a crank-shaped cross section, and a plurality of slit-shaped penetrating holes 33 that are long in the axial direction are formed in the axially inside half such that they are evenly spaced around in the circumferential direction.

In the construction of this example as well, the antenna 49 is located out of the rolling-bearing unit 2 with respect to the enveloping line $\alpha$ of the steel member or metal member of the rolling-bearing unit that shields electric waves as shown in FIG. 10. Therefore, transmission from the antenna 49 to the receiving antenna 55 on the automobile chassis side is performed well without the electric waves being blocked (shielded) by members of the rolling-bearing unit. Also, in this example, similar to the other examples described above, the rotation detection sensor 39 and encoder 19 are located in the sealed spaced that is covered by the cover 16, so it is possible to prevent foreign matter such as magnetic powder that is thrown up from the road surface from adhering to the rotation detection sensor 39 and encoder 19 of the rotation detection unit, and thus it is possible to maintain reliability of the rotation detection for a long period of time.

Next, the installation locations for the transmitter having the transmission antenna and the receiver having the receiver antenna will be explained.

Figure 11:
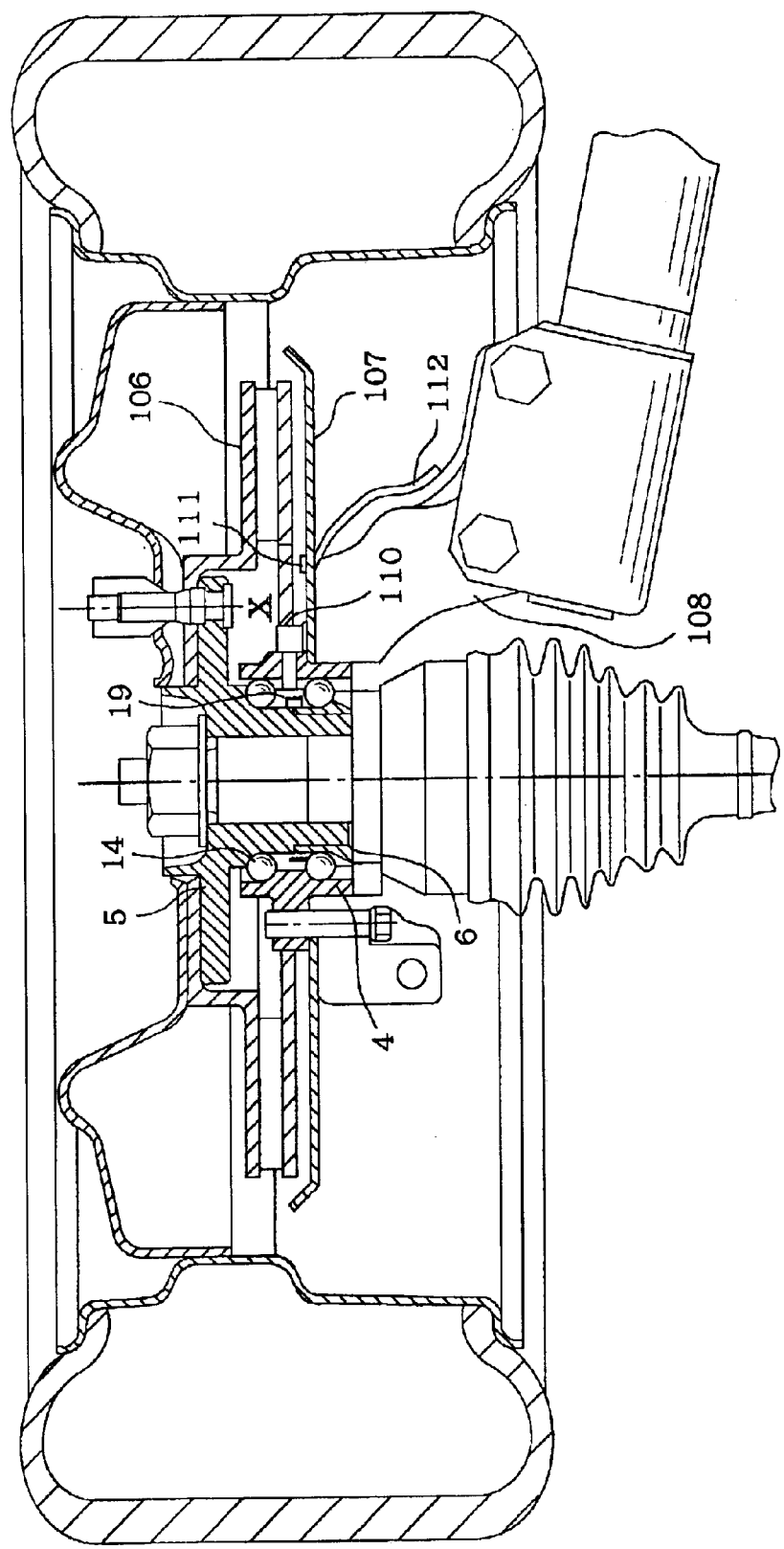
FIG. 11 is a cross sectional view of a rolling bearing unit incorporating a rotation-speed sensor device of a sixth example of the embodiment according to the present invention.

FIG. 11 is a cross-sectional drawing of the installation for the rolling-bearing unit of a sixth example of the embodiment of the invention.

The hub 5 is fastened to a constant-velocity joint and the inner race 6 of the rolling-bearing unit is formed around the outer peripheral surface on the inside end of this hub 5, and there is an outer race (stationary race) 4 located around the outer-diameter side of the hub 5 and inner race 6. The rolling elements 14 of a multi-row bearing are located between the outer peripheral surfaces of the hub 5 and inner race 6 and the inner peripheral surface of the outer race 4.

A cast-iron brake rotor 106 is installed around the hub 5, and a backing plate 107 made of steel plate is installed around the outer race 4 such that it faces the brake rotor 106, and the bottom end of a cast-iron knuckle 108 is attached to the outer race 4.

An encoder 19 with a rubber magnet fastened by way of burn-in is fitted and fixed to around the outer peripheral surface of the inner race 6 of the rolling-bearing unit, and there is a transmitter 110 with a rotation detection sensor for the wheel installed on the outer race 4 of the rolling-bearing unit, facing the encoder 19. In this example, this transmitter with rotation detection sensor is molded in synthetic resin or plastic together with the transmitter for signal transmission.

In this example, the transmitter 110 with rotation detection sensor is installed in the outer race 4 of the rolling bearing unit such that it is exposed in a first transmission space X that is surrounded by the metal parts, specifically brake rotor 106, backing plate 107 and outer race 4 of the rolling-bearing unit.

A receiver 111 is installed in the metal backing plate 107 such that it is exposed in this first transmission space X. As long as the receiver 111 is exposed to the first transmission space X (for example by forming holes in the backing plate 107), it can also be installed in the knuckle 108. In this example, part of the transmitter 110 with rotation detection sensor is embedded in resin or plastic, however, since it is located outside the enveloping curve around the metal parts of the rolling-bearing unit, it is essentially exposed.

In the case of this example, neither the transmitter 110 with rotation detection sensor nor the receiver 111 are electro-magnetically shielded, and are both exposed in the first transmission space where transmission of electric waves can be carried out sufficiently. Therefore, the electric waves transmitted from the transmitter 110 with rotation detection sensor that is installed in the outer race 4 of the rolling-bearing unit are transmitted inside the first transmission space X without being shielded, and received by the receiver 111 that is installed in the backing plate 107.

Also, a wire 112 extends from the receiver 111 installed in the backing plate 107 along the knuckle 108 and connects with the control apparatus (not shown in the figure) on the automobile chassis side. The wheel-speed signal that is transmitted in this way is then processed by the control apparatus for the anti-lock braking system making it possible to maintain stable steering control.

Figure 12:
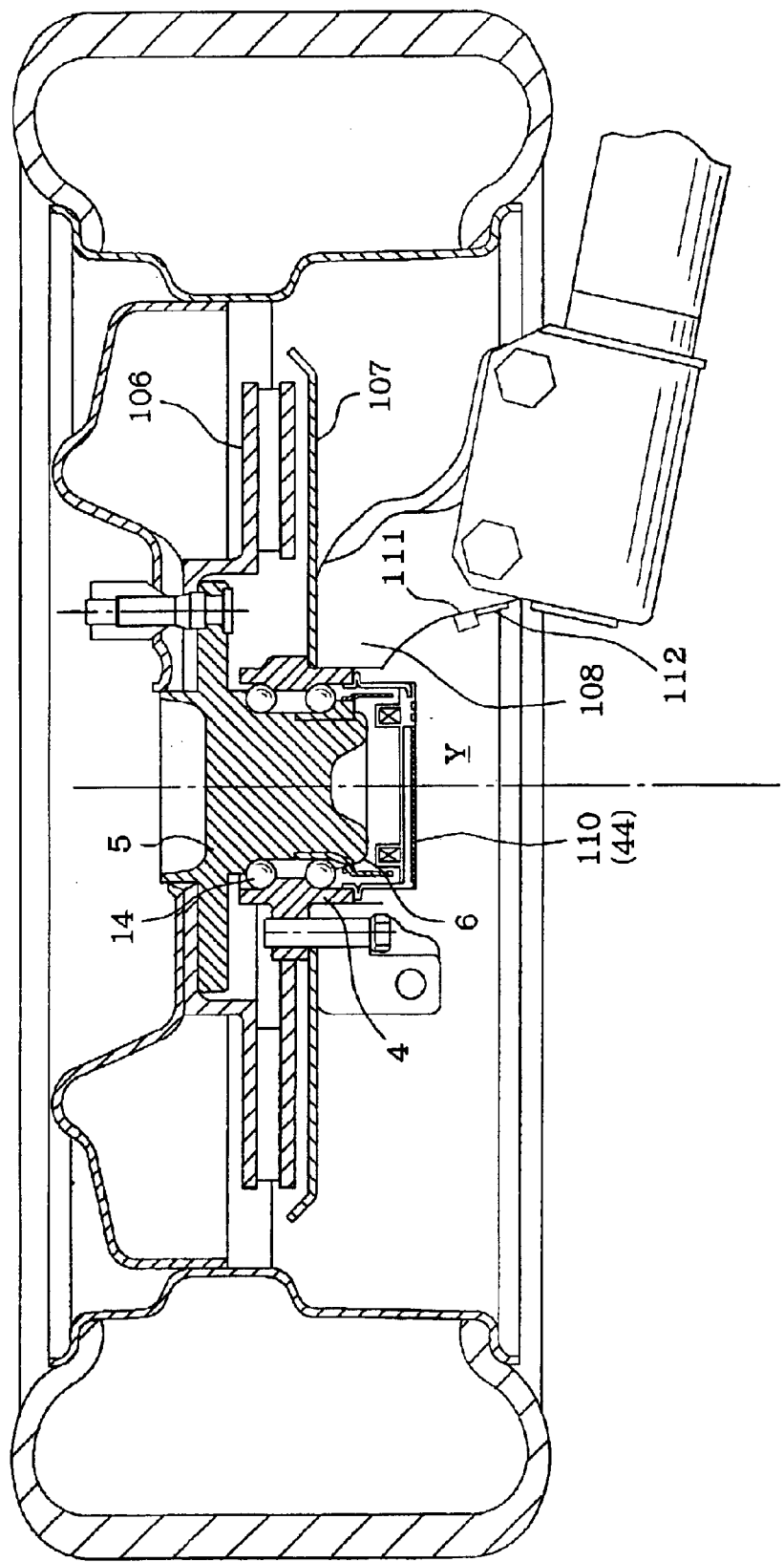
FIG. 12 is a cross sectional view of a rolling bearing unit incorporating a rotation-speed sensor device of a seventh example of the embodiment according to the present invention.

FIG. 12 shows a cross-sectional view of the installation section of the rolling-bearing unit of a seventh example of the embodiment of the invention.

In this example, a ring-shaped passive-type rotation detection sensor, rectifying circuit and transmitter are integrated into a sensor unit 44 that is located on the inner side in the width direction of the automobile of the rolling-bearing unit.

Also, a transmitter 110 (including sensor unit 44) is installed on the inner side in the width direction of the automobile of the outer race 4 of the rolling-bearing unit and exposed in a second transmission space Y is surrounded by metal parts, specifically knuckle 108 made of aluminumdicast alloy or magnesium alloy and rolling-bearing unit, and a receiver 111 is installed on the metal knuckle 108 and exposed in the second transmission space Y.

With this embodiment, both the transmitter 110 (including sensor unit 44) and receiver 111 are both exposed in the second transmission space Y where transmission is sufficiently possible without electromagnetic shielding of electric waves. Therefore, electric waves transmitted from the transmitter 110 (including sensor unit 44) are transmitted through the second transmission space Y without electromagnetic shielding, and received by the receiver 111. In this example, the rotation-speed detection sensor for the wheel and transmitter are integrated and molded in resin or plastic in the metal cover, however, since the transmitter is located out of the metal cover (right side of the circular surface of the metal cover in FIG. 12), it is located in a place not electro-magnetically shielded. In this example as well, the transmitter 110 is embedded in resin or plastic, however magnetically it is exposed in the space Y.

Figure 13:
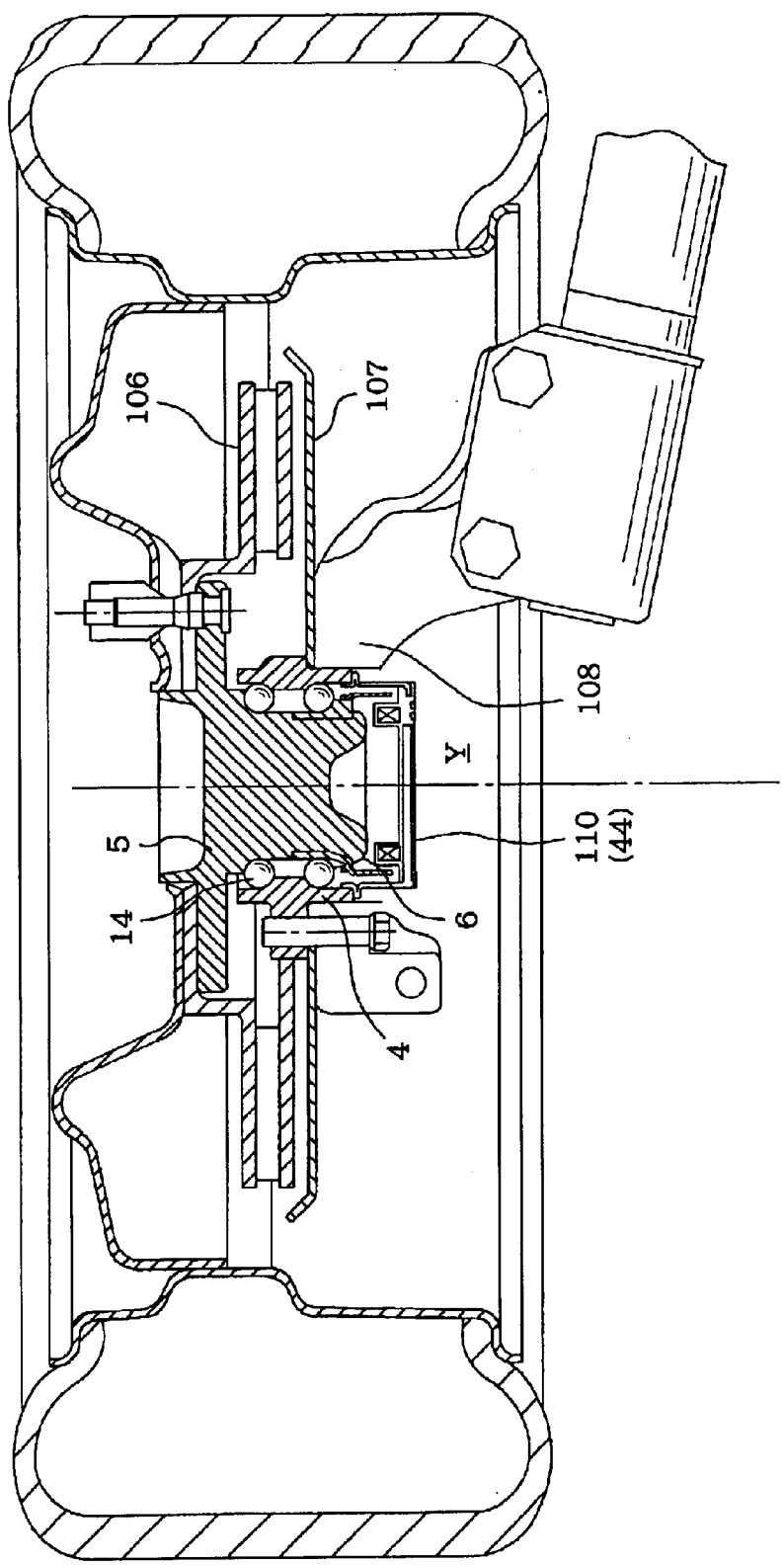
FIG. 13 is a cross sectional view of a rolling bearing unit incorporating a rotation-speed sensor device of an eighth example of the embodiment according to the present invention.

FIG. 13 shows a cross-sectional drawing of the installation of a rolling-bearing unit of an eighth example of the embodiment of the invention.

In this example, the knuckle 108 is formed from a non-metallic material. In other words, the knuckle 108 is formed of a heat-resistant resin or plastic such as PPS or 46 nylon with glass fibers therein.

The transmitter 110 (including sensor unit 44) is installed in the outer race 4 of the rolling-bearing unit such that it is exposed in a third transmission space Y that is surrounded by the knuckle 108 and rolling-bearing unit, and the receiver (not shown in the figure) is located outside of this third transmission space Y in a range such that transmission is possible through non-metallic parts.

With this example, the transmitter 110 (including sensor unit 44) is exposed in a second transmission space Y that is surrounded by the non-metallic knuckle 108 and rolling-bearing unit, and the receiver (not shown in the figure) is placed outside the second transmission space Y, however, it is located within a range where transmission is possible through the non-metallic parts. Therefore, the electric waves that are transmitted from the transmitter 110 (including sensor unit 44) pass through the second transmission space Y and are transmitted through the non-metallic knuckle 108 and received by the receiver (not shown in the figure).

In the case of the non-metallic knuckle 108 of this example, the installation location of the receiver is inside the tire housing, for example. Also, non-metallic parts are not limited to just the knuckle 108, and at least one of the parts, brake rotor 106, backing plate 107 or chassis floor (not shown in the figure), are made of non-metallic material, and in the case that the chassis floor is of a non-metallic material, the receiver can be located inside the automobile compartment making it possible to greatly reduce the work amount of wiring.

Figure 14:
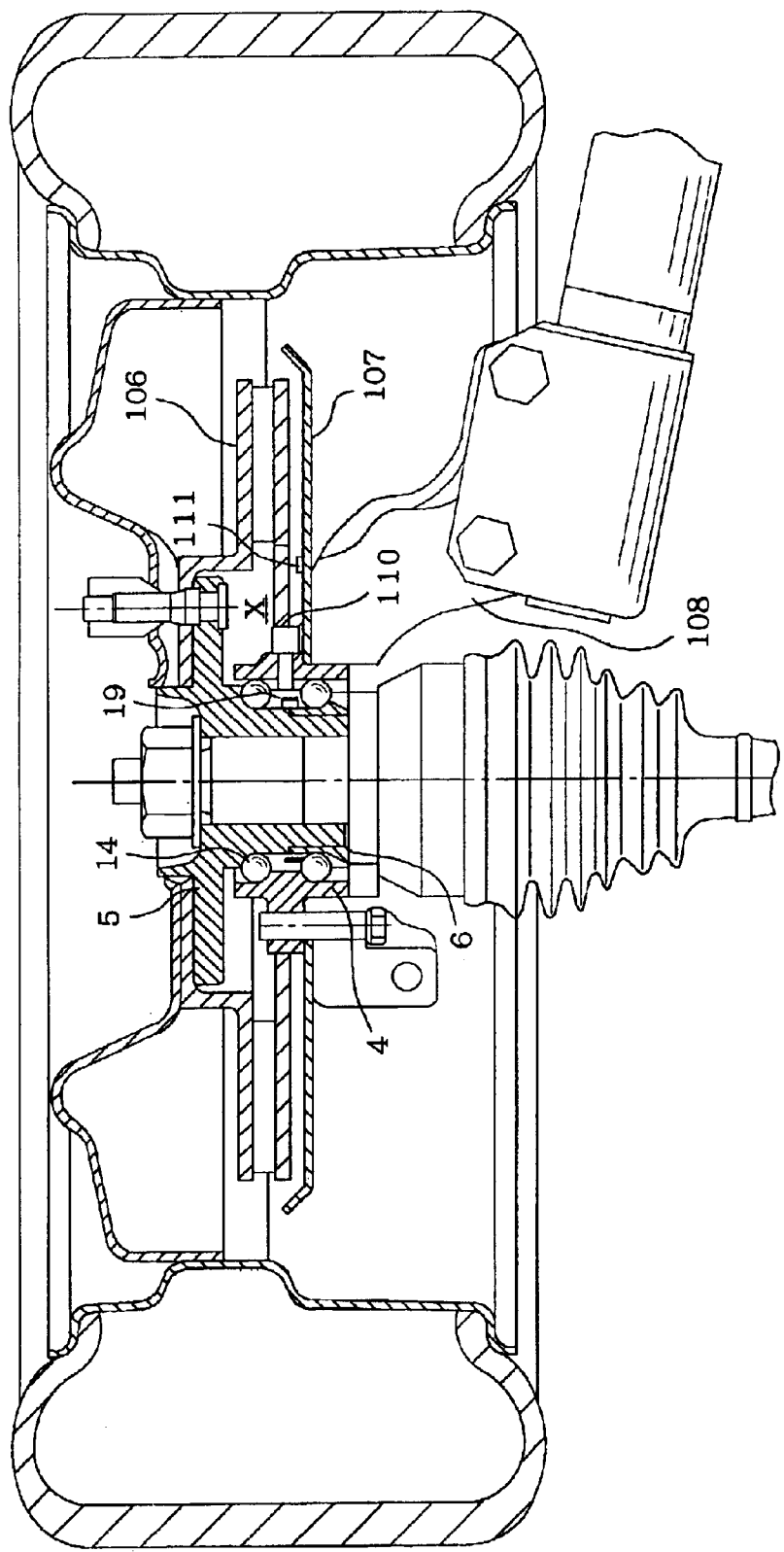
FIG. 14 is a cross sectional view of a rolling bearing unit incorporating a rotation-speed sensor device of a ninth example of the embodiment according to the present invention.

FIG. 14 is a cross-sectional drawing of the installation of the rolling-bearing unit of a ninth example of the embodiment of the invention.

In this example, the backing plate 107 is formed from a non-metallic material. In other words, the backing plate 107 is formed from a heat-resistant resin or plastic such as PPS with glass fibers or 46 nylon.

The transmitter with rotation-speed detection sensor is installed on the outer race 4 of the rolling-bearing unit and exposed in a first transmission space X that is surrounded by the backing plate 107 and rolling-bearing unit, and the receiver (not shown in the figure) is located outside the first transmission space X in a range where transmission is possible through non-metallic parts.

With this example, the transmitter 110 with rotation-speed detection sensor is exposed in the first transmission space X that is surrounded by the non-metallic backing plate 107 and rolling-bearing unit, and the receiver (not shown in the figure) is outside the first transmission space X, however, it is located inside a range where transmission is possible through the non-metallic parts. Therefore, the electric waves that are transmitted from the transmitter 110 with rotation detection sensor pass through the first transmission space X and are transmitted through the non-metallic backing plate 107 and received by the receiver (not shown in the figure).

In the case of the non-metallic backing plate 107 of this example as well, the installation location of the receiver is inside the tire housing, for example. Also, non-metallic parts are not limited to just the backing plate 107, and at least one of the parts, brake rotor 106, knuckle 108 or chassis floor (not shown in the figure), can also be made of non-metallic material.

Next, a transmission apparatus for a wheel rpm signal having a single receiving unit for receiving the wheel rpm signal and for receiving a signal that indicates the air pressure of the tire mounted on the wheel is explained.

Figure 15:
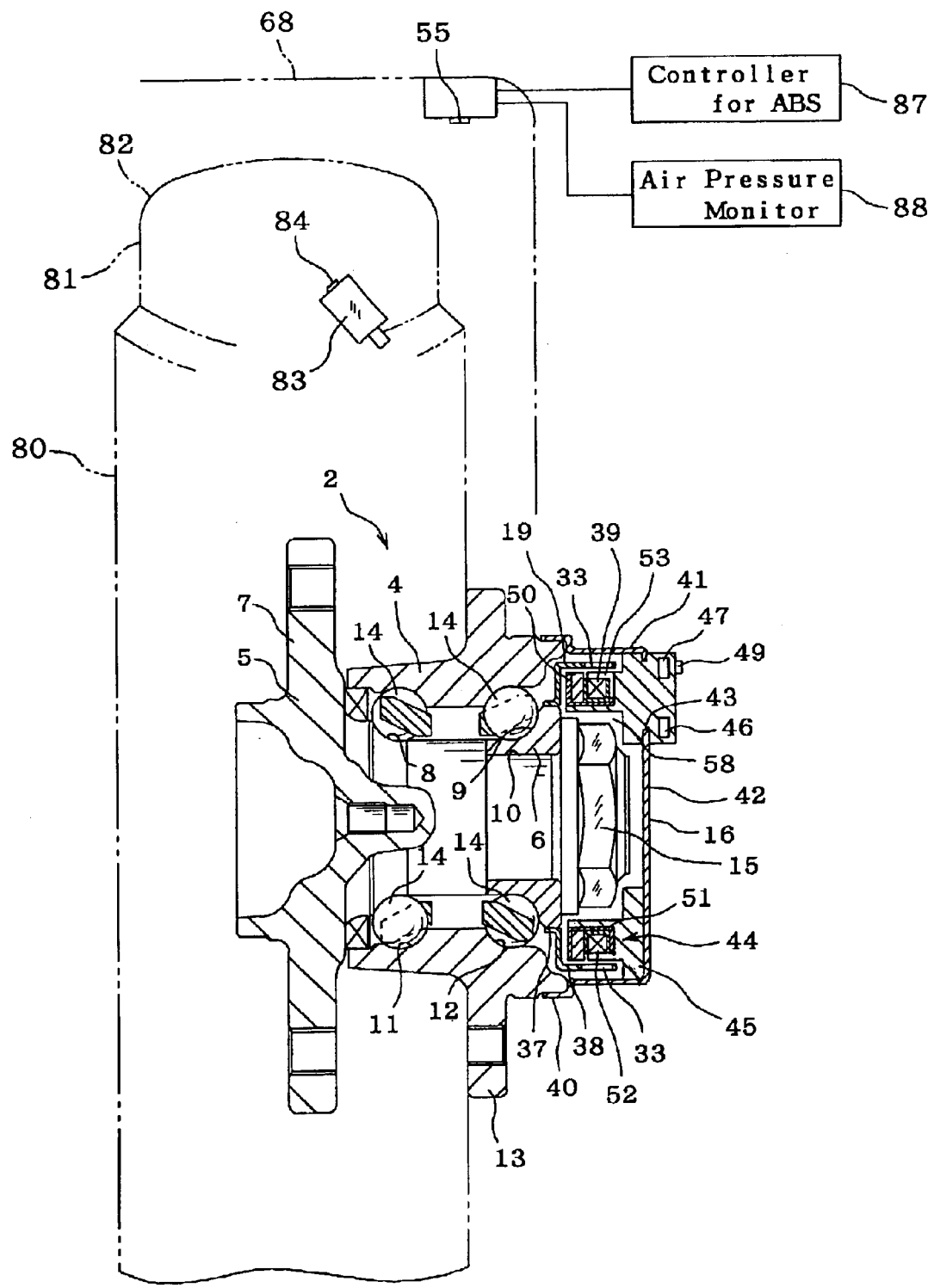
FIG. 15 is a cross sectional view of a rolling bearing unit incorporating a rotation-speed sensor device of a tenth example of the embodiment according to the present invention.
Figure 16:
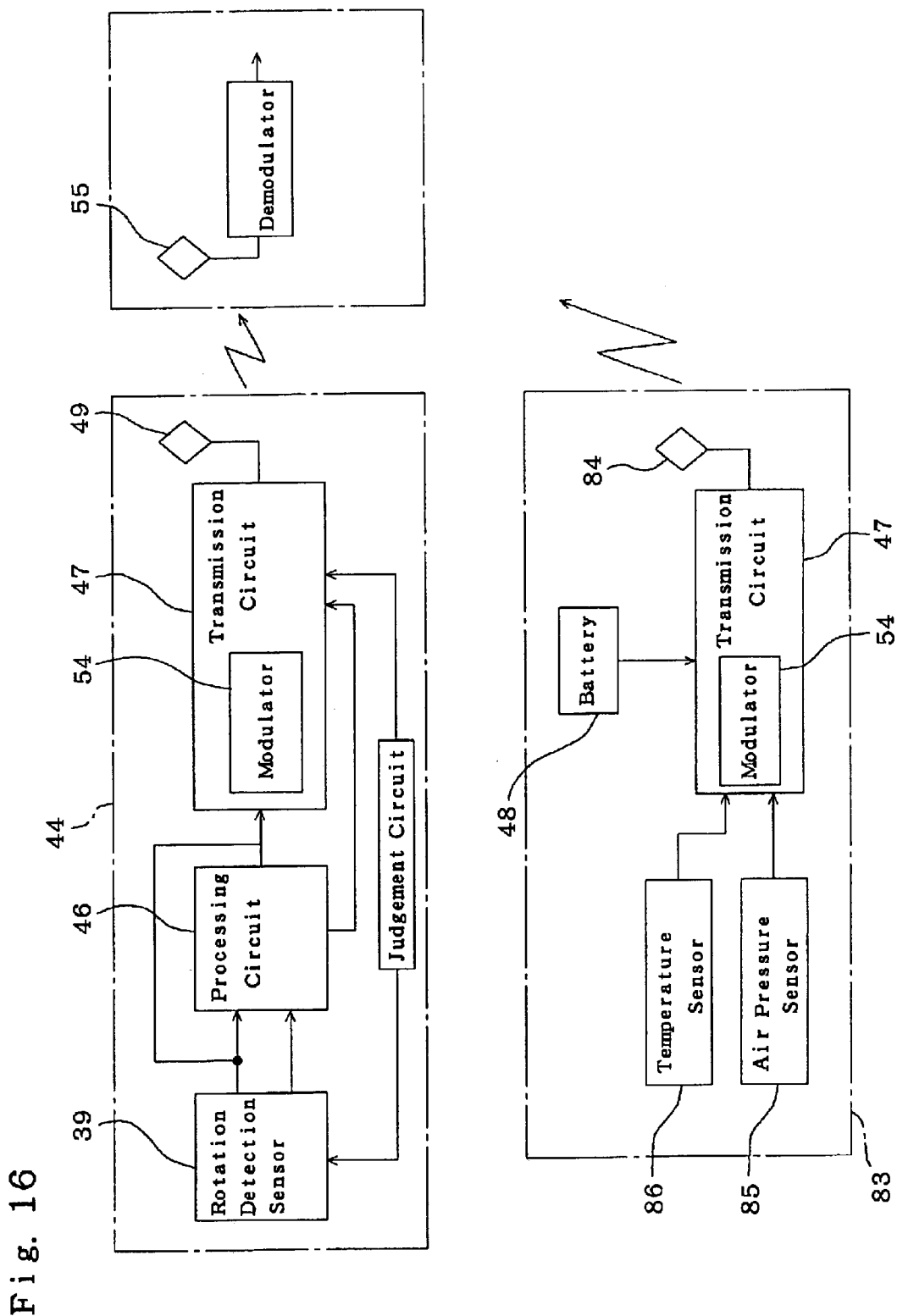
FIG. 16 is a block diagram to show a signal transmission arrangement of the first example in the present invention.

FIGS. 15 and 16 show a tenth example of the embodiment of the invention, where a tire 82 makes up the wheel 81 together with the wheel base 80. A feature of this invention is the construction of a transmission apparatus for transmitting signals that indicate the status of the support section of the wheel, and that wirelessly transmits a signal indicating the air pressure and temperature in the tire 82 to a air-pressure monitor 88 located on the automobile chassis side, so that the rpm of the hub 5 and inner race 6, which are the rotating race, is detected, and a signal indicating the detected value is sent to an ABS controller 87. The construction and function of the rolling-bearing unit for supporting the wheel 81 such that it rotates freely with respect to the suspension is substantially the same as the generally known construction which also includes that of the first example of prior construction shown in FIG. 18, so an explanation of it is omitted or simplified, and the explanation below will center on the features of this invention.

An air-pressure sensor unit 83 is mounted on part of the wheel base 80 such that it can freely measure the air pressure and temperature inside the tire 82. There is a first transmission antenna 84 located on the surface of the air-pressure sensor unit 83, which is an air-pressure-signal transmission unit. In addition to an air-pressure sensor 85 for measuring the air pressure and a temperature sensor 86 for measuring the temperature, there is a transmission circuit (IC) 47 and battery 48 are stored in the air-pressure sensor unit 83. Of these, the transmission circuit 47 comprises a modulator 54 that processes (modulates) the measurement signals from both of the sensors 85, 86 to put them in a form for wireless transmission. Also, the transmission circuit 47, by way of the modulator 54, modulates the transmission waves for the output signals from both of the sensors 85, 86 (each has a different frequency) to obtain separate modulated waves that are capable of being transmitted wirelessly. Moreover, the first antenna 84 transmits these modulated waves to the receiving antenna 55 on the automobile chassis side. In this embodiment, the receiving antenna 55 is located on the internal surface of the tire housing 68.

The signals received by the receiving antenna 55 are demodulated by a demodulator in the control circuit of the air-pressure monitor 88 located on the automobile chassis side, and restored to signals that indicate the air pressure and temperature. Also, when the air-pressure monitor 88 detects that the air pressure in the tire 82 has dropped too much, it notifies the operator by generating an alarm such as a warning light or buzzer on the dashboard. The reason the temperature is also measured and not just the air pressure in the tire 82 is because the air pressure inside the sealed space of the tire 82 changes with temperature, and so it is measured in order to correct the change due to temperature by the Boyle-Charles rule. In the example shown in the figure, the tire 82 is between the first transmission antenna 84 and the receiving antenna 55. In the case of this arrangement, there is no particular problem as long as the tire 82 does not block the electric waves. On the other hand, in the case of a tire 82 with a steel belt installed inside the outer peripheral wall that blocks electric waves, the receiving antenna 55 is located on the internal surface of the tire housing 68 (bottom right in FIG. 15), or in other words it is located in a section where it directly faces the inside surface of the wheel base 80, so that there is no blocking layer between the receiving antenna 55 and first transmission antenna 84. Of course the first transmission antenna 84 is also exposed to the inner peripheral surface of the wheel base 80. In order that the battery 48 will not need to be replaced before the automobile is scrapped, it is possible to prevent the battery 48 from being used up by measuring the air pressure and temperature intermittently. Also, by installing a calculation circuit in the air-pressure sensor 83, so that the air pressure is corrected for temperature through calculation in this air-pressure sensor unit 83, and then it is possible to transmit just a signal that indicates the corrected air pressure from the first transmission antenna 84 to the receiving antenna 55.

On the other hand, the rotation-speed sensor device is the same as that in the first example shown in FIGS. 1 to 3, so any redundant explanation is omitted.

In this example, part of the alternating current that is generated in the coil 52 as the output signal of the rotation detection sensor 39 is processed by the processing circuit 46 to obtain direct current. The direct current that is obtained in this way is used to operate the transmission circuit 47. In other words, in this embodiment, in addition to functioning as a sensor that obtains a signal for knowing the rpm of the wheel, the rotation detection sensor 39 also functions as a generator that supplies power for operating the transmission circuit 47. When necessary, a rechargeable type battery, such as a nickel-cadmium battery, is held inside the rotation sensor unit 44, and this battery can be recharged by the direct current obtained from the processing circuit 46. By using this kind of rechargeable battery, it is possible to sufficiently operate the transmission circuit 47 even when the rotation of the encoder 19 is slow when the automobile is moving at low speed and there is little power generated by the rotation detection sensor 39.

Also, the remaining part of the output signal from the rotation detection sensor 39 is sent directly to the transmission circuit 47 without passing through the processing circuit 46. Moreover, the transmission circuit 47, by way of a modulation circuit 65, modulates the carrier wave using the signal output from the rotation detection sensor 39, to obtain a modulated wave that can be transmitted wirelessly. This modulated wave that carries the signal indicating the rpm has a frequency that is different than the modulated wave that carries the signal indicating the air pressure and is also different than the modulated wave that carries the signal indicating the temperature. A second transmission antenna 49 transmits these modulated waves to the receiving antenna 55 located on the automobile chassis side.

Of the signals received by the receiving antenna 55, the modulated wave that carries the signal indicating the rpm is demodulated by a demodulator that is located in the ABS controller 87 on the automobile chassis side, to restore it to a signal indicating the rpm of the wheel, and it is used for ABS (or TCS) control. Also, the signals indicating the air pressure and temperature are demodulated by the air-pressure monitor 88 located on the automobile chassis side, and used for monitoring the air pressure. The signal indicating the rpm is separated from the signals indicating the air pressure and temperature by using a different frequency for the modulated wave.

The second transmission antenna 49 is held on the inside end surface of a synthetic resin or plastic holder 45 at a portion exposed out of the cover 16. Therefore, the electric waves that are transmitted from this second transmission antenna 49 are not blocked by the cover 16, which is made from metal plate such as SPCC and is a metal part that shields electric waves; and the second transmission antenna 49 and cover 16 are insulated from each other. As a result, transmission from the second transmission antenna 49 to the receiving antenna 55 can be performed efficiently.

Particularly, the transmission apparatus for the signals indicating the state of the wheel support section of this embodiment, comprises a single receiving unit, which by using one receiving antenna 55, receives the signal from the rotating section or wheel 81 indicating the air pressure and temperature, and the signal detected by the rotation-speed sensor device indicating the rpm. Therefore, in addition to being able to reduce the cost of parts by using only one receiving antenna 55, it is also possible to simplify the work of wiring the harness for connecting the receiving antenna 55 to the controllers, or in other words, the air-pressure monitor 88 and ABS controller 87. That is, the air-pressure monitor 48 and ABS controller 88 can be located inside a single casing, so it is possible to perform the wiring of the harness that connects the air-pressure monitor 88 and ABS controller 87 with the receiving antenna 55 at the same time, and thus it is possible to simplify the wiring work.

Furthermore, in this example, the rotation detection sensor 39, the transmission circuit 47 for wirelessly transmitting the signal detected by the rotation detection sensor 39, and the processing circuit 46 for obtaining direct current for operating the transmission circuit 47 are all held in a single holder 45 to functions as the rotation sensor unit 44, so in addition to simplifying the work of managing and assembling parts, it is possible to reduce the number of installation brackets and thus it is easier to reduces the cost and weight of the sensor. In other words, the components 39, 47, 46 are embedded and held in a single holder 45 to function as the rotation sensor unit 44 and to be handled as a single unit. Accordingly, installation of all of the components 39, 47, 46 can be completed by simply mounting this rotation sensor unit 44 on the bottom plate 42 of the cover 16. Therefore, it is possible to reduce the cost and weight of the sensor.

In this example, wireless transmission of signals from the first and second transmission antennas 84, 49 to the receiving antenna 55 using electric waves was explained, however, the wireless transmission performed by this section can also be wireless optical transmission (including infrared rays, or laser beams), or ultrasonic wave transmission.

Figure 17:
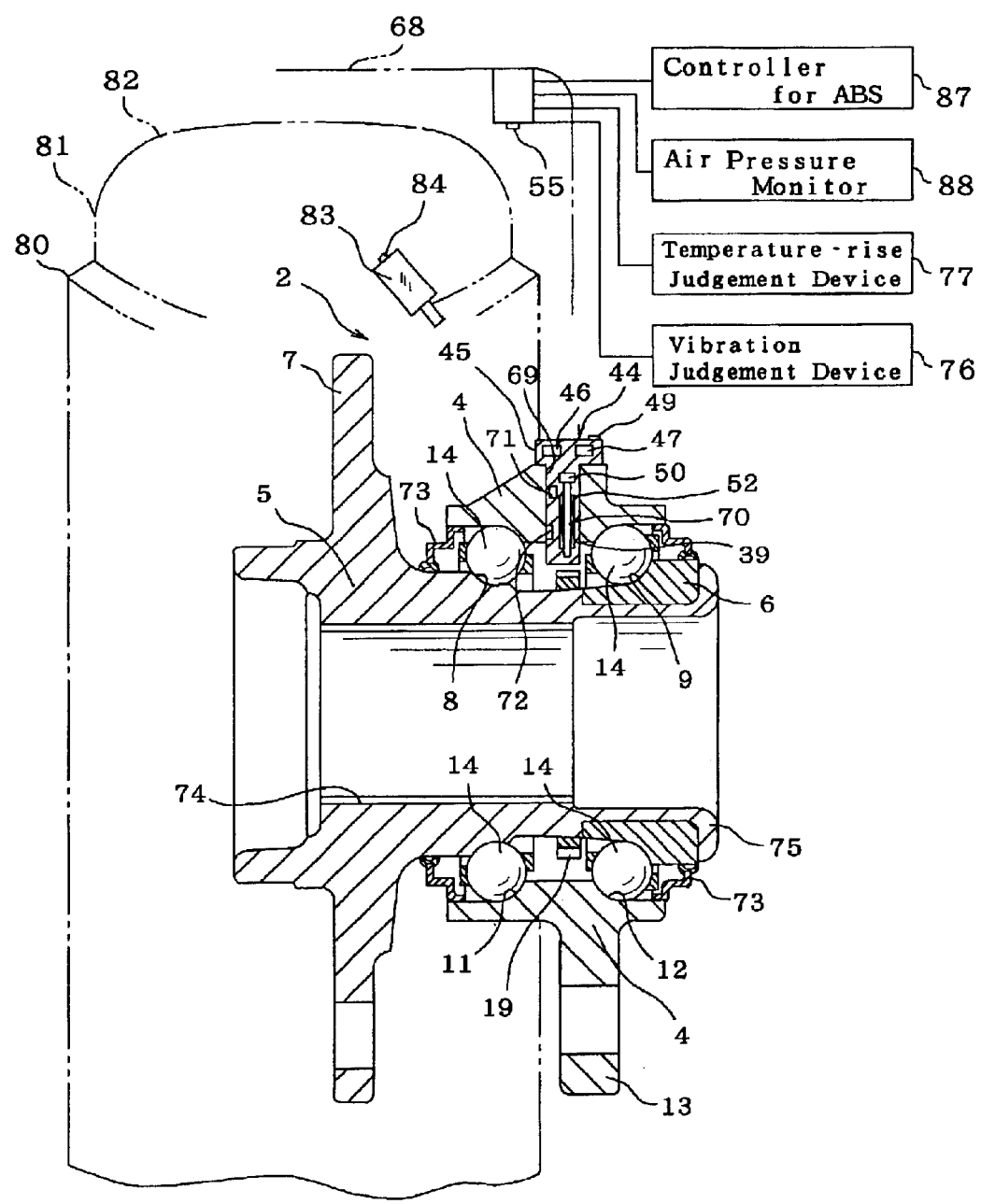
FIG. 17 is a cross sectional view of a rolling bearing unit incorporating a rotation-speed sensor device of an eleventh example of the embodiment according to the present invention.

Next, FIG. 17 shows an eleventh example of the embodiment of the invention. In this example, an installation hole 69 is formed in the section between the first and second outer-ring raceways 11, 12 in the middle in the axial direction of the stationary outer race 4 such that it penetrates the outer race 4 in the radial direction. The rotation sensor unit 44, in which a passive-type, stick-shaped rotation detection sensor 39 is assembled, is inserted in this installation hole 69 from the outside inward in the radial direction. This rotation detection sensor 39 comprises a permanent magnet 50 that is magnetized in the axial direction (vertical direction in FIG. 17), a magnetic pole piece 70 of which one end surface in the axial direction comes in contact with one end surface in the axial direction of the permanent magnet 50, and a coil 52 that is wound around the pole piece 70. This kind of rotation detection sensor 39 generates alternating current in the coil 52 corresponding to changes in the magnetic flux flowing in the pole piece 70.

On the other hand, an encoder 19 is fastened, using an interference fit or adhesive, around the outer peripheral surface in the middle of the hub 5, which together with the inner race 6 forms the rotating race. This encoder 19 is formed from magnetic material generally into a circular ring shape, and a gear-like land and recess surface is formed around its outer peripheral surface such that the magnetic characteristics around the outer peripheral surface change alternately and at equal intervals around in the circumferential direction. The other end surface in the axial direction of the pole piece 70 of the rotation detection sensor 39 faces very closely the outer peripheral surface of the encoder 19. As the hub 5 rotates together with the wheel, the amount of magnetic flux flowing inside the pole piece 70 changes as the outer peripheral surface of the encoder changes in land and recess, and this generates alternating current in the coil 52 with a frequency that is proportional to the rpm.

Also, in the case of this example, in addition to the rotation sensor unit 44 in which the rotation detection sensor 39 is embedded, there is also an acceleration sensor 71 and temperature sensor 72 held in the holder 45. Of these, the acceleration sensor 71 detects by way of the holder 45 and outer race 4 the vibration that is generated when the rolling-bearing unit 2 is operating. Also, the temperature sensor 72 detects the temperature of the area of rolling contact of the outer race 4. As shown in the example in the figure, in order to do this, the temperature sensor 72 is located as close as possible to the first outer-ring raceway 11 that is formed around the inner peripheral surface of the outer race 4, and the detection section is exposed to the outer peripheral surface of the synthetic resin holder 45 and comes in direct contact with or very close to the outer race 4. Therefore, the temperature sensor 72 can measure the temperature of the outer race 4 very accurately.

By assembling the rotation sensor unit 44 at the top in the vertical direction in the state where the rolling-bearing unit 2 is attached to the suspension, the temperature sensor 72 is close to the load area on the rolling elements of the rolling-bearing unit 2 and located in area where there temperature rises the easiest. Therefore, the detection sensitivity of the temperature sensor 72 becomes very good. Also, by installing the rotation sensor unit 44 such that it is rotated from the state shown in the FIG. 90 degrees in the circumferential direction around the center axis of the rotation sensor unit 44, the temperature sensor 72 is located at the same distance from the rows of rolling elements, and it is possible to equalize the sensitivity for detecting the temperature of the rows of rolling elements.

Furthermore, the processing circuit 46, which rectifies part of the output from the rotation detection sensor 39 to obtain direct current, and the transmission circuit 47 that processes the remaining output from the rotation detection sensor 39, and the detection signals from the acceleration sensor 71 and the temperature sensor 72 so that they can be transmitted wirelessly, are embedded and held at the base (top end in FIG. 17) of the holder 45 in the area that is exposed to the outer peripheral surface of the outer race 4.

Also, there is a second transmission antenna 49 located on the base end surface (top surface in FIG. 17) of the holder 45 for transmitting the wireless signals processed by the transmission circuit 47 to the receiving antenna 55 that is mounted on the internal surface of the tire housing 68.

In the case of this example, the second transmission antenna 49 is located further outside in the radial direction than the outer peripheral surface of the outer race 4, in other words, it is outside the enveloping curve of the rolling-bearing unit 2, which is made of metal components that block electric waves, so transmission from the second transmission antenna 49 to the receiving antenna 55 on the automobile chassis side can be performed well.

Moreover, in this example, since the rotation detection sensor 39 and encoder 19 are located in a sealed space that is blocked from the outside by shield rings 73 that are mounted on both ends in the axial direction of the outer race 4, so it is possible to prevent foreign matter such as magnetic powder from being thrown up from the road and getting into the rotation detection sensor 39 and encoder 19 of the rotation detection unit, and thus it is possible to maintain reliability of the rotation detection over a long period of time.

On the other hand, an air-pressure sensor unit 83 that is similar to that in the tenth embodiment is mounted on the wheel base 80 of the wheel 81 that is supported by the hub 5 such that the signals indicating the air pressure and the temperature inside the tire 82 are freely transmitted from the first transmission antenna 84 to the receiving antenna 55. The construction of the air-pressure sensor unit 83 is substantially the same as that in the tenth embodiment.

Furthermore, in this example, the hub 5 is used for the drive wheels. Therefore, a spline hole 74 is formed in the center of the hub 5. Also, the inner race 6, which fits around the inner half of the hub 5 is held in place by a crimped section that is formed on the inside end of the hub 5 to fasten the inner race 6 to the hub 5.

Also, a disk rotor made of a carbon-carbon composite material (C-C composite) is fastened to a first flange 7 that is formed on the outer peripheral surface of the hub 5. A disk rotor that has a smaller diameter than a normal cast iron disk rotor is used for this carbon-carbon composite disk rotor.

In the case of the transmission apparatus for the signal indicting the state of the wheel-support section of this embodiment, a signal indicating the air pressure and temperature inside the tire 38 is transmitted wirelessly from the first transmission antenna 84 located in the air-pressure sensor unit 83 to the receiving antenna 55. Also, a signal indicating the rpm of the wheel 37, a signal indicating the vibration of the outer race 4 of the rolling-bearing unit 2, and a signal indicating the temperature of the outer race 4 are transmitted wirelessly from a second transmission antenna 49 located in the rotation sensor unit 44 to the receiving antenna 55.

The signal indicating the air-pressure and temperature inside the tire 82 and the signal indicating the rpm of the wheel 81 are sent to the air-pressure monitor 88 or ABS controller 87 in the same way as was done in the tenth embodiment, and are used for monitoring the air pressure inside the tire 82 or for performing ABS control.

On the other hand, the signal indicating the vibration of the outer race 4 that was detected by the acceleration sensor 71 is used for detecting error (abnormality) in the rotation-support section of the wheel 81 by the rolling-bearing unit 2. Errors in the rotation-support section that are detected by the acceleration sensor 71 are any errors that can be detected by vibrations generated due to damage such as damage to the rolling-bearing unit 2, for example, flaking of the rolling-contact surface of the rolling-bearing unit 2, particularly in the first and second inner-ring raceways 8, 9 or first and second outer-ring raceways 11, 12; damage to part of the suspension that supports the rolling-bearing unit 2; or damage to the wheel base 80 or tire 82 of the wheel 81.

The signal is received by the receiving antenna 55 and demodulated by the demodulator, and a vibration-judgment device 76 is provided to receive the signal indicating the vibration of the outer race 4 and to determine whether or not there is an error (abnormality) in the rotation-support section. When a large vibration lasts for a certain period of time (for example a few seconds or more), it is determined that there is an error (abnormality), and a warning is generated such as a warning lamp or buzzer on the dashboard. The reason for this is, so that an error (abnormality) is not determined by mistake when vibration is applied to the outer race 4 due to road conditions, such as when driving on a poor road.

The temperature of the outer race 4 that is detected by the temperature sensor 72 is used for preventing a drop in durability of the rolling-bearing unit 2 due to an abnormal rise in temperature inside the rolling-bearing unit 2. In other words, in this embodiment, there is a carbon-carbon composite disk rotor that is located around the hub 5. This carbon-carbon composite disk rotor has a small diameter and when braking, the temperature of the friction surface for maintaining the braking force is higher than that of a cast iron rotor. The small diameter is related to shortening the distance between the friction surface and main components of the rolling-bearing unit 2, and a significant rise in temperature results in an increased amount of heat that is transferred to the rolling-bearing unit 2. Therefore, the rise in temperature of this rolling-bearing unit 2 is much greater than when using a normal cast iron disk rotor.

On the other hand, the grease inside the rolling-bearing unit 2 for lubricating the rolling-contact surface degrades when the temperature becomes high (for example 170° C. or greater). Therefore, a temperature-rise judgment device 77, which receives the signal indicating the temperature in the area of the outer race 4 that was received by the receiving antenna 55 and demodulated by the demodulator, determines that there is an error when the temperature in the area of the outer race 4 rises above a specified value (for example 160° C. or greater), and generates a warning such as a warning lamp or buzzer on the dashboard. In this embodiment, the rotation sensor unit 44 is located in the middle in the axial direction of the outer race 4, so vibration and a rise in temperature can be detected with good accuracy, and thus it possible to effectively detect errors in the rotation-support section and rises in temperature of the rolling-bearing unit 2.

When using a carbon-carbon composite disk rotor in this-way, the rolling-bearing unit 2 is exposed to higher temperature conditions. On the other hand, by measuring the temperature of the rolling-bearing unit 2 by a temperature sensor 72 as in this embodiment, it is possible to detect degradation of grease early before harmful damage such as seizure of the rolling-bearing unit 2 occurs, and thus it is possible to prevent the harmful damage from occurring.

If the warning means display a warning such as a warning lamp or buzzer on the dashboard, for example, individually for errors based on the air-pressure, vibration or temperature signals for each of the four wheels, not only does the cost increase, but the number of items the operator must check also increases, and is not preferred. Therefore, the warning means has one warning lamp or buzzer each for the air pressure, vibration and temperature, and displays a warning when there is an error in any one of the four wheels. In this case, it is desirably possible to have the error checked at a repair shop when the error occurs in any one of the four wheels. In order for this to be possible, it is preferred that there be a memory means, such as a memory for each the air-pressure monitor 88, vibration-judgment device 76 and temperature-rise judgment device 77, for storing an error log. Furthermore, it is also possible to warn of air pressure, vibration and temperature with only one warning means, and to check the error at a repair shop to find out what kind of error occurred and for which wheel.

The rotation speed sensor device of this invention is constructed and functions as described above, so that it is possible to prevent trouble due to broken wires, as well as effectively detect trouble in detecting the rotation-speed, and thus contribute to safe operation. Furthermore, when necessary, it is possible to further reduce the cost and weight of the bearing unit in which the rotation speed sensor is installed.

According to another feature of the present invention as shown in FIGS. 20 to 37, a double-row rolling bearing with a sensor unit comprising an outer race having an inner peripheral surface formed with outer-ring raceways, an inner race having an outer peripheral surface formed with inner-ring raceways, rolling elements provided between the outer-ring raceways and the inner-ring raceways so as to roll therebetween, an encoder ring fixed to one of the outer race and inner race directly or through another member, and a sensor unit comprising sensors for detecting different states including rotating speed, temperature, and a casing made from a material having good thermal conductivity such as copper, aluminum, iron or their alloy etc. to contain the sensors therein, the sensor unit being supported by the other of the outer race and inner race directly or through another member to face the encoder ring in a space isolated from the outside.

According to an example of the present invention, the double row rolling bearing with a sensor unit is composed of an outer race having double row outer-ring raceways on its inner peripheral surface, an inner race having double row inner-ring raceways on its outer peripheral surface, a plurality of rolling elements which are provided between each outer-ring raceway and each inner-ring raceway so as to be freely rolling, a detected ring or encoder ring which is fixed directly to the inner race, and a sensor unit. The sensor unit has a plurality of sensors for detecting different states and is supported to the outer race so as to be opposed to the detected ring or encoder ring.

In the double row rolling bearing with a sensor described above, the detected ring or encoder ring in which gear shaped land and recess sections are formed on its outer peripheral edge (outer peripheral surface) is preferably used, and a detecting section of a rotation detection sensor composing the sensor unit is opposed to the outer peripheral edge of the encoder ring. In this case, a distance in a radial direction of a gap between the detection section of the rotation detecting sensor and the outer peripheral edge (end of the land sections) of the detected ring or encoder ring is restrained within a range of not less than ¼ to not more than 3 times as long as a height of the land and recess sections (distance between a bottom of the recess section and a top of the land section in the radial direction).

In addition, as the rotation detection sensor composing the sensor unit, a so-called active type sensor, into which a magnetic detecting element, such as a hole element or a magnetic resistance element, which changes characteristics according to change in density or direction of magnetic flux, is preferably used. In this case, the distance of the gap between the detecting section of the rotation detection sensor and the outer peripheral edge of the detected ring or encoder ring in the radial direction is restrained within a range of 0.5 to 6 mm.

Further, a plurality of sensors composing the sensor unit preferably includes at least one of a temperature sensor and an acceleration sensor in addition to the rotation detection sensor.

The double row rolling bearing with a sensor unit of the present invention having the above structure can measure state values such as rotating speed, vibration and temperature accurately.

Now, the present invention is detailed referring to the attached drawings.

Figure 20:
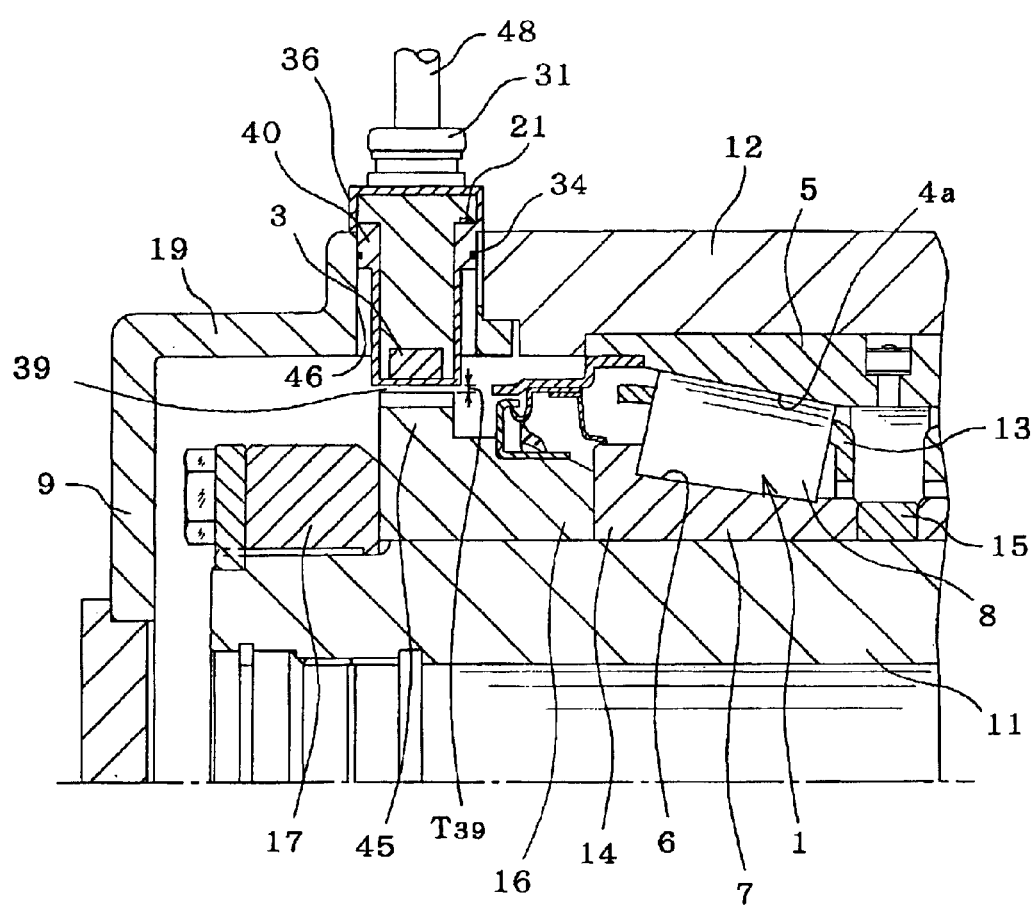
FIG. 20 is a view taken along the line XX—XX in FIG. 21 to show another example of the embodiment of the present invention.
Figure 21:
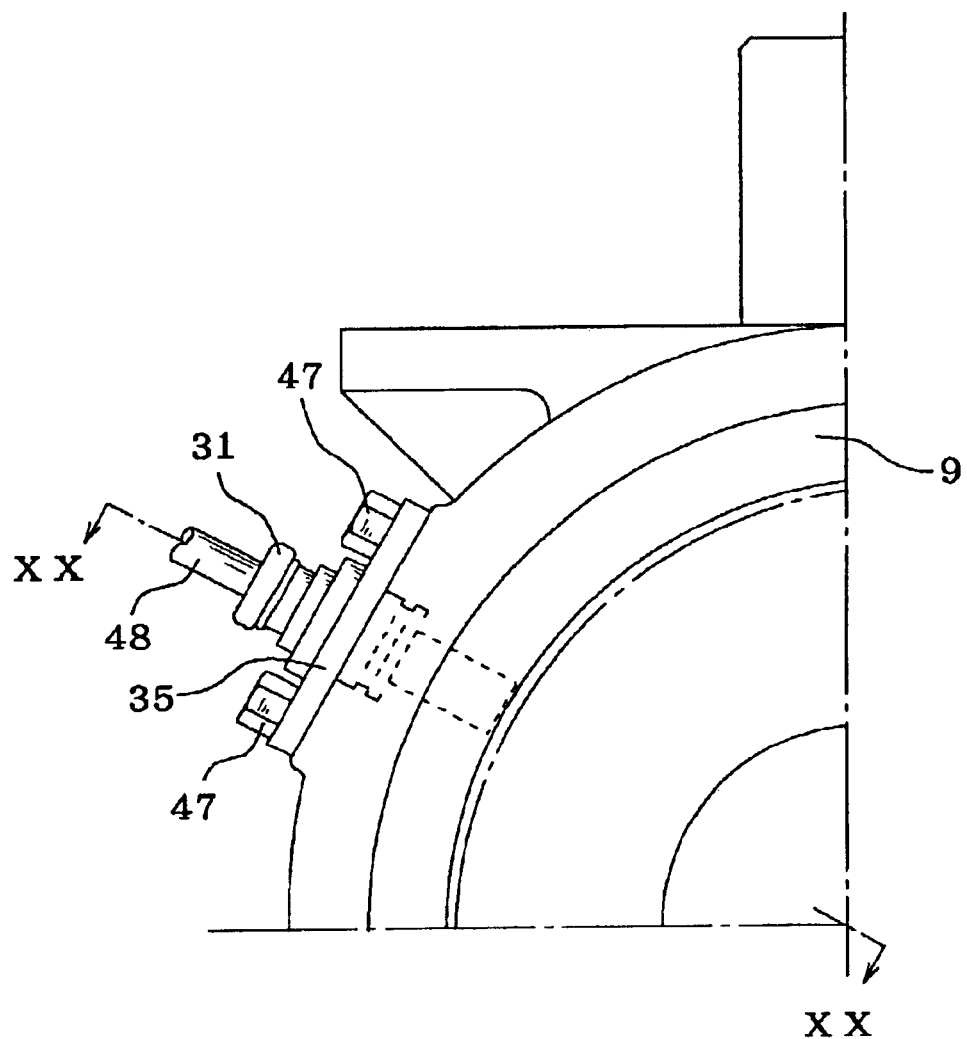
FIG. 21 is a view taken from the left side of FIG. 20.

Firstly, FIGS. 20 and 21 show the case where the present invention is applied to a double row rolling bearing for a rolling stock as an example according to an embodiment of the present invention. This example is characterized in that a rotation detection sensor 3 for detecting a rotating speed of an axle 11 and a temperature sensor 21 for detecting a temperature of a double row rolling bearing for rotatively supporting the axle 11 are held to a single holder 40, so that the problems of the aforementioned conventional structure are solved. Since the structures and effects of the other portions are similar to the example of the conventional structure shown in FIGS. 40 and 41, the same reference numerals are given to the equivalent parts and the explanation of the overlapped portions is omitted or simplified, and the explanation will be given mainly as to the characteristic parts of this example.

In the case of this example, an outward flange-shaped collar section 45 is formed along an entire outer peripheral surface at the outer end of an annular member 16 called as an oil thrower provided on an axially inner side with respect to a nut 17. Recess sections and land sections are formed on an outer peripheral edge of the collar section 45 alternatively with equal intervals in a circumferential direction. Magnetic characteristics of the outer peripheral edge are changed alternatively with equal intervals in the circumferential direction. The collar section 45 is provided with a function as an encoder ring for detecting a rotating speed.

Figure 40:
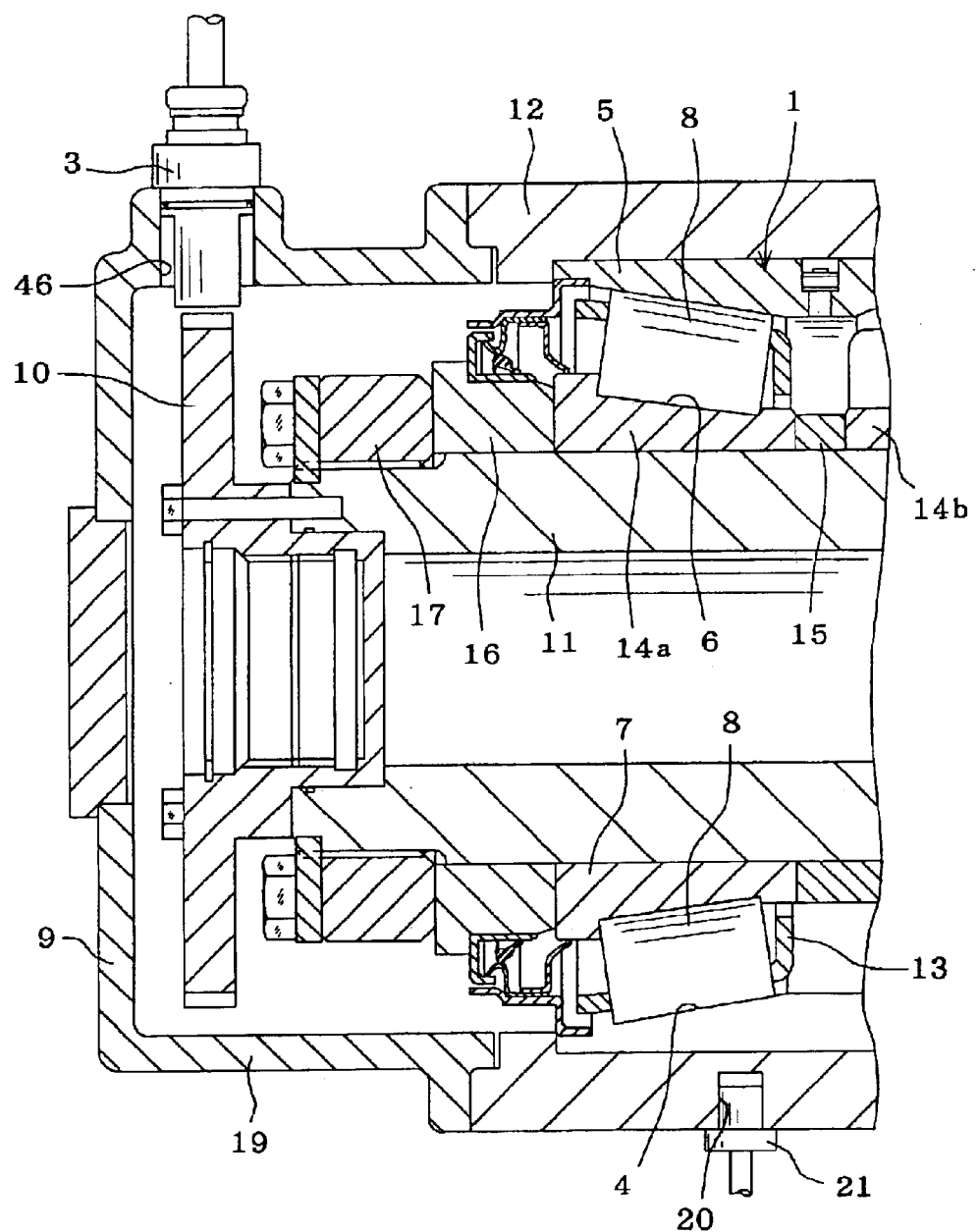
FIG. 40 is a cross sectional view to show anther example of the conventional structure taken along the line C-O-D in FIG. 41.
Figure 41:
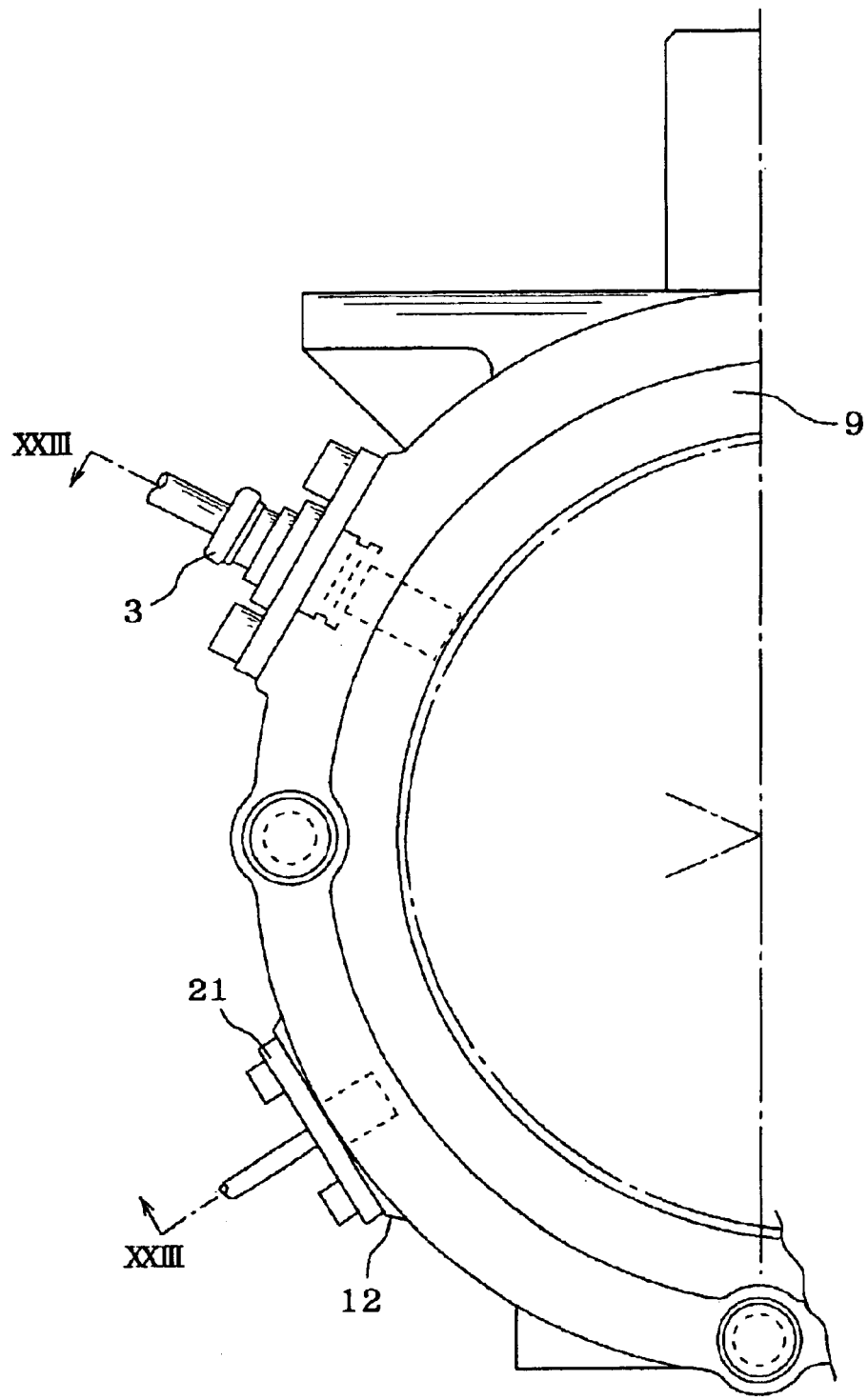
FIG. 41 is a view take from the left side in FIG. 40.
Figure 42:
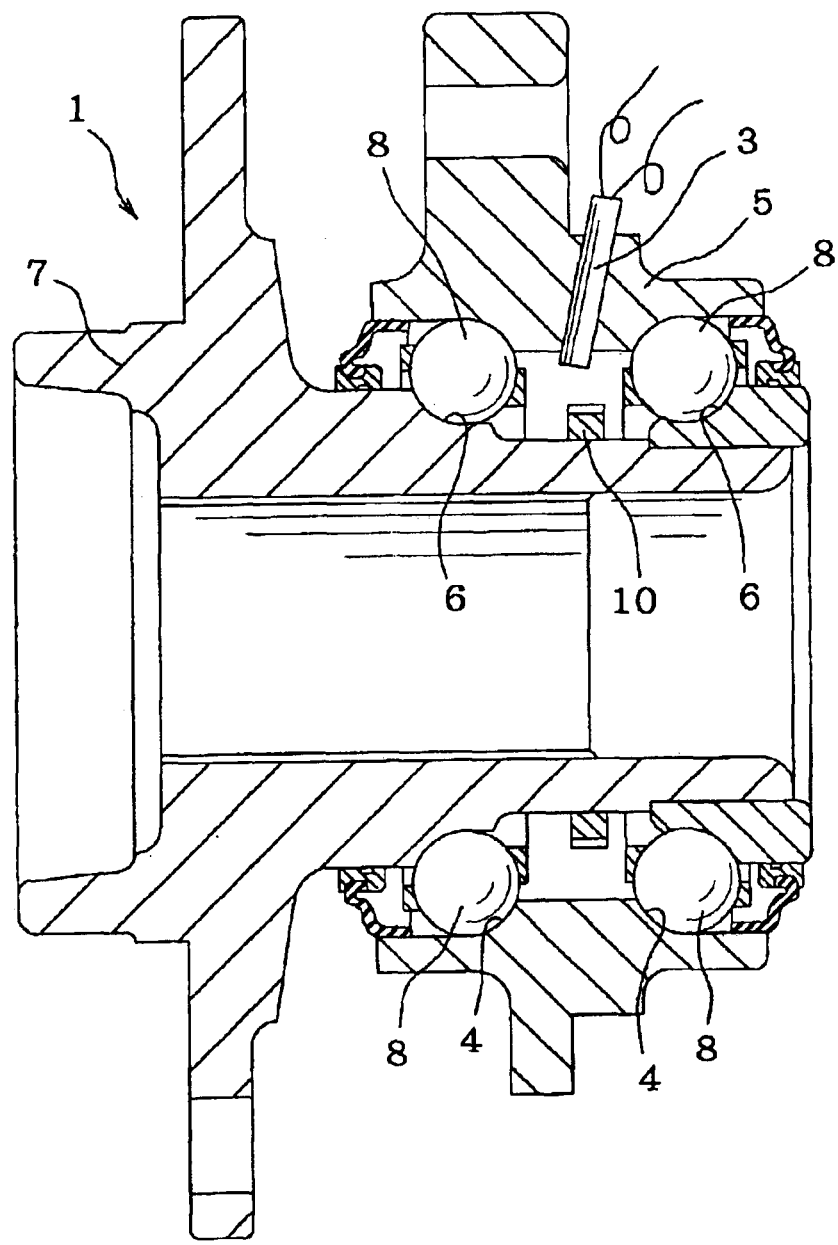
FIG. 42 is a cross sectional view to show another example of the conventional structure.

When the case of such a structure of this example is compared with the case where the encoder ring 10 is provided on an axially outer side of the nut 17 like the conventional structure shown in FIG. 40, a position in an axial direction where a sensor unit 31, mentioned next, is provided can be closer to an outer race 5, so that a temperature detection performance by means of the temperature sensor 21, mentioned later, can be improved. Moreover, the recess sections and the land sections are formed on the outer peripheral edge of the collar section 45 formed on the outer peripheral surface of the annular member 16 so that a function as an encoder is provided to the annular member 16. For this reason, effects such as reduction in a number of parts, shortening of an axial dimension, lightweighting and reduction in cost can be obtained in comparison with the conventional structures.

In addition, a cover 9 having a cylindrical section 19 is made of metal such as steel or aluminum for covering an opening at the end of a bearing housing 12 and a sensor mounting hole 46 is formed on a portion which is closer to a base end (closer to the right end in FIG. 20) of the cylindrical section 19 of the cover 12 for communication between the inner and outer peripheral surfaces of the cylindrical section 19. The sensor unit 31 is inserted into the sensor mounting hole 46 from the radially outside to the radially inside of the cylindrical section 19.

The sensor unit 31 is constituted so that the rotation detection sensor 3 and the temperature sensor 21 are held in the single holder 40. Similarly to the conventional one, the rotation detection sensor 3 comprises a magnetic resistance element, a hole element, a combination of a permanent magnet and a magnetic coil or the like, which changes an output corresponding to a change in the consistency or direction of magnetic flux. Such a rotation detection sensor 3 is embedded in the tip end portion of the holder 40 and its detecting surface is adjacently opposed to the outer peripheral edge of the collar section or encoder section 45.

Figure 26:
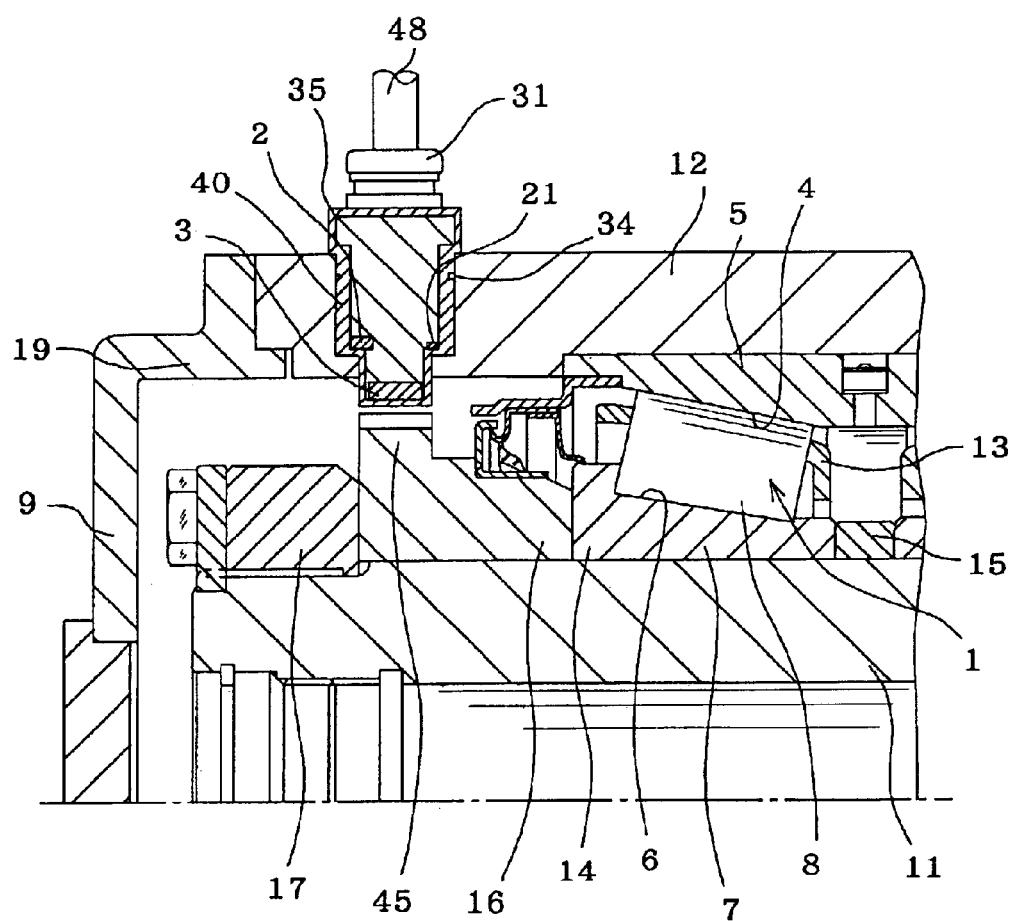
FIG. 26 is a cross sectional vies of a main portion to show another example of the embodiment of the present invention.

In the case where a so-called active type sensor using the magnetic resistance element, the hole element or the like is used as the rotation detection sensor 3, it is preferable that a thickness $T_{39}$ of the gap 39 existing between the detecting surface of the rotation detection sensor 3 provided to the tip end surface (lower end surface in FIG. 20) of the sensor unit 31 and the outer peripheral edge of the collar section 45 is restrained within the range of 0.5 to 6 mm as explained in the example of FIG. 26 of the present invention, mentioned later.

On the contrary, in the case where a so-called passive type sensor where the permanent magnet and the magnetic coil are combined is used as the rotation detection sensor 3, the thickness $T_{39}$ is restrained within the range of not less than ¼ to not more than 3 times as long as a height (radial distance between a bottom of the recess section and a top of the land section) of the land and recess sections formed on the outer peripheral edge of the collar section 45. The reason for this is in order to secure a performance of detecting a rotating speed by means of the rotation detection sensor 3 and improve an assembling property of the double row rolling bearing with the sensor unit of this embodiment.

Namely, the inventors of the present invention assembled the passive type rotation detection sensor and prepared samples in which the thickness $T_{39}$ was differed within the range of ⅙ to 5 times as long as the height of the land and recess sections and conducted experiments on the thickness $T_{39}$ for checking the rotating speed detecting performance and the assembly property. Results shown in the following Table 1 were obtained. In Table 1, a symbol "○" shows that the rotating speed detecting performance or the assembly property was good, a symbol "Δ" shows that the detecting performance was slightly bad, and a symbol "x" shows that the rotation detecting performance was bad and as for the assembly performance, the tip end portion of the rotating detection sensor 3 came in contact with the outer peripheral edge of the collar section 45 during the rotation of the axle 11.

TABLE 1

| $T_{39}$(time) | Detecting Performance | Assembly Performance |
|---|---|---|
| 1/6 | ○ | X |
| 1/5 | ○ | X |
| 1/4 | ○ | ○ |
| 1/3 | ○ | ○ |
| 1/2 | ○ | ○ |
| 1/1 | ○ | ○ |
| 1 | ○ | ○ |
| 2 | ○ | ○ |
| 3 | ○ | ○ |
| 4 | Δ | ○ |
| 5 | X | ○ |

From Table 1, it is found that when the thickness $T_{39}$ is restrained within the range of ¼ to 3 times as long as the height of the land and recess sections, the rotating speed detecting performance can be secured and the assembly property of the double row rolling bearing 1 can be good.

On the contrary, the temperature sensor 21 is supported to a portion of the holder 40 closer to the outer peripheral surface thereof. The position where the temperature sensor 21 is supported is close to the cover 9 to the utmost, so that it is easily influenced by a heat transmitted from the outer race 5 to the cover 9.

In order to improve the temperature detecting performance of the temperature sensor 21, heat conductivity of the holder 40 should be good, and heat capacity of the holder 40 should be small so that the temperature of the holder 40 reaches the ambient temperature in a short time.

Therefore, as a material of the holder 40, a material, the heat conductivity of which is large and the heat capacity of which per unit volume (=consistency×specific heat) is small, is suitable. Specifically, as the material of the holder 40, aluminum, magnesium, copper, zinc or alloy of them is desirably used as long as they have no problem of strength and cost. Moreover, it is desirable that these materials are used as materials of the bearing housing 12 and the cover 9 as long as they have no problems of strength and cost in order to allow the heat to be transmitted from the outer race 5 to the temperature sensor 21 easily. If there is any problem of strength, they may be made of stainless steel, but in the case where the holder 40 is made of stainless steel, non-magnetic stainless steel is used. This is because if the holder 40 is made of a magnetic material, the magnetism of the holder 40 prevents the measurement of the rotating speed by means of the rotation detection sensor 3, and thus it is difficult to measure the rotating speed accurately. For this reason, as the material of the holder 40, the non-magnetic material is preferable.

In a state that the above sensor unit 31 is inserted through the sensor mounting hole 46 from the radially outward side to the inward side of the cylindrical section 19, a mounting flange 35 provided on the outer peripheral surface is coupled with and fixed to the outer peripheral surface of the cylindrical section 19 by bolts 47. The detected section or encoder section is provided on the outer peripheral edge of the collar section 45. In this state, the detecting section of the rotation detection sensor 3 existing on the tip end surface of the sensor unit 31 is adjacently opposed via the gap 39 to the detected section or encoder section. Moreover, the temperature sensor 21 is adjacently opposed to the cylindrical section 19 of the cover 9 via a part of the holder 40.

A harness for taking out an output signal of the rotation detection sensor 3 and a harness for taking out an output of the temperature sensor 21 are packed into bundle so as to form one cable 48 and it is connected to a controller, not shown. Moreover, an O ring 34 is mounted between the outer peripheral surface of the holder 40 and the inner peripheral surface of the sensor mounting hole 46 so as to prevent foreign matters such as muddy water from intruding from the outside through the gap between these peripheral surfaces. Therefore, the sensor unit 31 is supported into a space which is blocked from the outside of the cover 9.

In the case of the double row rolling bearing with a sensor unit of the present embodiment, since the rotation detection sensor 3 and the temperature sensor 21 are held to the single holder 40, the mounting space of both the sensors 3 and 2 can be small. Further, the mounting operation of the sensors 3 and 21 becomes easy.

Moreover, since the harnesses for taking out the output signals of the sensors 3 and 21 are packed into bundle so as to form a single cable 48, the harnesses for taking out the signals of the sensors 3 and 21 are easily led. Further, in the case of this embodiment, since the sensor unit 31 is supported to the cover 9 which is provided to the opening of the bearing housing 12 detachably, the work for attaching and detaching the sensor unit 31 can be easily carried out for the maintenance work.

The cable 48 houses the harness for taking out the output signal of the rotation detection sensor 3 and the harness for taking out the output signal of the temperature sensor 21, but theses harnesses are shielded individually. Even in the case where a plurality of harnesses are packed into bundle so as to form the single cable 48, the harnesses are shielded individually so that signal currents flowing the harnesses, respectively, are prevented from interfering with each other. Particularly, if the harness for transmitting a pulse signal such as a signal representing a rotating speed from the rotation detection sensor 3 and the harness for transmitting an analog signal such as a signal representing a temperature from the temperature sensor 21 are packed into bundle without being individually shielded, a noise is put on the analog signal by electromagnetic coupling (electrostatic coupling, electromagnetic induction, coupling due to electromagnetic wave) at the time of fluctuation in a voltage and an electric current of the pulse signal. Accordingly, when the harnesses are shielded individually, a noise which is generated in the above manner can be prevented.

In addition, it is more preferable that the harnesses for taking out the output signals of the sensors 3 and 21 and a ground line for grounding are twisted because an influence of a noise due to the electromagnetic coupling can be further reduced. Moreover, the twist pair of the harness and the ground line paired in the twisted state are shielded individually or all twist pairs are shielded collectively, so that the effect for reducing the noise influence can be further increased. Particularly when the output signal of the rotation detection sensor 3 is a digital signal, in the case where the harness for transmitting the output signal of the rotation detection sensor 3 and the harness for transmitting the output signal of the temperature sensor 21, that is an analog signal, (further, an oscillation sensor such as an acceleration sensor 2 which is installed into the example shown in FIG. 36, mentioned later) are packed into bundle so as to form the single cable 48, the effect which is produced by twisting the harnesses for transmitting the output signals and the ground line is great.

In the example of the drawing, the outer peripheral edge of the collar section 45 formed integrally with the annular member 16 is formed with the land and recess sections, so that the annular member 16 is integral with the encoder. On the contrary, the encoder which can be formed into an annular shape independently is sandwiched between the annular member and the nut 17 or the outer peripheral edge of the outward flange-shaped collar section formed integrally with the outer peripheral surface at the inner end of the nut 17 can be formed into a land and recess shape, and the nut 17 can be integral with the encoder. Further, as the encoder, an annular one comprising a magnetic metal plate which is bent with a plurality of through holes formed on its part in a circumferential direction, or an annular permanent magnet, in which S poles and N poles are arranged alternatively in the circumferential direction, can be used. In these cases, the providing position of the sensor unit 31 in the axial direction can be closer to the outer race 5, and in comparison with the case where the encoder exists on the axially outer side of the nut like the above-mentioned conventional structure, the temperature detecting performance of the temperature sensor 21 can be improved.

Moreover, a blow-off plate for covering a portion of the sensor unit 31 protruded from the outer peripheral surface of the cover 9 is provided such that the sensor unit 31 can be prevented from being cooled by air so that the rise in temperature of the double row rolling bearing 1 can be detected accurately by the temperature sensor 21.

Here, a direction where the cable 48 is taken out from the sensor unit 31 is not limited to a diametrical direction shown in the drawing, and can be suitable directions such as a direction of a tangent line and its middle direction corresponding to the providing position. In this case, an L-shaped part or the like for guiding a leading direction of the cable 48 can be provided to a root portion of the cable 48.

Figure 22:
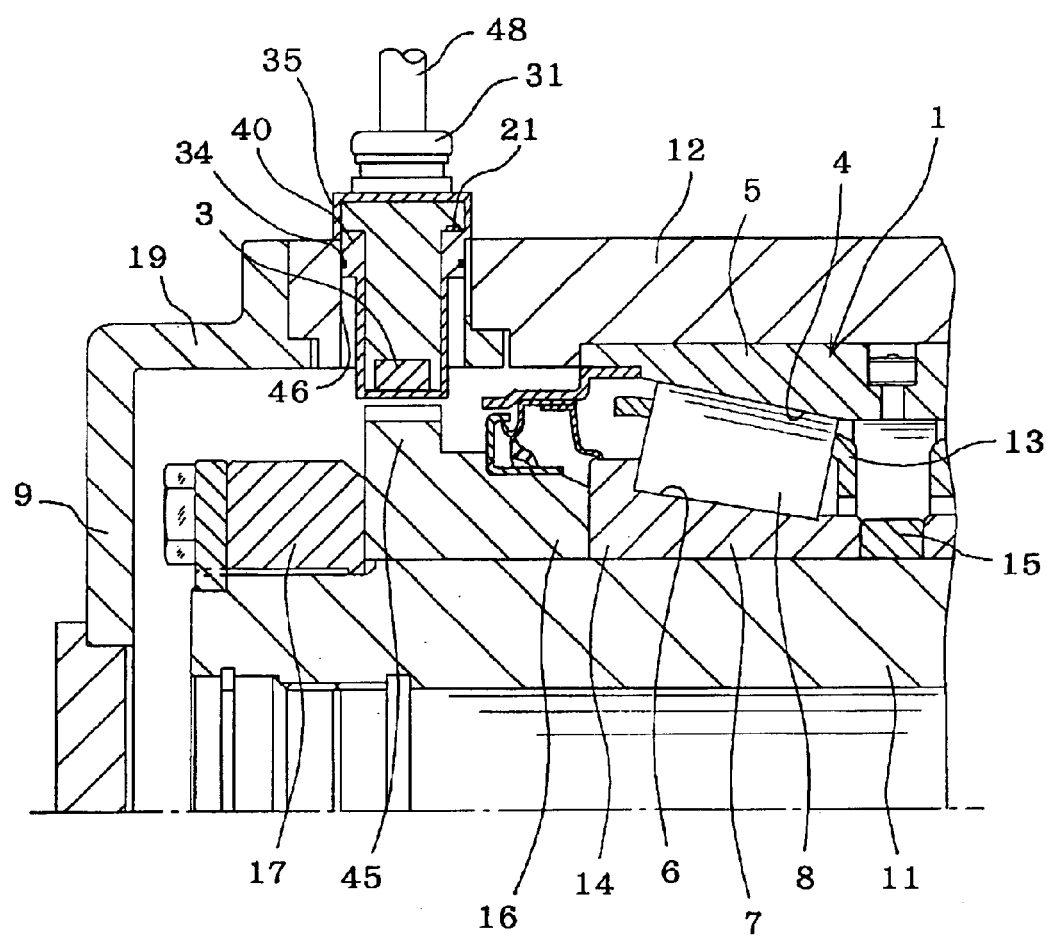
FIG. 22 is a cross sectional vies of a main portion to show another example of the embodiment of the present invention.

Next, FIG. 22 shows another example of the embodiment of the present invention. In this example, a bearing housing 12 is extended to a circumference of the annular member 16, and the sensor mounting hole 46 is provided to the end portion of the bearing housing 12.

In the case of this example, in comparison with the example of FIGS. 20 and 21, working of a sensor attachment bearing surface and the sensor mounting hole 46 becomes troublesome, and an axial dimension of the bearing housing 12 becomes large and thus its weight increases (the weight tends to increase in a design when a dimension of the bearing housing becomes large, in comparison with the case where the axial dimension of the cover becomes large), and the work for attaching/detaching the sensor unit 31 to/from the sensor mounting hole 46 at the time of maintenance work or the like becomes slightly troublesome. However, the heat transmission from the outer race 5 of the double row rolling bearing 1 to the temperature sensor 21 is better than the case of the first embodiment.

Since the other structures and functions are substantially the same as those in the example of FIGS. 20 and 21, the explanation thereof is omitted.

Figure 23:
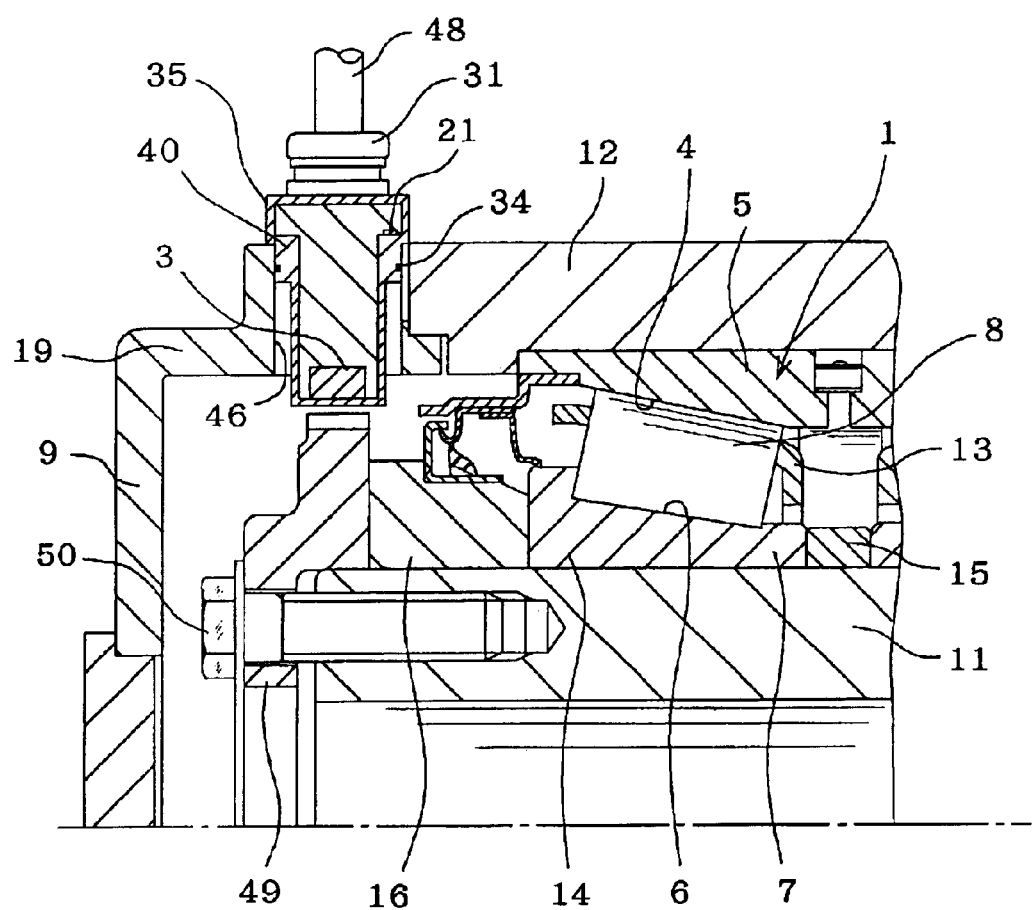
FIG. 23 is a cross sectional vies of a main portion to show another example of the embodiment of the present invention.

Next, FIG. 23 shows another example of the embodiment of the present invention. In this example, in order to suppress the inner race 7 and an annular member 16 to the axial direction, a press plate 49 which is entirely formed into a circular shape with a crank-shaped section is coupled and fixed to the end surface of the axle 11 by a plurality of bolts 50. Recess sections and land sections are formed on an outer peripheral edge of the press plate 49 alternatively in a circumferential direction with an equal interval, so that the magnetic characteristics of the outer edge portion are changed alternatively in the circumferential direction with the equal interval. Moreover, the press plate 49 is provided with a function as an encoder ring for detecting the rotating speed.

Since the other structures and functions are substantially the same as those in the example of FIGS. 20 and 21, the explanation thereof is omitted.

Figure 24:
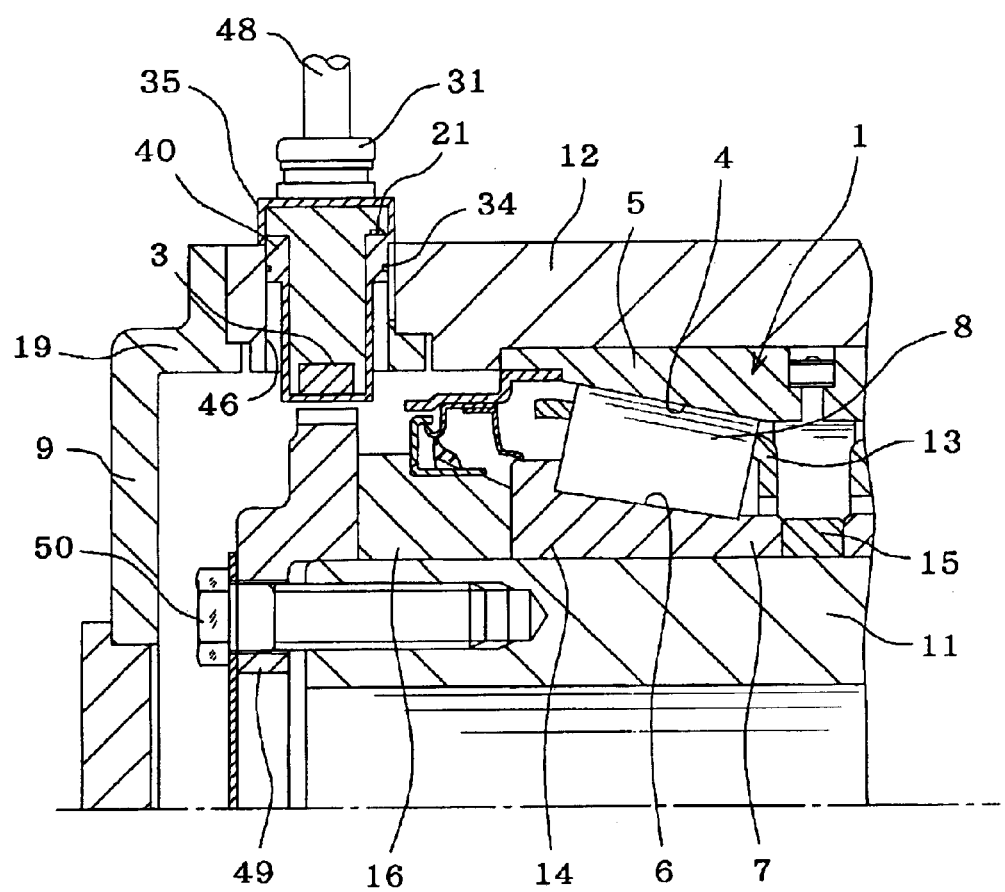
FIG. 24 is a cross sectional vies of a main portion to show another example of the embodiment of the present invention.

Next, FIG. 24 shows another example of the embodiment of the present invention. In this example, the bearing housing 12 is extended to a circumference of the press plate 49, and the sensor mounting hole 46 is provided to the end portion of the bearing housing 12

In this example, in comparison with the example of FIG. 23, the working of the sensor attachment bearing surface and the sensor mounting hole 46 becomes troublesome, the axial dimension of the bearing housing 12 becomes large and thus its weight increases, the work for attaching/detaching the sensor unit 31 to/from the sensor mounting hole 46 at the time of maintenance work or the like becomes more or less troublesome. However, the heat transmission from the outer race 5 of the double row rolling bearing 1 to the temperature sensor 21 is better than the case of the example of FIG. 23.

Since the other structures and functions are the same as those in the example of FIG. 22, the explanation thereof is omitted.

Figure 25:
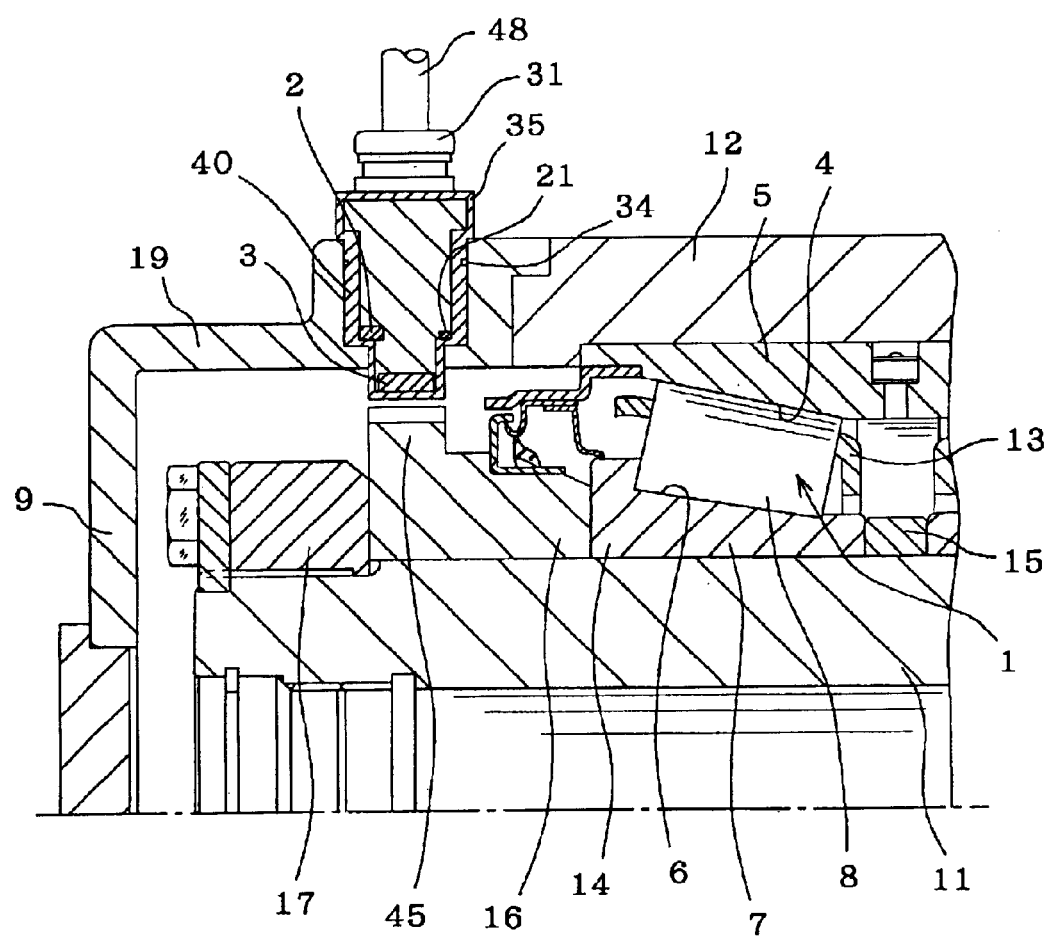
FIG. 25 is a cross sectional vies of a main portion to show another example of the embodiment of the present invention.

Next, FIG. 25 shows another example pf the embodiment of the present invention. In this example, a diameter of a middle portion of a holder 40 is larger than a diameter of its tip end portion, so that an outer peripheral surface of the holder 40 has a stepped shape. The temperature sensor 21 is provided to a portion adjacent to the stepped portion existing closer to the tip end of the holder 40, and further in order to provide satisfactory heat transmission to the temperature sensor 21, the tip end portion and the stepped portion of the holder 40 are covered by the same material as the cover 9 (for example, iron or steel). Further, in this example, an acceleration sensor 2 for detecting vibration in addition to the rotation detection sensor 3 and the temperature sensor 21 is installed into the holder 40 so as to compose a sensor unit 31. A harness for taking out a signal of the acceleration sensor 2 is packed together with the harnesses for taking out the signals of the rotation detection sensor 3 and the temperature sensor 21 into bundle so as to form the single cable 48.

In this example, the harness for taking out the output signal of the rotation detection sensor 3, the harness for taking out the output signal of the temperature sensor 21 and the harness for taking out the signal of the acceleration sensor 2 are housed in the single cable 48. The harnesses are twisted with the ground line or are shielded individually or the twist pairs in which the harness and ground line are twisted are shielded similarly to the case of the example of FIGS. 20 and 21. Signal currents flowing the respective harnesses are prevented from interfering with each other.

In such a structure, if the harness for transmitting a pulse signal such as a signal representing a rotating speed from the rotation detection sensor 3 and the harness for transmitting an analog signal such as a signal representing temperature or vibration from the temperature sensor 21 and the acceleration sensor 2 are packed into bundle, a noise is put on the analog signal by electro-magnetic coupling at the time of fluctuation in a voltage and an electric current of the pulse signal. On the contrary, as in the present invention, the respective harnesses are twisted with the ground line or are shielded individually or the twist pairs in which the harness and ground line are twisted are shielded, so that a noise to be generated in the above manner can be prevented.

Particularly in the case of the harness for transmitting a signal with low output such as a signal representing vibration from the acceleration sensor 2, the noise preventing effect which is obtained by the shielding and twisting is great, and thus the shielding or twisting is preferably carried out. The effect can be obtained also by the shielding and twisting of the harnesses with the ground line individually, but when the harnesses and ground lines are shielded and twisted together, more excellent noise preventing effect can be obtained. In this case, it is the most preferable from the aspect of the noise preventing effect that the twist pairs in which the harnesses for transmitting the output signals and the ground lines are twisted are shielded collectively.

Here, a noise can be removed to a certain extent by providing a low-pass filter to circuit portions or instrument sides of the sensors 3, 21 and 2.

In addition, in the case of this example, since not only the temperature sensor 21 but also the acceleration sensor 2 which serves as the vibration sensor for detecting vibration is installed, in the case where abnormalities such as flaking occur on a rolling bearing such as the double row rolling bearing 1, the flaking state can be detected immediately. Therefore, in comparison with the case where only the temperature sensor 21 is installed, the structure which is suitable for monitoring abnormalities of a rolling bearing can be realized. Here, in order to monitor both abnormalities of a rolling bearing and a rotating speed, it is the most preferable that three kinds of sensors: the rotation detection sensor 3; the temperature sensor 21; and the vibration sensor such as the acceleration sensor 2 are combined like this embodiment.

However, both abnormalities of the rolling bearing and a rotating speed can be monitored by the combination of the rotation detection sensor 3 and the vibration sensor such as the acceleration sensor 2 or the combination of the rotation detection sensor 3 and the temperature sensor 21. On the contrary, in order to monitor only abnormalities of the rolling bearing, the temperature sensor 21 and the vibration sensor such as the acceleration sensor 2 are combined and the rotation detection sensor 3 can be omitted. In this case, it is not necessary to form the recess and land sections on the outer peripheral edge of the collar section 45.

Moreover, also in the case where the harness for transmitting the output signal of the temperature sensor 21 and the harness for transmitting the output signal of the vibration sensor such as the acceleration sensor 2 are combined, it is preferable that as mentioned above the harnesses are twisted with the ground lines individually, the harnesses are shielded individually or the twisted pairs in which the harnesses are twisted with the ground lines are shielded depending on values of the vibration detected by the vibration sensor (amplitude of an output signal representing vibration).

Since the other structures and functions are substantially the same as those of the example of FIGS. 20 and 21, the explanation thereof is omitted.

Next, FIG. 26 shows another example of the embodiment of the present invention. In this example, the bearing housing 12 is axially extended to radially cover the circumference of the annular member 16, and the sensor mounting hole 46 is provided to the end portion of the bearing housing 12.

In this example, in comparison with the example of FIG. 24, the working of the sensor attachment bearing surface and the sensor mounting hole 46 becomes troublesome, the axial dimension of the bearing housing 12 becomes large and thus its weight increases, the work for attaching/detaching the sensor unit 31 to/from the sensor mounting hole 46 at the time of maintenance work or the like becomes more or less troublesome. However, the heat transmission from the outer race 5 of the double row rolling bearing 1 to the temperature sensor 21 is better than the case of the example of FIG. 24.

Since the other structures and functions are substantially the same as those in the fifth embodiment, the explanation thereof is omitted.

Figure 27:
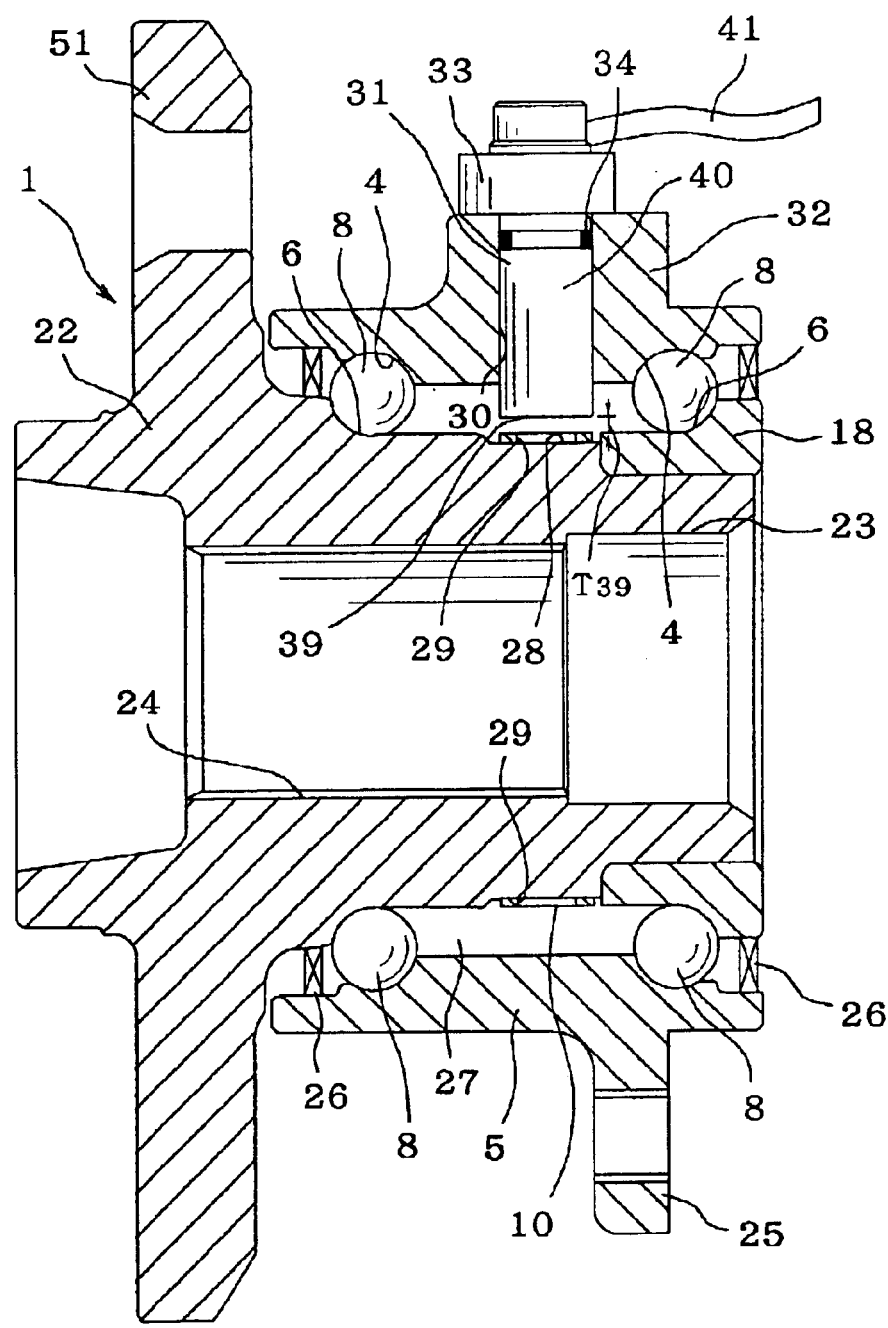
FIG. 27 is a cross sectional vies of a main portion to show another example of the embodiment of the present invention.
Figure 28:
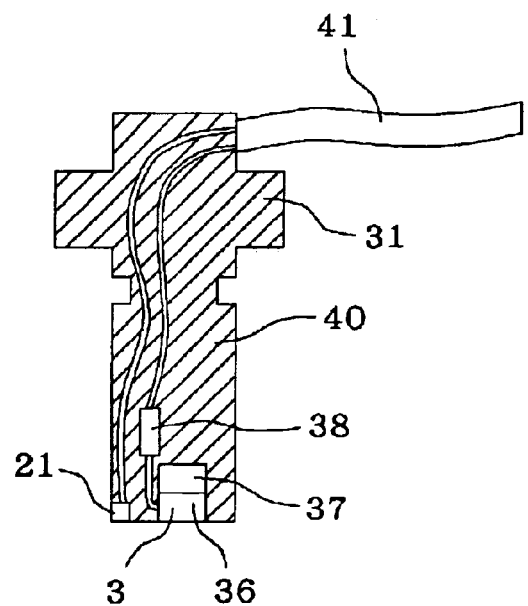
FIG. 28 is a cross sectional vies of a sensor unit installed in the example of FIG. 27.

Next, FIGS. 27 and 28 show another example of the embodiment of the present invention. A hub 22 is formed into a hollow cylindrical shape, and cooperates with an inner race element 18, mentioned later, to compose an inner race. A wheel and a disk rotor of a braking apparatus are fixed to a flange 51 formed on an outer peripheral surface on the outer end portion of the hub 22 by a plurality of studs, not shown. An outside inner-ring raceway 6 is formed on an outer peripheral surface on the middle portion of the hub 22, and the inner race element 18 having an inside inner-ring raceway 6 on its outer peripheral surface is externally fixed to a stepped portion 23 formed on the inner end portion of the hub 22. A spline shaft attached to a constant velocity joint, not shown, is inserted into a spline hole 24 formed in a center portion of the hub 22 in the state that it is installed into an automobile.

Meanwhile, an outer race 5 is arranged around the hub 22 and the inner race element 18, and the double row outer-ring raceways 4 are formed on the inner peripheral surface of the outer race 5, and a mounting section 25 is formed on the outer peripheral surface of the outer race 5, and the outer race 5 is coaxial with the hub 22 and the inner race element 18. The mounting section 25 is used in order to support and fix the outer race 5 to a suspension apparatus, not shown, such as a knuckle. Moreover, a plurality of rolling elements 8 are provided between the outer-ring raceways 4 and the inner ring raceways 6, respectively, and the hub 22 and the inner race element 18 for fixing the wheel are rotatively supported to an inner diameter side of the outer race 5 fixed to the suspension apparatus.

Here, in the case where a rolling bearing unit for an automobile, the weight of which is large, instead of the balls shown in the drawing, tapered rollers are occasionally used as the rolling elements 8. Moreover, the outside inner-ring raceway 6 is occasionally formed on the outer peripheral surface of a separate inner race instead of directly on the outer peripheral surface of the hub 22.

In addition, seal rings 26 are attached to between the inner peripheral surface at both axial ends of the outer race 5, and the outer peripheral surface at the axially middle portion of the hub 22 and the outer peripheral surface of the axially inner end of the inner race element 18 so as to cover openings at both axial ends of a space 27 where the plural rolling elements 8 are provided. This prevents grease, which is sealed into the space 27, from leaking to the outside, and foreign matters, which float in the ambient air, from entering the space 27.

In addition, a cylindrical surface section 28 is formed on the outer peripheral surface on the axially middle portion of the hub 22 at a portion between the outside inner ring raceway 6 and the stepped section 23, coaxially with the hub 22. An encoder ring 10 is externally fixed to the cylindrical surface section 28 by interference fitting. The encoder ring 10 is formed generally into a cylindrical shape by a magnetic metal plate such as a steel plate like SPCC, and a plurality of through holes 29 which are a kind of cut-away portions are formed on the axially middle portion along the circumferential direction with equal gaps. The through holes 29 have a slit shape which is long in the axial direction (right-left direction in FIG. 27). Moreover, the portions between the adjacent through holes 29 in the circumferential direction are column portions which serve as solid portions. With this structure, the magnetic property of the outer peripheral surface of the axially middle portion of the encoder ring 10 is changed alternatively along the circumferential direction with equal intervals.

Meanwhile, a mounting hole 30 is formed on the axially middle portion of the outer race 5 opposed to the outer peripheral surface of the encoder ring 10 so as to pierce from the outer peripheral surface to the inner peripheral surface of the outer race 5. A sensor unit 31 is inserted into the mounting hole 30 from an opening on the outer diameter side, and a tip end surface of the sensor unit 31 (lower end surface in FIG. 27) is adjacently opposed to the outer peripheral surface of the encoder ring 10. The mounting section 25 is circumferentially discontinuous at a portion including the opening on the outer diameter side of the mounting hole 30 so that the sensor unit 31 is freely inserted into the mounting hole 30 in such a manner. Instead, a mounting seat 32 is formed on the outer peripheral surface of the outer race 5. The sensor unit 31 has a flange 33 provided on the base end portion (upper end portion in FIG. 27) and is fixed to the outer race 5 by screwing the flange 33 to the mounting seat 32. Moreover, the inner peripheral surface of the mounting hole 30 and the outer peripheral surface of the sensor 31 are sealed by an O ring 34 therebetween.

As shown in FIG. 28, the sensor unit 31 is constituted so that a rotation detection sensor 3 and a temperature sensor 21 are installed (embedded to be supported) into a holder (case) 40 made of synthetic resin. The rotation detection sensor 3 is a so-called active type sensor which is composed of a magnetic detecting element 36 such as a hole element, MR element or the like, in which characteristics are changed corresponding to a passing magnetic flux amount of a permanent magnet 37 which is a source of generating magnetic flux passing through the magnetic detecting element 36 and is magnetized in an up-down direction in FIG. 28, and a waveform shaping circuit 38 for shaping a waveform of a signal (into rectangular waveform) corresponding to change in the characteristics of the magnetic detection element 36.

The magnetic detection element 36 is adjacently opposed to the outer peripheral surface on the axially middle portion of the encoder ring 10 via a clearance 39 therebetween. A thickness $T_{39}$ of the clearance 39 in a radial direction is restrained within a range of 0.5 to 6 mm ($T_{39}$=0.5 to 6 mm). This is for securing a detecting performance of the rotating speed by means of the rotation detection sensor 3 and improving the assembly property of the double row rolling bearing with a sensor unit of this example.

Namely, the present inventors manufactured samples in which the thickness $T_{39}$ was varied within the range of 0.1 to 8 mm, and conducted an experiment for checking the detecting performance of the rotating speed and the assembly property for each sample. The following results shown in Table 2 were obtained. In Table 2, a symbol "○" shows that the detecting performance of the rotating speed or the assembly property were good, a symbol "Δ" shows that the detecting performance is slightly bad, and a symbol "x" shows that the detecting performance of the rotating speed is bad and that as for the assembly property, the tip end portion of the rotation detection sensor 3 came in contact with the encoder ring 10 as the hub 2 and the inner ring element 18 rotate.

TABLE 2

| $T_{39}$(mm) | Detecting Performance | Assembly Performance |
| --- | --- | --- |
| 0.1 | X | X |
| 0.3 | X | X |
| 0.5 | ○ | ○ |
| 1 | ○ | ○ |
| 2 | ○ | ○ |
| 3 | ○ | ○ |
| 4 | ○ | ○ |
| 5 | ○ | ○ |
| 6 | ○ | ○ |
| 7 | Δ | ○ |
| 8 | X | ○ |

According to Table 2, it is found that when the thickness $T_{39}$ is restrained within the range of 0.5 to 6 mm, the detecting performance of the rotating speed is secured and the assembly property of the double row rolling bearing 1 is made to be satisfactory.

In addition, a thermistor which is the temperature sensor 21 is embedded and supported to the tip end portion of the holder 40, so that the temperature in the space 27 where the rolling elements 8 are arranged can be freely detected. Detecting signals of the rotation detection sensor 3 and the temperature sensor 21 composing the sensor unit 31 are taken out via a harness 41 led out from the base end surface of the holder 40 so as to be transmitted to a controller, not shown.

The rotation detection sensor 3 of the sensor unit 31 detects one or both of a rotating speed and a number of revolution of a wheel in the following manner. When the encoder ring 10 which is externally fixed to the hub 22 rotates corresponding to rotation of the wheel, the through holes 29, which are formed on the axially middle portion of the encoder ring 10, and the column sections, which exist between the circumferentially adjacent through holes 29, pass alternatively through the vicinity portion of the magnetic detecting element 36. As a result, an amount of magnetic flux flowing in the magnetic detection element 36 changes, and an output of the rotation detection sensor 3 changes. Since a frequency with which the output changes is proportional to the rotating speed of the wheel, when the output signal is input into the controller, not shown, via the harness 41, the rotating speed of the wheel is obtained so that ABS and TCS can be controlled suitably. Moreover, since the number of revolution of the wheel is obtained by the number of change in the output and a running distance is obtained from the number of revolution, the rotation detection sensor 3 can be utilized in control of a car navigation system.

Meanwhile, the temperature sensor 21 detects the temperature of the space 27 which is the inside of a rolling bearing unit for supporting a wheel, and transmits the detected temperature to the controller, not shown, via the harness 41. A rise in the temperature of the rolling bearing unit for supporting a wheel and an overheating state of a brake can be known. The rise in the temperature of the rolling bearing unit for supporting a wheel becomes important data for knowing a lifetime of the rolling bearing unit for supporting a wheel, and also can be utilized for giving a warning to a driver before a dangerous state of a vapor lock or the like appears.

Since the overheating state of the brake portion is transmitted from the disk rotor to the hub 22, it is preferable that the temperature sensor 21 is provided on the tip end surface of the sensor unit 31 so as to be adjacently opposed to the hub 22. On the contrary, the rise in the temperature of the rolling bearing unit for supporting a wheel can be known also from a temperature of the outer race 5. In order to measure the temperature of the outer race 5, the temperature sensor 21 can be provided to a middle portion of the holder 40 opposed to the inner peripheral surface of the mounting hole 30. In any case, the temperature sensor 21 is provided so as to be adjacent to or abut against a portion to be measured, so that a temperature of the portion to be measured can be measured accurately and abnormality of the rolling bearing unit for supporting a wheel and the overheating state of a brake are apprehended early and a warning can be given.

Furthermore, since the temperature sensor 21 is embedded to be supported into the holder 40 which also holds the rotation detection sensor 3, the weight and the assembly space of the temperature sensor 21 are not increased, the number of the assembly steps is not increased, and the automobile manufacturing cost is not increased than required. Moreover, since a lead wire for transmitting the detecting signals of the sensors 3 and 21 to the controller can be bundled into one harness 41 housed in the same coating, a weight of the harness 41 can be reduced and the wiring work can be simplified.

Figure 29:
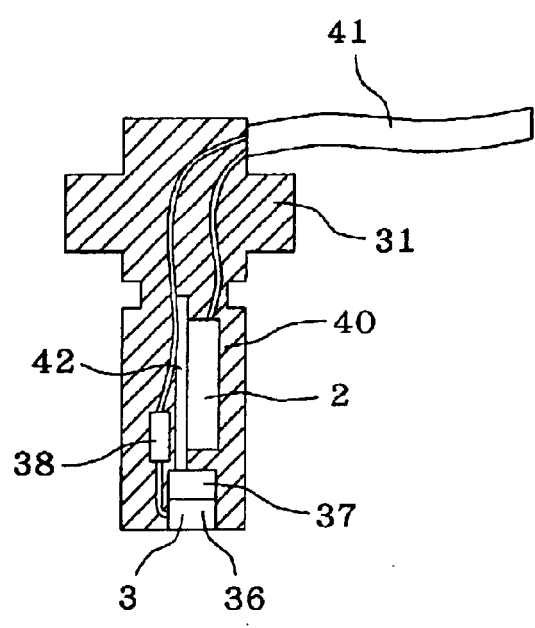
FIG. 29 is a cross sectional vies of a sensor unit installed in another example of the embodiment of the present invention.

Next, FIG. 29 shows another example of the embodiment of the present invention. In a sensor unit 31 to be used in this example, in addition to the magnetic detecting element 36, the permanent magnet 37 and the waveform shaping circuit 38, which compose the rotation detection sensor 3, an acceleration sensor 2 are embedded and supported into a holder 40 made of synthetic resin. The acceleration sensor 2 serves as a vibration sensor for measuring vibration of the double row rolling bearing portion, and it is constituted so as to be molded into the holder 40, for example, in a state that a small acceleration sensor using a piezoelectric element and a signal processing circuit are mounted to a substrate 42. In order to miniaturize the whole sensor unit 31, it is preferable that, as shown in FIG. 29, such an acceleration sensor 2 is installed on a side closer to the base end than the magnetic detecting element 36 and the permanent magnet 37 (upper side of FIG. 29) in series with the magnetic detecting element 36 and the permanent magnet 37 with respect to the axial direction of the holder 40 (in an up-down direction in FIG. 29).

The structure, in which the above sensor unit 31 is fixed to the outer race 5 (see FIG. 27) of the double row rolling bearing for supporting a wheel and the output signals of the sensors 3 and 2 are taken out, and the function when the rotating speed of the wheel is detected by the rotation detection sensor 3 are substantially the same as the case of the example of FIGS. 27 and 28.

Particularly in the case of this embodiment, the acceleration sensor 2 is embedded to be supported into the holder 40 made of synthetic resin so as to be integral with the sensor unit 31, and the sensor unit 31 is tightly fixed to the outer race 5. Accordingly, the vibration of the outer race 5 can be measured accurately. Since the vibration transmitted from the wheel to the hub 22 is transmitted to the outer race 5 via the rolling elements 8 (see FIG. 27), a signal output from the acceleration sensor 2 is input into the controller, not shown, so that unevenness of a road which contacts with a wheel, and an air pressure of a tire, speed increasing and reducing condition and the like can be known. An attenuation amount of a damper installed into the suspension system can be adjusted automatically, and an output of an engine can be adjusted. Moreover, an abnormal vibration, which is generated because the lifetime of the rolling bearing unit for supporting a wheel expires, is detected and a warning can be given to a driver.

A direction of the vibration detected by the acceleration sensor 2 can be freely adjusted by restraining a direction of the acceleration sensor 2 in the sate that the rolling bearing unit for supporting wheel is supported to the suspension system (installed state). For example, when the case where the acceleration sensor 2 is composed of general piezoelectric elements is considered, a direction of vibration which can be detected by the acceleration sensor 2 is one of a-axis, b-axis and c-axis shown in FIG. 30(A). Vibration in a right-angled direction to each axis is seldom detected, and as for vibration which is applied to a slanted direction with respect to each axis, a component which is parallel with each axis is detected.

Figure 30A:
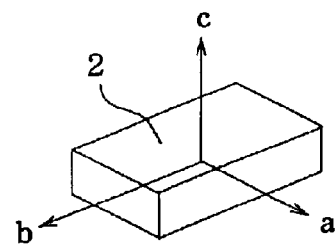
FIG. 30 is a perspective view to explain the installation state in the case that an oscillation sensor capable of detecting oscillation only in one direction is used.
Figure 30B:
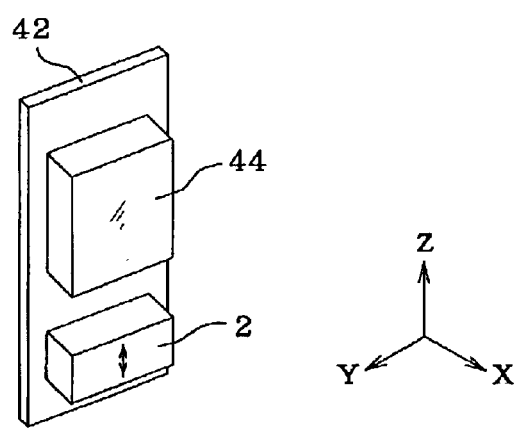
Figure 30C:
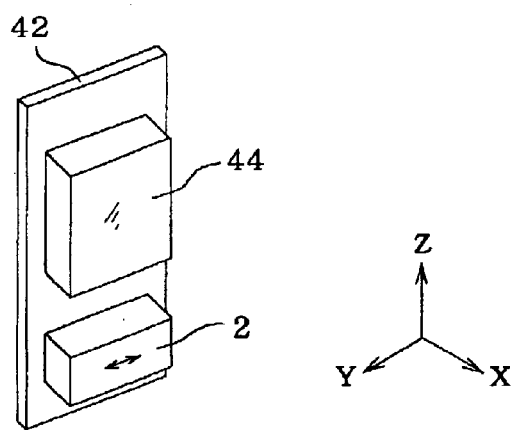

Therefore, it is provided that FIGS. 30(B) and 30(C) indicate the installed state where an X-direction in FIGS. 30(B) and 30(C) is a widthwise direction of a vehicle, a Y-direction is a front-rear direction of the vehicle, and a Z-direction is an up-down direction of the vehicle. Here, in FIGS. 30(B) and 30(C), arrows shown in the acceleration sensor 2 indicate directions of vibration to be detected by the acceleration sensor 2. Firstly, as shown in FIG. 30(B), when the detecting direction of the acceleration sensor 2 is aligned with the Z-direction, the vibration in the up-down direction of the vehicle can be detected effectively, and vibration in the advancing direction and vibration in-the widthwise direction cannot be detected. Moreover, as for the vibration to be applied to the direction slanted with respect to the up-down direction, a component of the up-down direction is detected. Next, as shown in FIG. 30(C), in the case where the detecting direction of the acceleration sensor 2 is aligned with the Y direction, the vibration in the front-rear direction of the vehicle can be detected effectively, and the vibration in the up-down and widthwise directions cannot be detected.

Moreover, as for the vibration which is applied to the direction slanted with respect to the front-rear direction, a component in the front-rear direction is detected. Here, in FIGS. 30(B) and (C), a signal processing circuit 44 for processing a detecting signal of the vibration sensor is provided.

Figure 31:
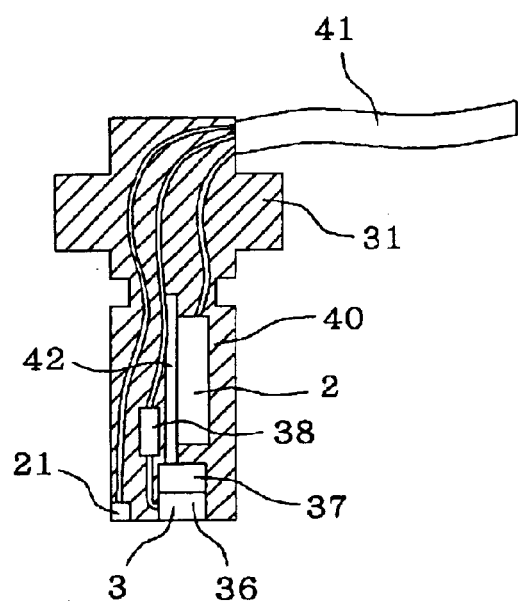
FIG. 31 is a cross sectional vies of a sensor unit installed in another example of the embodiment of the present invention.

Next, FIG. 31 shows another example of the embodiment of the present invention. In a sensor unit 31 to be used in this example, the rotation detection sensor 3, the temperature sensor 21 and the acceleration sensor 2 are embedded to be supported into a holder 40 made of synthetic resin. Since the function of the temperature sensor 21 is substantially the same as that in the example of FIGS. 27 and 28 and the function of the acceleration sensor 2 is substantially the same as that in the example of FIG. 29. So, the same reference numerals are given to the equivalent parts, and the overlapped explanation is omitted.

Figure 32:
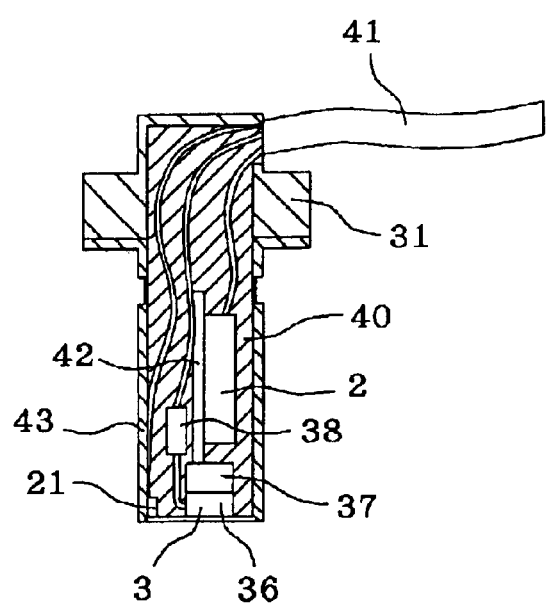
FIG. 32 is a cross sectional vies of a sensor unit installed in another example of the embodiment of the present invention.

Next, FIG. 32 shows another example of the embodiment of the present invention. In a sensor unit 31 to be used in this embodiment, the holder 40 made of synthetic resin into which the rotation detection sensor 3, the temperature sensor 21 and the acceleration sensor 2 are embedded to be supported is held into a case 43 made of nonmagnetic metal such as aluminum, copper or nonmagnetic stainless. When such a case 43 is provided, strength of the sensor unit 31 is improved and the rotation detection sensor 3 is hardly influenced by external magnetic flux. Further, the temperature sensor 21 is installed in a state it contacts with the case 43, so that the temperature detecting performance using the temperature sensor 21 is improved. Here, the structure that such a case 43 is provided can be combined with the structure of the example in FIG. 28 or the example in FIG. 31.

Figure 33:
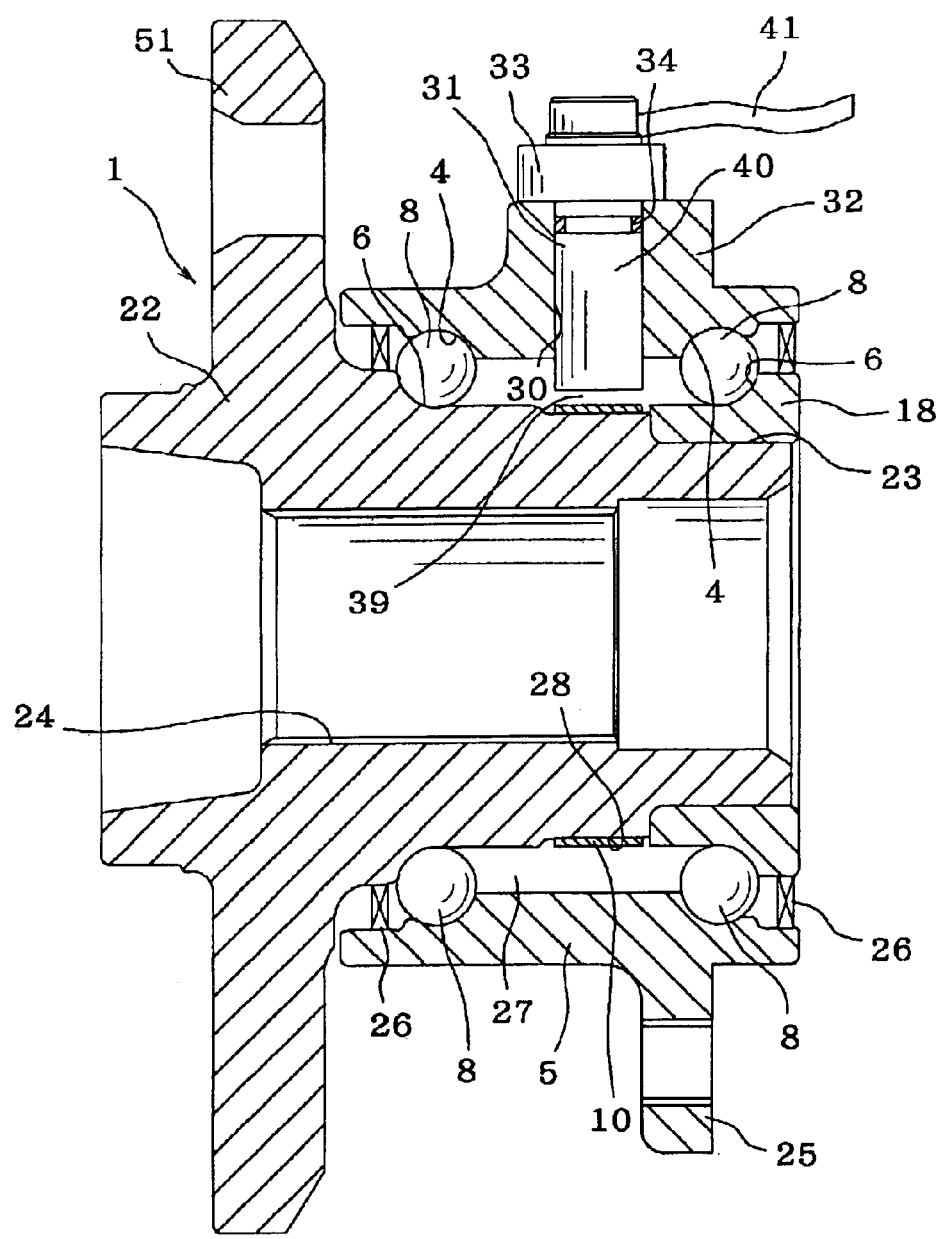
FIG. 33 is a cross sectional vies of a main portion to show another example of the embodiment of the present invention.
Figure 34:
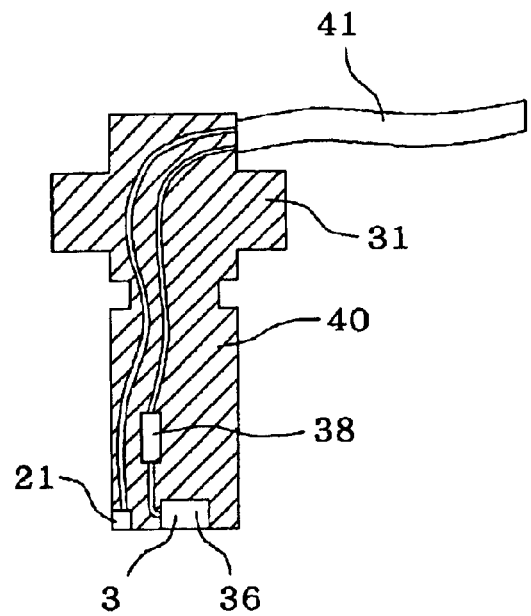
FIG. 34 is a cross sectional vies of a sensor unit installed in another example of the embodiment of the present invention.

Next, FIGS. 33 and 34 shows another example of the embodiment of the present invention. In the case of this embodiment, in order to detect the rotating speed of the hub 22, an encoder ring 10 which is externally fixed to the hub 22 is made of permanent magnet. The encoder ring 10 has a cylindrical core and an encoder body made of rubber magnet, into which ferrite powder, rare earth magnetic powder or the like is mixed, such that the encoder body is attached to the entire outer peripheral surface of the cylindrical core. The encoder body may be a plastic magnet or a bond magnet. Moreover, the core may be made from various metal, synthetic resin, but a magnetic metal plate such as a carbon steel plate is preferable for the core because the strength of the magnetic flux generated from the outer peripheral surface of the encoder body can be heightened and even if the gap 39 between the outer peripheral surface of the encoder body and the detecting section of the rotation detection sensor 3 installed into the holder 40 is widened, the reliability of the rotation detection can be secured. Further, the encoder ring 10 may be constituted so that the core is not provided but the encoder body is directly fixed to the outer peripheral surface of the hub 22 by resin mold or bonding.

In any cases, the encoder body is magnetized in a diametrical direction, and the magnetizing direction is changed alternatively in the circumferential direction with equal intervals. Therefore, S poles and N poles are arranged on the outer peripheral surface of the encoder ring 10 alternatively with equal intervals in the circumferential direction. The magnetizing pattern of the encoder body is generally alternative with equal intervals, but this is not necessarily applied. For example, as described in Japanese Patent Publication No. Tokukai 02000-346673, a magnetizing pattern in which the S poles, the N poles and non-magnetizing areas are repeated alternatively is adopted, so that not only the rotating speed but also rotating direction can be detected. Namely, a desirable magnetizing pattern may be adopted according to a necessary function.

In any cases, in the sensor unit 31 installed into the mounting hole 30 of the outer race 5 according to the case where the permanent magnet is used for the encoder ring 10, the permanent magnet 37 shown in FIG. 28 is not provided. Namely, the magnetic detecting element 36 and the waveform shaping circuit 38, which are the rotation detection sensor 3, and the temperature sensor 21 are installed (embedded to be supported) into the sensor unit 31.

Since the structures and functions of the other parts are substantially the same as those in the example shown in FIGS. 27 and 28, the same reference numerals are given to the equivalent parts, and the overlapped explanation is omitted.

Figure 35:
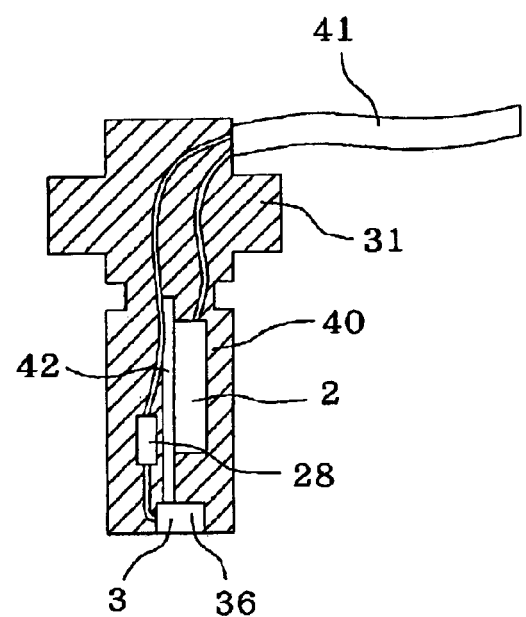
FIG. 35 is a cross sectional vies of a sensor unit installed in another example of the embodiment of the present invention.

Next, FIG. 35 shows another example of the embodiment of the present invention. In a sensor unit 31 to be used in this embodiment, the acceleration sensor 2, in addition to the magnetic detecting element 36 and the waveform shaping circuit 38 composing the rotation detection sensor 3, is embedded to be supported into the holder 40 made of synthetic resin. The example of FIG. 35 is similar to the example shown in FIG. 29 except that the permanent magnet is not installed into the rotation detection sensor 3 according to the case where the permanent magnet is used for the encoder ring 10 (see FIG. 33). For this reason, the same reference numerals are given to the equivalent parts, and the overlapped explanation is omitted.

Figure 36:
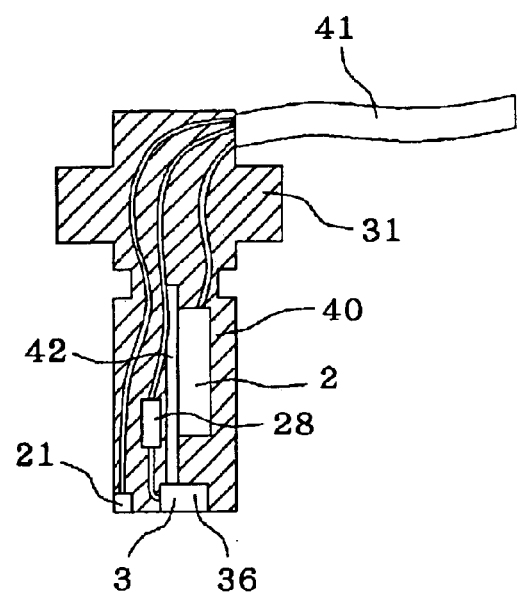
FIG. 36 is a cross sectional vies of a sensor unit installed in another example of the embodiment of the present invention.

Next, FIG. 36 shows another example of the embodiment of the present invention. In a sensor unit 31 to be used in this example, the temperature sensor 21 and the acceleration sensor 2 as well as the rotation detection sensor 3 are embedded to be supported into the holder 40 made of synthetic resin. The example of FIG. 36 is similar to the example shown in FIG. 31 except that the permanent magnet is not installed into the rotation detection sensor 3 according to the case where the permanent magnet is used for the encoder ring 10 (see FIG. 33). For this reason, the same reference numerals are given to the equivalent parts, and the overlapped explanation is omitted.

Figure 37:
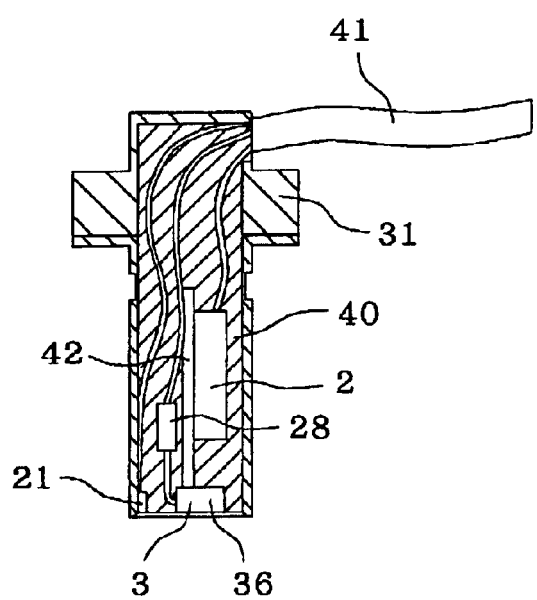
FIG. 37 is a cross sectional vies of a sensor unit installed in another example of the embodiment of the present invention.
Figure 38:
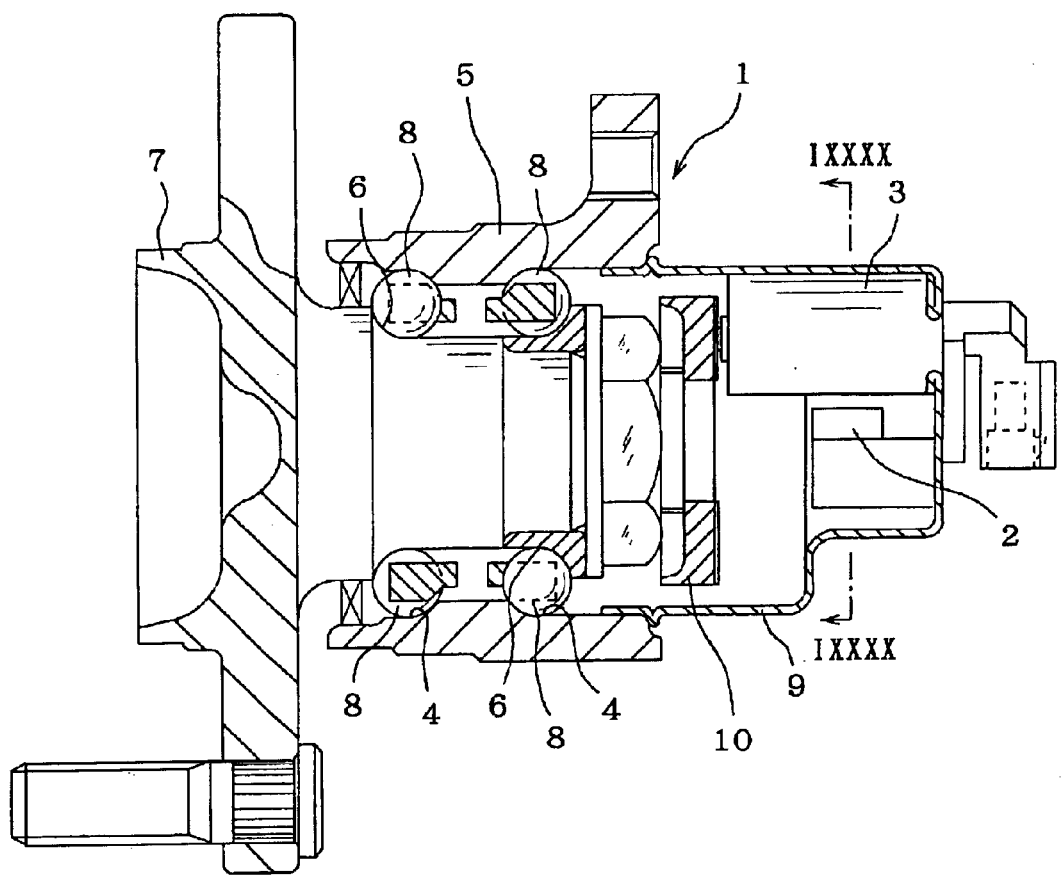
FIG. 38 is a cross sectional view to show an example of the conventional structure.
Figure 39:
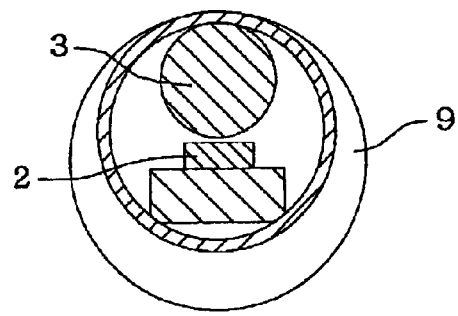
FIG. 39 is a cross sectional vies take along the line IXXXX—IXXXX in FIG. 38, wherein internal details are omitted.

Next, FIG. 37 shows another example of the embodiment of the present invention. In a sensor unit 31 to be used in this embodiment, a holder 40 made of synthetic resin into which the rotation detection sensor 3 and the acceleration sensor 2 are embedded is held into the case 43 made of nonmagnetic metal such as aluminum, copper or nonmagnetic stainless. The example of FIG. 37 is similar to the example shown in FIG. 32 except that the permanent magnet is not installed into the rotation detection sensor 3 according to the case where the permanent magnet is used for the encoder ring 10. For this reason, the same reference numerals are given to the equivalent portions, and the overlapped explanation is omitted.

Since the present invention is constituted and functions as mentioned above, the double row rolling bearing with a sensor unit which is capable of measuring different two types of state values such as rotating speed, vibration and temperature.

What is claimed is:

1. A rotation-speed sensor device comprising:

an encoder supported by a rotating race to be concentric with the rotating race and having a detected portion the characteristics of which are alternately changed in a circumferential direction, the rotating race composing a rolling bearing unit for wheel support to rotate together with a wheel when moving, a first rotation detection sensor supported by a non-rotating member and having a detecting portion facing the detected portion to produce a detection signal, a wireless transmission device for sending the detection signal from the first rotation detection sensor to a controller provided on a vehicle chassis side, and a self-diagnosis circuit to judge whether there is a problem or not in detecting rotation-speed.

2. The rotation-speed sensor device of claim 1, wherein the first rotation detection sensor has a coil to generate electric power therethrough by way of magnetic flux change caused as the encoder rotates, and wherein the self-diagnosis circuit comprising a battery provided in the non-rotating member to be charged with the electric power generated by the first rotation detection sensor, and a judgement circuit supplied with power from the battery to judge whether there is a problem in detecting rotation-speed, and wherein the self-diagnosis circuit has a function to send a signal indicating a problem when the problem in detecting the rotation-speed is detected by the judgement circuit.

3. A rolling bearing unit with a rotation-speed sensor device for use in wheel support:

the rolling bearing unit comprising a rotating race which rotates together with a wheel when moving, the rotation-speed sensor device comprising an encoder supported by a rotating race to be concentric with the rotating race and having a detected portion the characteristics of which are alternately changed in a circumferential direction, a rotation detection sensor supported by a non-rotating member and having a detecting portion facing the detected portion to produce a detection signal, a wireless transmission device for sending the detection signal from the rotation detection sensor to a controller provided on the vehicle chassis side, and a self-diagnosis circuit to judge whether there is a problem or not in detecting rotation-speed, and wherein the wireless transmission device has a transmission circuit which is kept with the rotation detection sensor in a single holder to form a sensor unit.

4. The rotation-speed sensor device of claim 3, wherein the encoder and the rotation detection sensor are located in a closed space from the outside space.

5. The rotation-speed sensor device of claim 3, wherein the transmission device has an antenna located outside the enveloping line of the metal parts of the rolling bearing unit.

* * * * *